(12) United States Patent
Crabtree et al.

(10) Patent No.: US 12,499,515 B2
(45) Date of Patent: Dec. 16, 2025

(54) SYSTEM AND METHOD FOR EFFICIENT SCENE CONTINUITY IN VISUAL AND MULTIMEDIA USING GENERATIVE ARTIFICIAL INTELLIGENCE

(71) Applicant: QOMPLX LLC, Reston, VA (US)

(72) Inventors: Jason Crabtree, Vienna, VA (US); Richard Kelley, Woodbridge, VA (US); Jason Hopper, Halifax (CA); David Park, Fairfax, VA (US)

(73) Assignee: QOMPLX LLC, Reston, VA (US)

( * ) Notice: Subject to any disclaimer, the term of this patent is extended or adjusted under 35 U.S.C. 154(b) by 0 days.

(21) Appl. No.: 18/736,517

(22) Filed: Jun. 6, 2024

(65) Prior Publication Data

US 2025/0378537 A1    Dec. 11, 2025

(51) Int. Cl.
*G06T 5/60* (2024.01)
(52) U.S. Cl.
CPC ...................................... *G06T 5/60* (2024.01)
(58) Field of Classification Search
CPC ........................................................ G06T 5/60
See application file for complete search history.

(56) References Cited

U.S. PATENT DOCUMENTS

| | | | | |
|---|---|---|---|---|
| 10,679,626 B2* | 6/2020 | Aarabi | .................... | G06N 20/00 |
| 2022/0374714 A1* | 11/2022 | Nayak | ........................ | G06T 1/20 |
| 2023/0153949 A1* | 5/2023 | Huang | ........................ | G06T 5/60 |
| | | | | 382/254 |
| 2024/0135509 A1* | 4/2024 | Liu | ........................... | G06T 5/70 |
| 2024/0135630 A1* | 4/2024 | Nagano | ..................... | G06T 5/70 |
| 2024/0185518 A1* | 6/2024 | Kopp | ........................ | G06T 7/13 |
| 2024/0221242 A1* | 7/2024 | Greenen | ................ | G06V 10/82 |
| 2024/0242408 A1* | 7/2024 | Gudkov | ............... | G06V 10/761 |
| 2024/0249422 A1* | 7/2024 | Jampani | .................... | G06T 5/77 |

\* cited by examiner

*Primary Examiner* — Yu Chen
(74) *Attorney, Agent, or Firm* — Galvin Patent Law LLC; Brian R. Galvin

(57) ABSTRACT

A system and method for generating multimedia artifacts with managed scene continuity in visual and multimedia using an AI-based and scene continuity aware media generation platform. The system receives a user or AI agent specification or simulation result(s), selects or trains generative models based on the specification, preprocesses relevant data, and generates scene narrative or frame-specific, sequence specific or broader continuity aware content using the selected or trained model(s). The generated content may be further enhanced using frame interpolation and view synthesis techniques to create smooth transitions or novel viewpoints or to aid in more efficient transmission or viewing or persistence of resultant content. The system enables efficient and customizable generation of high-quality scene continuity aware content for various applications in visual and multimedia production using neuro-symbolic and simulation enhanced compression, representation and generation processes.

30 Claims, 19 Drawing Sheets

SYSTEM AND METHOD FOR EFFICIENT SCENE CONTINUITY IN VISUAL AND MULTIMEDIA USING GENERATIVE ARTIFICIAL INTELLIGENCE

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present invention relates to the field of computer graphics and media, and more particularly to the generation of realistic and continuous scenes in media applications using artificial intelligence techniques. Specifically, the invention pertains to the use of generative artificial intelligence (AI) models for efficiently generating intermediate frames, alternative camera angles, sounds, smells, 3D and 4D representations from limited input data in illustrations, animations, and film with narrative consistency.

Discussion of the State of the Art

Generating realistic and smooth scene continuity is a challenge in various visual and multimedia applications. Traditional methods often require extensive manual effort, multiple camera setups, and costly capture processes. There is a need for techniques that can more effectively leverage captured sensor data or engage in prompt-based or simulation based narrative capture and representation that enables subsequent generation of intermediate frames, alternative camera angles, and 3D and 4D representations from limited 2D input or other lower dimensional data.

What is needed is a system that addresses the challenges associated with managing continuity of subjects, places, narrative, artistic choices and tenor while creating smooth scene transitions, generating novel views, and converting 2D images into 3D point clouds in a computationally efficient and automated manner, and which leverages advancements in deep learning, specifically in the areas of video generation, frame interpolation, and view synthesis using machine learning (ML) models such as Generative Adversarial Networks (GANs), Diffusion models and non-ML methods including Symbolic AI which may be combined with ML techniques.

SUMMARY OF THE INVENTION

Accordingly, the inventor has conceived and reduced to practice, a system and method for generating multimedia artifacts with managed scene continuity in visual and multimedia using an AI-based and scene continuity aware media generation platform. The system receives a user or AI agent specification or simulation result(s), selects or trains generative models based on the specification, preprocesses relevant data, and generates scene narrative or frame-specific, sequence specific or broader continuity aware content using the selected or trained model(s). The generated content may be further enhanced using frame interpolation and view synthesis techniques to create smooth transitions, novel viewpoints, or to aid in more efficient transmission or viewing or persistence of resultant content. The system enables efficient and customizable generation of high-quality scene continuity aware content for various applications in visual and multimedia production using neuro-symbolic and simulation enhanced compression, representation and generation processes.

According to a preferred embodiment, a computing system for managing scene continuity in generated or augmented visual media employing a scene continuity aware content review, ingestion, augmentation, and generation platform, the computing system comprising: one or more hardware processors configured for: receiving a user, artificial intelligence agent, simulation-based, or telematics-based content specification request associated with a scene for continuity aware content interpretation, representation, or generation; selecting one or more generative models based on ingested content or specification; preprocessing data based on the user specification to prepare the data for the selected representation or generative models; selecting, training, fine-tuning, or augmenting the selected generative models or modeling technique using the preprocessed data; generating scene continuity aware content using the candidate generative models based on the content specification request; and outputting the generated scene continuity aware content artifacts or representations.

According to another preferred embodiment, a computer-implemented method executed on a scene continuity aware content review, ingestion, augmentation, and generation platform for managing scene continuity in generated or augmented visual media, the computer-implemented method comprising: receiving a user, artificial intelligence agent, simulation-based, or telematics-based content specification request associated with a scene for continuity aware content interpretation, representation, or generation; selecting one or more generative models based on ingested content or specification; preprocessing data based on the user specification to prepare the data for the selected representation or generative models; selecting, training, fine-tuning, or augmenting the selected generative models or modeling technique using the preprocessed data; generating scene continuity aware content using the candidate generative models based on the content specification request; and outputting the generated scene continuity aware content artifacts or representations.

According to another preferred embodiment, a system for managing scene continuity in generated or augmented visual media employing a scene continuity aware content review, ingestion, augmentation, and generation platform, comprising one or more computers with executable instructions that, when executed, cause the system to: receive a user, artificial intelligence agent, simulation-based, or telematics-based content specification request associated with a scene for continuity aware content interpretation, representation, or generation; select one or more generative models based on ingested content or specification; preprocess data based on the user specification to prepare the data for the selected representation or generative models; select, train, fine-tune, or augment the selected generative models or modeling technique using the preprocessed data; generate scene continuity aware content using the candidate generative models based on the content specification request; and output the generated scene continuity aware content artifacts or representations.

According to another preferred embodiment, non-transitory, computer-readable storage media having computer-executable instructions embodied thereon that, when executed by one or more processors of a computing system employing a scene continuity aware content review, ingestion, augmentation, and generation platform for managing scene continuity in generated or augmented visual media, cause the computing system to: receive a user, artificial intelligence agent, simulation-based, or telematics-based content specification request associated with a scene for continuity aware content interpretation, representation, or generation; select one or more generative models based on ingested content or specification; preprocess data based on the user specification to prepare the data for the selected representation or generative models; select, train, fine-tune, or augment the selected generative models or modeling technique using the preprocessed data; generate scene continuity aware content using the candidate generative models based on the content specification request; and output the generated scene continuity aware content artifacts or representations.

According to an aspect of an embodiment, wherein the user specification comprises one or more design elements, user preference configuration documents, or templates associated with scene continuity generation.

According to an aspect of an embodiment, wherein selecting one or more generative models comprises selecting a generator network and a discriminator network.

According to an aspect of an embodiment, wherein training the selected generative models comprises training the generator network and the discriminator network adversarially using the preprocessed data.

According to an aspect of an embodiment, wherein generating scene continuity content comprises: engineering one or more prompts for the trained generative models based on the user specification; and submitting the one or more prompts as input to the trained generative models to generate the scene continuity content.

According to an aspect of an embodiment, wherein the one or more prompts include desired camera angles, temporal positions, transitions, or other scene-specific attributes.

According to an aspect of an embodiment, further comprising: selecting a frame interpolation and view synthesis subsystem based on the user specification; and applying the frame interpolation and view synthesis module to the generated scene continuity content to create smooth transitions and novel viewpoints.

According to an aspect of an embodiment, wherein preprocessing data comprises one or more of: cleaning the data to remove inconsistencies or irrelevant information; transforming the data into a format suitable for the selected generative models; and augmenting the data to enhance diversity and quantity According to an aspect of an embodiment, wherein training the selected generative models comprises: initializing the selected generative models with predefined architectures and hyperparameters; iteratively updating the model parameters using optimization algorithms; and monitoring and evaluating the training progress using metrics and validation techniques.

According to an aspect of an embodiment, wherein outputting the generated scene continuity content comprises: applying post-processing techniques to enhance the visual quality and realism of the generated content; and providing the generated content in a format compatible with the user specification or downstream applications.

BRIEF DESCRIPTION OF THE DRAWING FIGURES

DETAILED DESCRIPTION OF THE INVENTION

Figure 1:
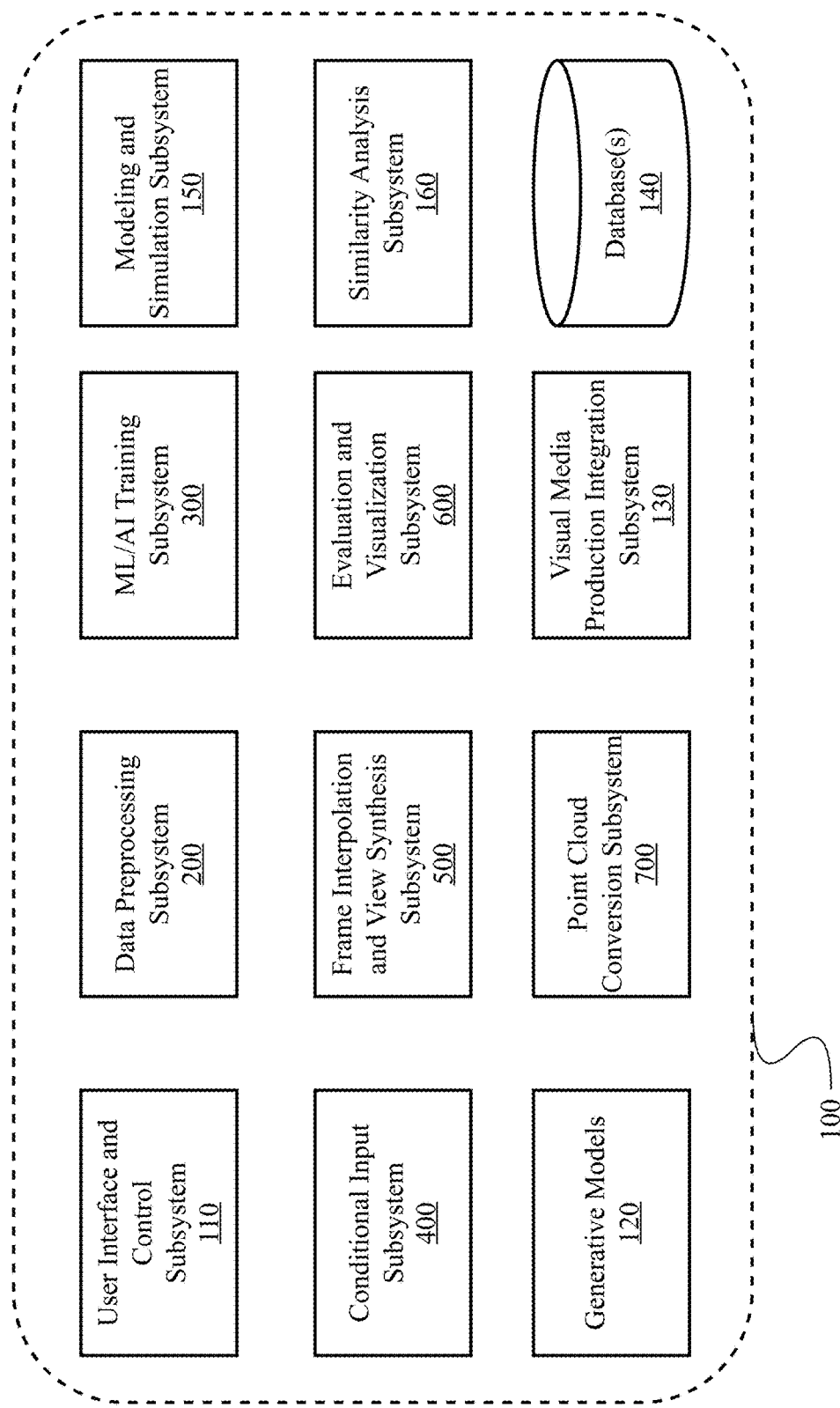
FIG. 1 is a block diagram illustrating an exemplary system architecture for generating scene continuity in visual media using generative artificial intelligence and deep learning networks, according to an embodiment.

The inventor has conceived, and reduced to practice, a system and method for generating multimedia artifacts with managed scene continuity in visual and multimedia using an AI-based and scene continuity aware media generation platform. The system receives a user or AI agent specification or simulation result(s), selects or trains generative models based on the specification, preprocesses relevant data, and generates scene narrative or frame-specific, sequence specific or broader continuity aware content using the selected or trained model(s). The generated content may be further enhanced using frame interpolation and view synthesis techniques to create smooth transitions or novel viewpoints or to aid in more efficient transmission or viewing or persistence of resultant content. The system enables efficient and customizable generation of high-quality scene continuity aware content for various applications in visual and multimedia production using neuro-symbolic and simulation enhanced compression, representation and generation processes.

The present invention leverages techniques including but not limited to Diffusion models, Variational Autoencoders and Generative Adversarial Networks (GANs) alongside simulation modeling (e.g. massively multiplayer style gaming engines and worlds, content specific engines (e.g. physics engines for a real or imagined or simulated environment) discrete event simulation, and agent-based modeling) to address the challenges of scene continuity generation. The system comprises a generator network and a discriminator network and a simulation modeling engine and a narrative-capturing knowledge graph of key entities and interactions across various scenarios with supplemental vectorized representations. The generator learns to create realistic video and media frames, while the discriminator distinguishes between generated frames and real frames, the simulation modeling engine can explore individual entity or physical or multi-entity interactions or scenarios, and the knowledge graph and vector databases can link generated content to appropriately involved entities, places, concepts, themes, narrative elements, stylistic examples, training content or telematics data (real or synthetic) and feedback from human, AI or statistical analysis reviews of content elements for frames, moments, sequences or entire works (e.g. the discriminator may score content against at least one metric during its evaluation stages).

According to one of various representative embodiments, the system employs specific GAN architectures such as Video GAN (VGAN), Temporal GAN (TGAN), Progressive Video GAN (PVGAN), and Motion and Content decomposed GAN (MoCoGAN) to capture spatial and temporal dependencies, generate frames progressively, and separate motion and content information. Other models such as Diffusion or Variational Autoencoders are also readily usable alternatives within the disclosed invention.

The system can generate intermediate frames between known waypoints by training the selected models on datasets with smooth transitions. During inference, the generator creates frames that smoothly transition between the input frames while maintaining content and style consistency.

Alternative camera angles can be generated by training the GAN on various multi-view datasets and Internet-scale data (e.g., social, YouTube, existing video content). The generator learns to map an input frame and desired camera angle to an output frame from that angle, allowing the creation of novel views without additional physical cameras or enabling the system to allow a hypothetical refilming of existing content. This has numerous examples of utility in commercial and educational settings ranging from fixing unintentional placement of sensors or cameras during filming without recreating original real-world content to enabling students to explore alternative cinematography and arrangements of existing content for educational or creative value or more compelling period reconstructions. The system is able to allow traditional imagery and sound capture to, during generative-AI enhanced post processing and editing, create stunning effects to include specialized lighting practicals or natural light enhancements or coloration or sound timbre and tenor modifications that elevate renown works like The Assassination of Jesse James by the Coward Robert Ford but at fractions of the time and cost involved with extra shootings through window/door frames, custom "Deakinizer" lenses, light texturing with old glass et cetera can all be achieved via generated content elements while preserving core elements of actor performances The system may further enable the conversion of 2D images into 3D point clouds by leveraging advancements in point cloud construction and associated classification and representation VR/AR algorithms for item, scene and spatial orientation. When combined allows for digital re-filming, post-production manipulation, and the mixing of observed content with generated content. It also enables cinematography to occur in a known physics environment (e.g. earth) and then scene elements of interest can be fed into an alternative physics engine (e.g. moon, mars, asteroid belt, or imagined world) and regenerated in an alternate physical universe for movement mechanics. These kinds of adjustments can expand upon creativity of content creators substantially.

To ensure high-quality and realistic results, the system may incorporate techniques such as conditional GANs, attention mechanisms, optical flow, and temporal coherence enforcement. These techniques guide the generation process, maintain object consistency, recreate motion patterns, and avoid artifacts not desired, or persist artifacts which are desired to be maintained.

To enable video generation the system builds upon existing models such as GAN architectures. These architectures may include Video GAN (VGAN), Temporal GAN (TGAN), Progressive Video GAN (PVGAN), and Motion and Content decomposed GAN (MoCoGAN) to generate realistic video frames and sequences. Additional architecture examples include Latent Variable Models such as Autoencoders, Variational Autoencoders (VAE), Convolutional VAE, Adversarial Autoencoder, Pixel VAE. Examples of applicable diffusion models include Denoising Diffusion Probabilistic Models (DDPM), Latent Diffusion Models, Video Diffusion Models, Guided Text-to-Image Diffusion Models, Transporter Diffusion Model, and High-Resolution Image Synthesis with Latent Diffusion Models.

Frame interpolation: The system involves techniques for generating intermediate frames between known waypoints to achieve smooth transitions and continuity in visual or multimedia.

View synthesis: The system enables the generation of alternative camera angles, smooth transitions, and novel viewpoints from a single input frame, allowing for the creation of diverse perspectives without the need for multiple physical cameras.

2D to 3D conversion: The system leverages advancements in VR/AR algorithms to convert 2D images into 3D point clouds, enabling digital re-filming, post-production manipulation, and the mixing of observed content with generated content. 3D point cloud creation algorithms may be used to generate point clouds from various types of input data, such as 3D scans, images, or other sensory data. These algorithms may include Structure from Motion (Sfm), Multi-View Stereo (MVS), Light Detection and Ranging (LiDAR), Time-of-Flight (ToF) cameras, Stereo Vision, Depth Sensors, Photogrammetry, and Simultaneous Localization and Mapping (SLAM).

Computer graphics and visual effects: The system has applications in the field of computer graphics and visual effects, where it can be used to enhance realism, create seamless transitions, and generate novel scenes in illustrations, animations, and film.

According to an aspect, the scene continuity aware content representation and generation platform may be configured for: receiving an existing piece of content or a user specification or a simulation or an AI agent-based specification or telematics data associated with a scene of interest for representation or generation; selecting one or more generative models based on the prompt or specification or simulation or telemetry or combination thereof; preprocessing data based on the request to prepare the data for the selected generative models; fine tuning or further training the selected generative models or training a de nouveau model based on a corpus of training data provided along with selected model techniques and model specifications using the preprocessed data; evaluating relative cost and performance and quality of generated content based on at least one prompt and model and fine-tuning or augmentation (e.g. RAG or knowledge graph-enhanced RAG) against an objective function for congruence or similarity with content of interest or inspiration or against AI agent feedback or against human feedback to include consideration of metrics such as click throughs, engagement statistics, television ratings, qualitative or quantitative critiques (e.g., Rotten Tomatoes), or biometric responses from sensors or video or audio of human responses in individual or group settings; generating scene continuity aware content using the ultimately selected generative model(s) based on the content request specification; and outputting the generated scene continuity aware content representations, models or artifacts or engagement data (empirical or simulated or otherwise predicted via statistics or ML methods) with optional demographic, geographic, or other audience targeting parameters.

The scene generation system may be configured for energy efficient content generation, according to an embodiment. The scene generation system can incorporate several strategies to improve energy efficiency in content generation and model training. For example, the system can implement dynamic optimization techniques similar to those used by Netflix to adapt the quality and resolution of generated content based on network conditions and device capabilities, as well as develop algorithms that automatically adjust the level of detail, complexity, and resolution of the generated scenes based on the target platform and viewing context. For example, the system can optimize the content generation pipeline to minimize unnecessary computations and data transfers, reducing energy consumption. With respect to efficient video encoding and delivery, the system may utilize machine learning algorithms, similar to YouTube's approach, to optimize video encoding and delivery processes for the generated scenes. For example, the system may employ techniques like per-title encoding and content-aware encoding to efficiently compress and stream the generated video content, reducing bandwidth usage and improving quality. In an embodiment, the system can leverage cloud-based video infrastructure platforms with AI-powered features, such as those offered by Bitmovin, to optimize the encoding and delivery process.

To support energy-aware model training, the system may develop energy-efficient training strategies for the generative models used in the scene generation system and implement techniques like model compression, pruning, and quantization to reduce the computational complexity and memory footprint of the models without significantly compromising performance. For example, the system can utilize energy-efficient hardware accelerators, such as GPUs or TPUs, that are optimized for parallel processing and can handle the computational demands of training large-scale generative models. According to an embodiment, the system may implement distributed learning approaches that allow the training workload to be spread across multiple devices or nodes, reducing the energy consumption of individual devices, and/or incremental learning techniques that enable the models to continuously learn and adapt without requiring full retraining, minimizing the energy overhead of frequent model updates.

According to an aspect, the scene generation system could be directed to a use case for video games. By using a series of generative AI models the stories of a novel (including a novel series) can be directly adapted to a highly dynamic video game. By processing the Lord of the Rings novels into a preprocessing model it can segment and extract characters, descriptions of people and places, scenes, story arcs, dialog, and more. It could then use this information to render a world in near real time filled with these characters (including personality traits) and locations. Players can interact with these characters which would each be running a generative AI agent trained on that characters dialog, story arc, etc. It would allow the dialog and interactions to be both dynamically generated and adaptive to player inputs, while also true to the original story. It would require a collection of multiple models all working together, likely with a centralized "orchestration" model. This orchestration model would tie the outputs of domain specific models together with a high degree of continuity. This not only builds a world that players can use to experience their favorite (not limited to) fiction, but also allows them to explore "what ifs". What if Gandalf was given the ring?What if Aragorn fell in Moria?What if Frodo sided with Golem and banished Sam?All story and dialog points can be fully dynamic and adaptable to player inputs.

According to an aspect, the scene generation system can be configured to generate advanced digital puppets or avatars of users or other individuals. This has several applications as it relates to news and sports broadcasting as well as AR/VR avatar correction; especially when combined with generating intermediate frames, alternative camera angles, etc. as outlined herein. For example, news anchors could be corrected or modified in real time in the event of streaming disruption. This could also be used for real-time image correction for redacting or otherwise censoring behavior or images that would not be allowed on public news channels or shows meant for general audiences based on content rating systems (e.g., bleep censor for digital avatars). News content could also be delivered in a variety of different ways to appeal to a varied audience. This could mean a single news story could be delivered in multiple flavors such as one that removes details of a homicide to be more palatable to a younger audience, putting a positive spin on the ending for elderly, or focusing more on scientific background for academics. It can also be used to ensure that sensitive content, e.g., murder, is toned down or referred to via euphemism or analogy if preferred by a user. A good example would be when a parent with a young child wants to turn on the news but can't because of all the awful events that could be addressed alternatively.

News and sports anchors could even have their avatar projected to a new location to be "on scene". This could be combined with taking live streams from a bystander or other amateur cameraman that is actually on the scene and projecting the news anchor avatar right into a broadcast. Using multiple feeds from various feeds available a more complete picture of a real-time event (whether it's news or sport related) could be stitched together. This aligns with a now common pattern of major news outlets asking for permission to use recorded events posted on social media for use in their nightly broadcast. To take this idea even further imagine future news outlets sending swarms of camera drones to cover live events from various perspectives and adding digital avatars to the feeds.

Using a content generation system as described herein provides a way for delivering news at scale globally in a fair and cost effective way. By correctly crafting the input data based on news and events, the content generation system can generate a news person (or other similar method of delivering news content) in a large range of variations, each being targeted at a geographical and societal demographic. This means adapting the focus points and delivery specifics to target audiences, allowing AI news to cover both global and local news in the language, dialect, and style expected of its audience. By linking this system to automated web crawlers and decision making platforms, the news pipeline may remain human in the loop, but would exist with a high degree of autonomy.

According to an aspect, the scene generation system can be configured for content remastering and upscaling. For example, video/image denoising due to various degradations could be provided by the system using document enhancement using cycle-consistent diffusion models.

According to an aspect, the scene generation system can be configured to perform image guidance and component-level adjustments. For example, the system can implement image guidance parameters that allow users to control the degree of image manipulation and adjustments to specific components like facial structure, height, weight, and skin tone. This may comprise the development and deployment of algorithms that can extract verbal prompt suggestions from visual content, enabling the system to generate similar images based on those suggestions. According to an aspect, the scene generation system can be configured to support narrative extraction and accessibility. The system may utilize the extracted verbal prompts to create associations between visual content and descriptive words, enhancing the system's ability to generate captions, subtitles, or other accessibility features. It may leverage these associations to improve the utilization of unstructured data and dark data in the content generation process.

According to an aspect, the scene generation system can support iterative content generation and optimization. The system can implement iterative processes that generate and regenerate content based on composite scores and errors across frames, considering factors like character consistency, context, and physics-based believability. For example, the system can utilize heuristic search techniques like genetic algorithms, particle swarm optimization (PSO), or Monte Carlo tree search (MCTS) to explore alternative prompts and component-level weightings during the generation process.

According to an aspect, the scene generation system can provide support for scene continuity and smoothing by developing and deploying algorithms that can produce content between known waypoints, such as generating new frames between existing ones, to enhance scene continuity in illustrations, animations, and films.

According to an aspect, the scene generation system can support composite character creation by allowing users to create composite characters by blending specific people/character elements, such as voice, face, height, strength, and mannerisms. This may comprise the use of weightings for these elements to control the influence of each component in the generated composite character.

According to an aspect, the scene generation system can support hierarchical and parallel content generation. The system may develop a hierarchical cooperative work allocation system that distributes content generation tasks to different nodes based on the structure of the content (e.g., book chapters, scenes) and implement consistency checks at various levels of the hierarchy, considering factors like character consistency, chronology, and content-specific relationships.

According to an aspect, the scene generation system can support video effects and manipulation by applying video and music effects to generation content. Developing algorithms for manipulating specific aspects of generated videos, such as motion style, appearance, and audio, allows users to have more control over the final output. For example, users could adjust the speed or intensity of motion, change the color scheme or texture of objects, or modify the background music to match the desired mood. Techniques like Stable Diffusion have shown promising results in improving the stability and quality of generated images. Adapting these techniques for video generation can help mitigate common issues such as temporal inconsistencies, artifacts, or blurriness in the generated videos.

According to an aspect, the scene generation system can be configured to provide tools and mechanisms for benchmarking and evaluation the performance and quality of the scene generation system against state-of-the-art techniques. Implementing evaluation metrics such as the Fréchet Inception Distance (FID), Inception Score (IS), or Learned Perceptual Image Patch Similarity (LPIPS) can help quantify the realism, diversity, and perceptual quality of the generated videos. These metrics allow for objective comparisons with other generative models and provide insights into the system's strengths and weaknesses. Additionally, conducting user studies and gathering feedback from industry professionals is essential to assess the practical usability and value of the generated content. This can involve setting up surveys, interviews, or focus groups to collect qualitative and quantitative feedback on the generated videos' aesthetics, coherence, and potential applications. Evaluating the generated videos in the context of specific use cases, such as pre-visualization, animation prototyping, or game cinematics, can provide valuable insights into the system's effectiveness and identify areas for improvement. Regularly benchmarking the scene generation system against the latest state-of-the-art techniques and incorporating new advancements can ensure that the system remains competitive and aligned with the evolving landscape of AI video generation.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture of a platform for generating scene continuity in visual media using generative artificial intelligence and deep learning networks 100, according to an embodiment. According to the embodiment, system 100 is configured as a cloud-based computing platform comprising various system or sub-system components configured to provide functionality directed to the execution of generating scene continuity in visual media using artificial intelligence and machine learning techniques. Exemplary platform systems can include a user interface and control subsystem 110, a data processing subsystem 200, a machine learning and artificial intelligence (ML/AI) subsystem 300, a conditional input subsystem 400, a frame interpolation and view synthesis subsystem 500, an evaluation and visualization subsystem 600, a plurality of generative models 120, a point cloud conversion subsystem 700, a visual media production integration subsystem 130, a modeling and simulation subsystem 150, a similarity analysis subsystem 160, and various database systems 140. A user, AI agent, simulation/simulation result, or telematics may be used to generate a prompt which can be input into the system 100 to generate scene continuity aware content. According to an embodiment, system 100 users can specify output targets such as, for example, user-specified output formats, downstream applications, and/or the like.

In some embodiments, subsystems 200-700, 110-160 may each be implemented as standalone software applications or as a services/microservices architecture which can be deployed (via platform 100) to perform a specific task or functionality. In such an arrangement, services can communicate with each other over an appropriate network using lightweight protocols such as HTTP, gRPC, or message queues. This allows for asynchronous and decoupled communication between services. Services may be scaled independently based on demand, which allows for better resource utilization and improved performance. Services may be deployed using containerization technologies such as Docker and orchestrated using container orchestration platforms like Kubernetes. This allows for easier deployment and management of services.

According to the embodiment, a user interface and control subsystem 110 is present and configured to provide a user interface for interacting with the system, specifying input conditions, and controlling the generation process. It allows users to input desired camera angles, temporal positions, transitions, or any other relevant parameters. The subsystem 110 communicates with the other subsystems to initiate the generation process and displays the generated results to the user. It serves as the bridge between the users and the underlying technical components, providing an intuitive and user-friendly interface for interacting with the system. This subsystem empowers users to input their requirements, control the generation process, and visualize the results seamlessly.

According to an embodiment, the user interface may be designed using modern web technologies such as HTML, CSS, and JavaScript. A frontend framework, such as React or Angular, may be employed to create a responsive and interactive user interface. The backend server, built using frameworks like Node.js or Django, handles the communication between the user interface and the various subsystems of the platform 100.

The user interface provides a range of functionalities to enable users to specify their desired scene continuity parameters. Users can input the source video or image sequences they want to process, along with any specific requirements such as the desired frame rate, resolution, or output format. The interface offers intuitive controls for selecting keyframes, specifying camera angles, and defining the desired level of interpolation or view synthesis.

To facilitate seamless integration with the other subsystems, user interface and control subsystem 110 may establish clear communication protocols. RESTful application programming interfaces (APIs) can be used to enable data exchange between the frontend and backend components. The user inputs and control parameters may be serialized, for example, into JSON format and sent to the backend server via HTTP requests. The server then processes these requests, interacts with the relevant subsystems/services/microservices, and returns the generated results or status updates to the user interface.

According to an embodiment, one of the key features of the user interface is its ability to provide real-time previews and visualizations. As users adjust the control parameters, the system generates previews of the scene continuity in real-time, allowing users to instantly see the impact of their choices. This interactive feedback loop enables users to iteratively refine their settings until they achieve the desired results.

The user interface also integrates with evaluation and visualization subsystem 600 to present the generated scene continuity in a comprehensive and informative manner. Users can view the generated frames, watch the interpolated video sequences, and explore the synthesized novel views directly within the interface. Any evaluation metrics and visual quality assessments can be displayed alongside the generated content, providing users with a holistic understanding of the system's performance.

To ensure a smooth and efficient user experience, user interface and control subsystem 110 implements various optimization techniques. Asynchronous programming paradigms, such as Promises or Async/Await, can be implemented to handle long-running tasks and prevent the interface from freezing. Caching mechanisms may be utilized to store frequently accessed data and reduce redundant computations. According to some embodiments, the subsystem 110 also incorporates error handling and validation mechanisms to gracefully handle user input errors and provide informative feedback.

Consider an example scenario where a user wants to generate scene continuity for a video sequence of a car driving through a city. The user interface would provide a form where the user can upload the source video file and specify the desired output parameters, such as the target frame rate and resolution. The user can then select keyframes from the video using an interactive timeline or by manually specifying the frame numbers. Additionally, the user can define the camera angles they want to synthesize, such as a bird's eye view or a side view of the car. Once the user submits their requirements, a backend server processes the request and initiates the scene continuity generation process. The system generates previews of the interpolated frames and synthesized views, which are dynamically displayed in the user interface. The user can interactively explore the generated content, adjust the parameters if needed, and provide feedback or annotations. Throughout the process, the user interface keeps the user informed about the progress and status of the generation task. It displays relevant metrics, such as the estimated completion time and the quality scores of the generated content. Once the final scene continuity is generated, the user can download the results or share them directly from the interface.

As shown, scene generation system 100 implements robust and efficient data storage systems 140 to handle the large amounts of data involved in the training, generation, and management of visual media content. The choice of data storage system depends on factors such as data volume, access patterns, scalability requirements, and data processing workflows. Examples of data storage systems that may be used in various embodiments include distributed file systems, object storage, database systems, and in-memory caching. Exemplary database systems may include relational databases, NoSQL databases, graph databases, time-series databases, knowledge graphs, spatial databases, and vector databases.

Relational databases (e.g., MySQL, PostgreSQL) are well-suited for storing structured data and maintaining relationships between different entities. In the scene generation system, a relational database could be used to store the following types of data: metadata (e.g., information about the generated scenes, such as scene IDs, timestamps, duration, resolution, format, and associated tags or categories), user data (e.g., user profiles, preferences, permissions, and authentication information), project data (e.g., details about different projects, including project IDs, names, descriptions, and associated user roles), training data (e.g., metadata about the training datasets used for model training, including dataset IDs, source, size, and associated parameters), and system configurations (e.g., settings and configurations related to the scene generation system, such as model hyperparameters, processing pipelines, and resource allocations).

NoSQL databases (e.g., MongoDB, Cassandra) are designed to handle unstructured or semi-structured data and provide scalability and flexibility. In the scene generation system, a NoSQL database could be used to store the following types of data: generated content metadata (e.g., detailed information about the generated scenes, such as scene descriptions, camera angles, object positions, and annotations), user interactions (e.g., user feedback, ratings, comments, and engagement data related to the generated scenes), temporal data (e.g., time-series data related to the generation process, such as performance metrics, resource utilization, and system logs), and unstructured data (e.g., additional data associated with the generated scenes, such as scene-specific configurations, custom annotations, or metadata in flexible formats).

Graph databases (e.g., Neo4j, Amazon Neptune) are specialized for storing and querying complex relationships between entities. In the scene generation system, a graph database could be used to store the following types of data: scene relationships (e.g., connections and dependencies between different scenes, such as continuity, spatial relationships, or temporal order), object relationships (e.g., relationships between objects within a scene, such as object interactions, hierarchies, or semantic connections), and user relationships (e.g., social connections or collaborative relationships between users involved in the scene generation process).

Time-series databases (e.g., InfluxDB, TimescaleDB) are optimized for storing and analyzing time-stamped data. In the scene generation system, a time-series database could be used to store the following types of data: performance metrics (e.g., time-series data related to system performance, such as processing times, resource utilization, or throughput), generation metrics (e.g., time-series data related to the generation process, such as model training progress, loss values, or quality metrics over time), and user activity (e.g., time-stamped data related to user interactions, such as scene views, modifications, or feedback over time).

Spatial databases (e.g., PostGIS, Oracle Spatial) are designed to store and query geospatial data. In the scene generation system, a spatial database could be used to store the following types of data: scene locations (e.g., geospatial coordinates or bounding boxes of the generated scenes), object positions (e.g., spatial positions and orientations of objects within the scenes), and camera positions (e.g., spatial information related to camera positions, angles, and movements in the generated scenes).

Vector databases can be used to store semantic representations of scenes and their components. Each scene can be represented as a high-dimensional vector that encodes its semantic information, such as objects present, their spatial relationships, and the overall scene context. By storing scene vectors in a vector database, the system can quickly retrieve similar or related scenes based on their semantic similarity. This enables efficient searching, clustering, and comparison of scenes, which can be useful for various tasks, such as scene matching, recommendation, or interpolation. The vector representations can be learned using techniques like word embeddings (e.g., Word2Vec, GloVe) or scene graph embeddings, which capture the semantic relationships between scene elements. These representations can be stored in the vector database, allowing for semantic-based querying and retrieval of scenes. Furthermore, vector databases can be employed to store vector representations of individual objects, assets, or components used in the scene generation process. Each object or asset can be represented as a high-dimensional vector that encodes its visual and semantic features. By storing these object vectors in a vector database, the system can efficiently retrieve relevant objects or assets based on their similarity to a given query or scene context. This enables fast and accurate object matching, substitution, or insertion during the scene generation process. For example, if the system needs to generate a scene with a specific type of object (e.g., a chair), it can query the vector database using the desired object's semantic or visual features and retrieve the most similar or compatible objects from the database. This facilitates the creation of coherent and semantically consistent scenes.

Vector databases can assist in scene completion and inpainting tasks, where missing or corrupted parts of a scene need to be filled in. By storing vector representations of complete and partial scenes in the database, the system can retrieve similar or compatible scene fragments to complete the missing regions. When the system encounters a scene with missing or occluded areas, it can query the vector database using the available scene information (e.g., surrounding objects, spatial layout) and retrieve the most similar or relevant scene fragments. These fragments can then be used to fill in the missing parts, ensuring coherence and consistency with the rest of the scene. Vector databases can support scene manipulation and editing operations by providing a structured and searchable representation of scene elements. By storing scene components, such as objects, textures, or animations, as vectors in the database, the system can efficiently retrieve and modify specific parts of a scene. For example, if a user wants to replace or modify a particular object in a generated scene, the system can query the vector database to find similar or compatible objects based on their semantic or visual similarity. The retrieved objects can then be seamlessly integrated into the scene, maintaining overall consistency and coherence.

Additionally, vector databases can be used to store metadata and attributes associated with scenes, objects, or assets. This metadata can include information such as scene labels, object categories, textures, materials, or any other relevant attributes. By representing the metadata as vectors and storing them in the vector database, the system can efficiently query and retrieve scenes or objects based on their associated attributes. This enables targeted searches, filtering, and categorization of generated content based on specific criteria. For example, the system can use the vector database to retrieve all scenes that contain a specific combination of objects, textures, or attributes, facilitating the generation of content that meets specific requirements or constraints.

Knowledge graphs provide a structured and semantic representation of information, capturing entities, their relationships, and attributes in a graph-based format. Knowledge graphs can be used to represent and reason about the semantic understanding of scenes. By encoding scene elements, their relationships, and attributes as nodes and edges in a knowledge graph, the system can capture the high-level meaning and context of the scene. For example, the knowledge graph can represent objects, their spatial relationships (e.g., "chair is next to table"), functional relationships (e.g., "person sits on chair"), and other semantic associations. This semantic understanding enables the system to generate scenes that are coherent, logical, and adhere to real-world constraints. The knowledge graph can be constructed using techniques such as ontology engineering, where domain experts (human or AI) define the relevant concepts, relationships, and rules governing the scene elements. Alternatively, the knowledge graph can be automatically populated from existing datasets or by extracting information from textual descriptions or annotations associated with scenes.

Knowledge graphs enable contextual reasoning and inference capabilities in the scene generation system. By traversing the graph and exploiting the semantic relationships between entities, the system can make informed decisions and generate contextually relevant scenes. For instance, if the system needs to generate a scene in a specific context (e.g., a kitchen), it can query the knowledge graph to retrieve relevant objects, their typical spatial arrangements, and associated actions or interactions. This contextual information guides the generation process, ensuring that the generated scene is consistent with the expected context. The knowledge graph can also support inference and logical reasoning. By applying rule-based or probabilistic reasoning techniques on the graph, the system can infer missing information, predict likely outcomes, or generate plausible scene variations based on the available knowledge. Furthermore, knowledge graphs can help maintain consistency and coherence in the generated scenes. By encoding semantic constraints and rules within the graph, the system can ensure that the generated content adheres to logical and consistent relationships between scene elements. For example, the knowledge graph can specify constraints such as "a person cannot walk through a wall" or "a cup should be placed on a stable surface." These constraints act as guidelines during the scene generation process, preventing the creation of physically impossible or inconsistent scenes. According to an aspect, the system may continuously validate the generated scene against the knowledge graph, checking for violations of semantic constraints or inconsistencies. If any issues are detected, the system can make necessary adjustments or regenerate specific parts of the scene to maintain overall coherence.

Knowledge graphs can facilitate interactive scene manipulation by providing a structured and semantic representation of the scene elements. Users can interact with the knowledge graph to modify or customize the generated scenes based on their preferences or requirements. For instance, users can query the knowledge graph to retrieve specific objects or relationships and modify them directly. They can add, remove, or replace scene elements, update attributes, or specify new semantic constraints. The system can then regenerate the scene, accordingly, incorporating the user-specified changes while maintaining consistency with the overall scene context. The knowledge graph acts as a shared representation between the user and the system, enabling intuitive and semantic-based interaction. Users can express their intentions or desired modifications using high-level concepts and relationships, which the system can interpret and translate into low-level scene adjustments. According to an aspect, knowledge graphs can support explanatory scene generation by providing a structured representation of the reasoning process behind the generated content. The system can generate scenes along with an accompanying explanation or rationale based on the knowledge graph. For each generated scene, the system can traverse the relevant subgraph of the knowledge graph and extract the key entities, relationships, and constraints that influenced the generation process. This explanatory information can be presented to users, providing insights into why certain scene elements were selected, how they relate to each other, and what semantic considerations were taken into account.

The various databases 140 such as knowledge graphs and vector databases can effectively support temporal overlays on content, enabling the association of entities and narrative points from an ontology with specific temporal segments or timestamps within the generated scenes. Knowledge graphs can be extended to include temporal annotations, allowing the system to represent and reason about the temporal aspects of entities and narrative points within the scene. Each entity or narrative point in the knowledge graph can be associated with temporal information, such as start and end timestamps, duration, or temporal relationships with other entities. For example, an entity representing a character's action can be annotated with the time interval during which the action occurs in the scene. The knowledge graph can also capture temporal relationships between entities, such as "event A occurs before event B" or "action X overlaps with action Y." These temporal relationships provide a structured representation of the temporal flow and dependencies within the scene. Vector databases can be utilized to efficiently index and retrieve temporal segments or timestamps associated with entities and narrative points. Each entity or narrative point can be represented as a high-dimensional vector that encodes its semantic and temporal information. These vectors can be stored in the vector database, along with their corresponding temporal metadata (e.g., start and end timestamps, duration). The vector database allows for efficient similarity-based retrieval of entities or narrative points based on their temporal characteristics. For example, the system can query the vector database to retrieve all entities or narrative points that occur within a specific time range or overlap with a given temporal segment.

Knowledge graphs and vector databases can be used in combination to align and synchronize the temporal overlays with the generated content. During the scene generation process, the system can query the knowledge graph to retrieve the relevant entities and narrative points associated with each temporal segment or timestamp. The retrieved information can be used to guide the generation of visual content, ensuring that the generated scene accurately reflects the temporal progression and relationships defined in the ontology. The vector database can be used to efficiently locate and retrieve the corresponding visual content (e.g., frames, video segments) based on their temporal alignment with the entities and narrative points. This allows for precise synchronization between the generated content and the temporal overlays. The combination of knowledge graphs and vector databases enables interactive temporal navigation within the generated scenes. Users can explore the scene by navigating through different temporal segments or timestamps. The system can retrieve the associated entities and narrative points from the knowledge graph and vector database based on the user's temporal selection. This interactive navigation allows users to access additional information, annotations, or explanations related to specific temporal points in the scene. For example, users can click on or hover over temporal segments to view the associated entities, their relationships, and any relevant narrative or contextual information. Furthermore, knowledge graphs and vector databases support temporal reasoning and analysis tasks on the generated scenes. By leveraging the temporal annotations and relationships captured in the knowledge graph, the system can perform temporal reasoning tasks, such as inferring missing temporal information, detecting temporal inconsistencies, or predicting future events based on the existing temporal knowledge. The vector database enables efficient temporal similarity search and clustering, allowing the system to identify similar temporal patterns, detect anomalies, or group related temporal segments based on their semantic and temporal proximity. Temporal reasoning and analysis capabilities enhance the system's ability to generate temporally coherent and logically consistent scenes, as well as provide insights and recommendations based on the temporal structure of the content.

According to the embodiment, a data preprocessing subsystem 200 is present and configured to handle the preprocessing of the training data, which may include videos and image sequences. Preprocessing may involve tasks such as frame extraction, resizing, normalization, and data augmentation techniques to prepare the data for training the ML/AI models (e.g., GANs, autoencoders, etc.). The preprocessed data may be organized into appropriate formats and structures suitable for input to the GAN architecture.

According to some embodiments, the scene generation system 100 may require distributed data processing frameworks, such as Apache Spark or Dask, to handle large-scale data processing/preprocessing tasks. These frameworks enable distributed computing across a cluster of nodes, allowing for parallel processing of training data, feature extraction, data augmentation, and other computationally intensive tasks. Distributed data processing frameworks can integrate with the distributed file system and object storage to efficiently process and analyze large datasets.

According to the embodiment, a ML/AI training subsystem 300 is present and configured to implement the training loop for the ML/AI models used within the system. For example, ML/AI training subsystem 300 can implement the training loop of a GAN, where the generator and discriminator networks are trained adversarially. Model training may involve optimizing the generator to produce realistic frames that can fool the discriminator, while the discriminator learns to accurately distinguish between real and generated frames. The training process may include forward and backward propagation, loss calculation, and parameter updates using optimization algorithms like, for example, Adam or RMSprop.

According to various embodiments, ML/AI training subsystem 300 may train a plurality of generative models 120 which may be used for various aspects of the scene continuity system. For instance, various specialist models may be developed and integrated into the scene generation system. Examples of specialist models include video generation models, sound generation models, and music generation models. For video generation tasks, common network architectures include generative adversarial networks, Diffusion models, and VAEs. GANs consist of two main components: a generator network and a discriminator network. The generator learns to create realistic video frames, while the discriminator tries to distinguish between the generated frames and real video frames. Some exemplary GAN architectures which may be implemented in various embodiments of the system can include, but are not limited to, video GAN (VGAN), temporal GAN (TGAN), progressive video GAN (PVGAN), StyleGAN2-ADA (Adaptive Discriminator Augmentation), VideoGPT, and motion and content decomposed GAN (MoCoGAN). VGAN extends the standard GAN framework to generate videos by using 3D convolutions in the generator and discriminator networks. It learns to capture both spatial and temporal dependencies in videos. TGAN focuses on generating videos in a frame-by-frame manner. It uses a combination of 2D convolutions for spatial processing and recurrent neural networks (RNNs) like long short-term memory (LSTMs) to capture temporal dependencies between frames. PVGAN builds upon the progressive growing technique used in image generation GANs. It starts by generating low-resolution video frames and progressively increases the resolution over the course of training, allowing for the generation of high-quality videos. MoCoGAN separates the motion and content information in videos and uses separate generators for each component. This allows for more control and flexibility in video generation. StyleGAN2-ADA is known for its ability to generate high-quality images, including human faces, animals, and landscapes. It has been adapted for video generation, allowing for the creation of realistic and diverse video sequences. VideoGPT utilizes a transformer architecture (similar to language models like GPT) for video generation. It has demonstrated impressive results in generating diverse and high-quality videos with complex scenes and actions. The system may leverage the strengths of each model, such as StyleGAN2-ADA's ability to generate high-quality images, MoCoGAN's motion and content decomposition, TGAN's temporal consistency, and VideoGPT's transformer-based architecture for diverse and complex video generation. In some implementations, variational autoencoders and/or autoregressive models may be used by the system.

Experimenting with different model architectures, training techniques, and loss functions can help optimize the performance and quality of the generated videos. This may involve exploring variations of the mentioned models, combining their strengths, or developing novel architectures tailored to specific video generation tasks.

According to an embodiment, a method may be used which decouples multimodal modeling into separate autoregressive models for time-synchronized modalities (audio and video) and non-aligned modalities. For example, Mirasol3D introduces a Combiner mechanism to model audio-video information within video snippets, enabling compact and expressive representations for subsequent autoregressive modeling. Implementing separate autoregressive models for each modality allows for more focused processing and representation learning. The models can be tailored to handle the unique sampling rates and temporal structures of audio and video data, enabling more accurate and coherent generation. Developing a mechanism similar to the Combiner in Mirasol3D involves learning to extract audio and visual features from raw spatio-temporal signals and then fusing these features to produce compact representations for each video snippet. This approach helps in capturing the joint audio-video information within a snippet and provides a more expressive representation for subsequent autoregressive modeling in time. By incorporating multimodal modeling techniques, the scene generation system can better handle the complexities of generating videos with synchronized audio and account for the different temporal characteristics of each modality.

Video GANs can be used to generate alternative camera angles and smooth transitions between scenes or frames in a few different ways. The idea is to train a video GAN on a dataset of videos captured from multiple camera angles of the same scene. During training, the generator learns to map a given input frame and a desired camera angle to a corresponding output frame from that angle. At inference time, provide a single input frame and specify the desired camera angle, and the generator creates a new frame that appears to be captured from that angle. This allows the system to generate alternative camera angles without physically having additional cameras. The quality and realism of the generated frames depend on the training data and the GAN architecture used.

To convert a series of still photos into a video with smooth transitions, the system can use a video GAN in a frame interpolation manner. The goal is to generate intermediate frames between the existing still photos to create a smooth video sequence. The system can train the video GAN on a dataset of videos with smooth transitions and corresponding still frames. During inference, provide the still photos as input to the generator, along with a desired temporal resolution (e.g., number of frames to generate between each still photo). The generator then creates intermediate frames that smoothly transition between the still photos, resulting in a video sequence. The generated frames aim to maintain the content and style of the still photos while providing smooth motion and continuity. The system can be configured to generate intermediate frames, alternative camera angles, and 3D and 4D representations form limited 2D input or other lower dimensional data (e.g., text descriptions or images taken from another source such as, for example, an artist rendition).

To achieve these tasks, the system 100 may employ techniques such as: conditional GANs wherein the generator is conditioned on additional input, such as the desired camera angle or temporal position, to guide the generation process; attention mechanisms wherein attention can be used to focus on specific regions or objects in the input frames and maintain their consistency across generated frames; optical flow wherein incorporating optical flow information can help the generator understand and recreate motion patterns between frames; temporal coherence wherein techniques like temporal discriminators or loss functions that enforce temporal consistency can be used to ensure smooth transitions and avoid flickering or artifacts in the generated video.

According to an embodiment, to incorporate neurosymbolic options and enhance the scene generation system's ability to create consistent and accurate prompts, the system may integrate techniques from neurosymbolic story generation and leverage game theory principles to formulate effective prompts. Additionally, the system can introduce loops for refining initial telemetry inputs. Neurosymbolic story generation combines the strengths of neural networks and symbolic reasoning to create coherent and consistent narratives. By integrating neurosymbolic techniques into the scene generation system, the system ensures that the generated prompts align with the desired story structure and maintain logical consistency. The system can utilize a combination of neural networks, such as language models or sequence-to-sequence models, and symbolic reasoning frameworks, such as first-order logic or planning algorithms. The neural networks can be trained on a large corpus of stories to learn the patterns and structures of coherent narratives. The symbolic reasoning component can then be used to enforce logical constraints, maintain consistency, and guide the story generation process. For example, the system can use a language model to generate a sequence of events or actions based on an initial prompt. The symbolic reasoning component can then analyze the generated sequence, check for inconsistencies or violations of predefined rules, and provide feedback to the language model to refine the generated content. This iterative process ensures that the generated prompts are consistent with the desired story structure and maintain logical coherence.

Game theory principles can be applied to formulate effective prompts for the scene generation system. The way a question is posed to an AI system can significantly impact the correctness and efficiency of the generated responses. Instead of simply asking the AI to generate a scene based on a given prompt, a user (or the system) frame the prompt as a decision-making problem. The system can be presented with multiple choices or options, each representing a different aspect or direction for the scene generation. The AI would then need to evaluate the potential outcomes and select the most appropriate option based on predefined criteria or objectives. By formulating prompts as decision-making problems, the system can guide the AI towards generating scenes that align with specific goals or constraints. This approach can lead to more accurate and relevant scene generation, as the AI is encouraged to consider multiple perspectives and make informed choices based on the given options.

To enhance the quality and accuracy of the generated scenes, the system may introduce loops for refining initial telemetry inputs. Telemetry data, such as sensor readings, motion capture data, or user interactions, can provide valuable information for generating realistic and interactive scenes. The scene generation system can incorporate a feedback loop that iteratively refines the telemetry inputs based on the generated content. The loop can involve the following steps: initial generation wherein the system generates an initial scene based on the provided telemetry inputs and prompts; evaluation wherein the generated scene is evaluated using predefined metrics or criteria, such as physical plausibility, consistency with the story narrative, or user engagement; refinement wherein, based on the evaluation results, the system identifies areas for improvement and adjusts the telemetry inputs accordingly which can involve modifying parameters, adding constraints, or incorporating additional data sources; and regeneration wherein the refined telemetry inputs are fed back into the scene generation system to produce an updated version of the scene. This iterative loop enables the system to progressively refine the generated scenes based on the feedback and evaluation metrics. It enables the incorporation of real-time data and user interactions to create more realistic and responsive scenes.

According to some embodiments, the system provides an approach for generating effective prompts by leveraging the knowledge and capabilities of large language models. Such an approach may be integrated into the scene generation system to enhance the quality and relevance of the generated prompts. The system can utilize an LLM, such as GPT-3 or BERT, as a prompt engineering component. The LLM can be fine-tuned on a specific domain or task related to scene generation, such as storytelling, visual description, or dialogue generation. By leveraging the knowledge and linguistic capabilities of the LLM, the system can generate high-quality prompts that capture the desired context, style, and tone. The prompt engineering process can involve the following, exemplary steps: input analysis wherein the system analyzes the initial input, such as a story outline, visual data, or user specifications, to extract relevant information and identify key elements; prompt generation wherein the LLM is used to generate a set of candidate prompts based on the analyzed input wherein the prompts can be generated using techniques such as template filling, keyword expansion, or semantic similarity; prompt ranking wherein the generated prompts are ranked based on their relevance, coherence, and alignment with the desired objectives, and which can be done using scoring mechanisms, such as perplexity scores or semantic similarity measures; and prompt selection wherein the highest-ranked prompt(s) are selected and used as input for the scene generation components, such as the VAE, GAN, or diffusion models. By incorporating prompt engineering techniques, the scene generation system can produce more coherent, diverse, and contextually relevant prompts. This enhances the quality and expressiveness of the generated scenes and allows for greater control over the content creation process.

Integrating neurosymbolic options, game theory principles, loops for telemetry refinement, and prompt engineering techniques into the scene generation system enhances its ability to create consistent, accurate, and engaging scenes. These enhancements leverage the strengths of different AI approaches, such as neural networks, symbolic reasoning, and large language models, to generate prompts that align with the desired story structure, maintain logical coherence, and incorporate real-time data and user interactions. By incorporating these techniques, the scene generation system can produce more realistic, interactive, and narratively coherent scenes. It enables the system to make informed decisions, refine the generated content based on feedback and evaluation metrics, and generate high-quality prompts that capture the desired context and style. These enhancements contribute to the overall effectiveness and versatility of the scene generation system in various applications, such as interactive storytelling, virtual reality, and content creation.

According to the embodiment, a conditional input subsystem 400 is present and configured to generate frames based on specific conditions, such as camera angles or temporal positions. This subsystem 400 handles the encoding and processing of conditional input, which is then fed into the generator network along with a random noise vector. The conditional input can be represented as a one-hot encoded vector, a continuous value, or any other suitable representation.

According to the embodiment, a frame interpolation and view synthesis subsystem 500 is present and configured to utilize the trained generator network to perform frame interpolation and view synthesis. For frame interpolation, it can take a sequence of input frames and generates intermediate frames to create smooth transitions. For view synthesis, it can take a single input frame and a desired camera angle and generates a corresponding frame from that angle. According to an aspect, the subsystem 500 can apply the trained generator network in a feed-forward manner to generate the desired output frames.

According to the embodiment, an evaluation and visualization subsystem 600 is present and responsible for evaluating the quality and realism of the generated frames or sequences. It can include metrics such as Inception Score (IS), Fréchet Inception Distance (FID), Peak Signal-to-Noise Ratio (PSNR), Structural Similarity Index (SSIM), Mean Squared Error (MSE), or any other relevant evaluation measures. The subsystem 600 may also provide visualization capabilities to display the generated frames, interpolated sequences, or synthesized views.

According to the embodiment, a point cloud conversion subsystem 700 is present and responsible for transforming 2D images or video frames into 3D point cloud representations. This subsystem 700 may leverage techniques from computer vision and deep learning to estimate depth information and generate 3D structures from 2D visual data. The subsystem 700 can accept 2D images or video frames as input. It is capable of handling various image formats (e.g., PNG, JPEG) and video formats (e.g., MP4, AVI). Data preprocessing subsystem 200 may preprocess the input data, including resizing, normalization, and any necessary data augmentation techniques.

One of the key components of the 2D to 3D conversion module is depth estimation. It can utilize deep learning models, such as convolutional neural networks (CNNs) or encoder-decoder architectures, to estimate depth maps from the input 2D images or frames. These models can be trained on large-scale datasets that contain paired 2D images and their corresponding depth maps or 3D point clouds. The subsystem 700 can apply the trained depth estimation models to predict depth values for each pixel in the input image or frame. Once the depth information is estimated, the subsystem can generate a 3D point cloud from the depth map and the original 2D image. Each pixel in the image may be converted into a 3D point by combining its 2D coordinates with the estimated depth value. The resulting point cloud would represent the 3D structure of the scene captured in the 2D image. The subsystem 700 can handle the organization and storage of the generated point cloud data, using appropriate data structures and file formats (e.g., PLY, PCD).

The generated point cloud may require additional processing and refinement steps to improve its quality and usability. According to an aspect, the subsystem 700 may include functionality for point cloud filtering, noise reduction, and outlier removal to eliminate spurious or noisy points. It may also incorporate techniques for point cloud upsampling or downsampling to adjust the density and resolution of the point cloud based on the specific requirements of the application.

In some cases, the subsystem 700 may need to go beyond point cloud generation and perform 3D reconstruction and meshing. This may involve converting the point cloud into a 3D mesh or surface representation. The subsystem can employ algorithms such as Poisson surface reconstruction or Delaunay triangulation to create a continuous 3D surface from the point cloud. The resulting 3D mesh provides a more structured and visually coherent representation of the scene.

The 2D to 3D conversion subsystem 700 can integrate seamlessly with other components of the system, such as the data preprocessing subsystem 200 and the GAN-based generation subsystems 120. It can provide the capability to feed the generated 3D point clouds or meshes into the GAN architectures for further processing, such as view synthesis or scene manipulation. The subsystem 700 may define appropriate interfaces and data formats to ensure smooth data flow and compatibility with other subsystems.

Converting 2D images to 3D point clouds can be computationally intensive, especially for high-resolution images or real-time video processing. The subsystem 700 may need to be optimized for efficiency and speed. The subsystem can employ techniques such as parallel processing, GPU acceleration, and efficient data structures to handle large-scale point cloud data. It may also consider memory management and streaming mechanisms to process point clouds in a memory-efficient manner.

According to the embodiment, a visual media production integration subsystem 130 is present and configured to integrate with other tools or pipelines in a visual media production workflow and serve as a bridge between the GAN-based (or VAE, or Diffusion) system for generating scene continuity and the existing ecosystem of tools and workflows used in visual media production. In an embodiment, the system 100 may integrate with one or more gaming engines (e.g., Unity, Unreal Engine, etc.) to leverage their powerful rendering, physics, and scripting capabilities. This subsystem 130 can facilitate seamless integration, data exchange, and interoperability between the GAN system and other software applications and pipelines. The integration subsystem 130 can handle the import and export of various data formats used in the visual media production workflow. It may support common image and video formats (e.g., PNG, JPEG, MP4, MOV) as well as specialized formats used in specific tools or pipelines (e.g., EXR, DPX, ALEMBIC). The subsystem 130 provides functionality to read and write data in these formats, allowing the system 100 to consume and generate content compatible with other tools.

The subsystem 130 may expose a well-defined API that allows other tools and pipelines to interact with the system 100 programmatically. The API may provide functions for tasks such as submitting input data, specifying generation parameters, triggering the generation process, and retrieving the generated output. The API can be designed to be language-agnostic and follow industry standards (e.g., RESTful APIs) to ensure broad compatibility with different programming languages and environments.

According to the embodiment, a modeling and simulation subsystem 150 is present and configured to enhance the capabilities of the scene generation system by providing a powerful tool for generating realistic and physically accurate scenes. The modeling and simulation subsystem 150 can incorporate physics-based simulation techniques to generate scenes that adhere to real-world physical laws and constraints. This includes simulating the behavior of objects, characters, and environments based on their properties, such as mass, velocity, friction, and collision detection. By integrating physical simulation, the scene generation system can create more realistic and convincing scenes. For example, objects can be simulated to fall, bounce, or interact with each other in a physically plausible manner. Characters can be animated with realistic motion and responses to external forces. Environments can be simulated with accurate lighting, shadows, and atmospheric effects.

The modeling and simulation subsystem 150 can include behavioral modeling capabilities to simulate the behavior and interactions of characters or agents within the generated scenes. Behavioral models can be based on rules, decision trees, state machines, or more advanced techniques such as reinforcement learning or cognitive architectures. These models define how characters perceive, reason, and make decisions based on their goals, beliefs, and the state of the environment. Incorporating behavioral modeling enables the scene generation system to create scenes with autonomous and intelligent characters that exhibit realistic and context-aware behaviors. Characters can navigate the environment, interact with objects, communicate with each other, and make decisions based on their predefined behaviors and the evolving state of the scene. The modeling and simulation subsystem 150 can support crowd simulation techniques to generate scenes with large numbers of characters or agents. Crowd simulation involves modeling the collective behavior and interactions of multiple characters, taking into account factors such as crowd density, flow, collision avoidance, and emergent behaviors. It allows the scene generation system to create realistic and dynamic scenes with crowds of people, such as in urban environments, public spaces, or large-scale events. The subsystem 150 can utilize algorithms and techniques specifically designed for efficient and scalable crowd simulation, such as particle-based methods, continuum dynamics, or data-driven approaches. These techniques enable the generation of believable and diverse crowd behaviors while optimizing computational performance.

According to an embodiment, the modeling and simulation subsystem 150 can provide tools and techniques for modeling and simulating complex environments and scenes. This includes the creation and manipulation of 3D models, terrains, buildings, and other scene elements. The component can support procedural generation techniques, where algorithms and rules are used to automatically generate realistic and varied environments based on predefined parameters and constraints. The subsystem can also incorporate techniques for simulating natural phenomena, such as water, fire, smoke, or weather effects. These simulations add realism and immersion to the generated scenes, creating visually appealing and dynamic environments.

According to an embodiment, the modeling and simulation subsystem 150 can be integrated with the knowledge graphs and databases 140 used by the scene generation system. The knowledge graphs can provide semantic information about the scene elements, their relationships, and behavioral attributes. This information can be used to guide the modeling and simulation process, ensuring that the generated scenes align with the defined ontologies and constraints. The databases can store and retrieve 3D models, textures, animations, and simulation parameters required by the modeling and simulation component. This integration allows for efficient management and reuse of assets, enabling the generation of diverse and consistent scenes. According to an aspect, the modeling and simulation subsystem 150 can offer user interaction and control capabilities, allowing users to manipulate and customize the generated scenes. Users can interact with the simulated environments, modify object properties, adjust simulation parameters, or define specific behaviors or constraints. This interactivity enables users to explore different scenarios, test hypotheses, or create personalized scenes based on their requirements. For instance, the modeling and simulation subsystem can provide intuitive interfaces and tools for users to express their intentions and control the simulation process. This can include graphical user interfaces, scripting languages, or plug-in architectures that allow users to extend and customize the simulation capabilities.

The modeling and simulation capabilities enable the generation of scenes for various applications, such as virtual reality experiences, gaming environments, training simulations, or scientific visualizations. The generated scenes can be used for entertainment, education, analysis, or decision-making purposes, providing users with realistic and engaging virtual environments.

According to the aspect, a similarity analysis subsystem 160 is present and configured to enable sampling and similarity analysis of repetitive elements across multiple frames. This integration can enhance the system's 100 ability to identify and track objects or patterns that persist throughout a video sequence. The similarity analysis subsystem 160 can apply image segmentation techniques to isolate repetitive elements within each frame. Methods such as grid-based segmentation, quadtree decomposition, k-means clustering, or machine learning-based approaches can be used to identify and extract the relevant portions of each frame containing the repetitive element (e.g., a car across several frames). The segmentation process can be applied consistently across all frames to ensure that the same object or pattern is captured in each segment.

The similarity analysis subsystem 160 can also provide hashing and part identification functionality. Once the repetitive element is segmented from each frame, the subsystem 160 can assign a unique hash value or part identifier to each segment. For example, hashing algorithms like perceptual hashing or locality-sensitive hashing can be employed to generate a compact and meaningful representation of each segment. The hash values may be designed to capture the essential characteristics of the repetitive element while being robust to minor variations or transformations across frames. With the hash values assigned to each segment, the subsystem can perform similarity comparisons to determine the consistency and repetition of the element across frames. Techniques such as, for example, edit distance, Hamming distance, or cosine similarity can be used to measure the similarity between the hash values of different segments. By setting an appropriate similarity threshold, the system can identify segments that are highly similar and likely to represent the same repetitive element.

According to an aspect, the similarity analysis subsystem 160 can leverage the temporal information inherent in video sequences to further refine the similarity analysis. By considering the temporal proximity of similar segments, the system can establish a connection between the repetitive elements across consecutive or nearby frames. This temporal analysis can help in tracking the movement or evolution of the repetitive element throughout the video sequence. By combining the segmentation, hashing, and similarity comparison techniques, the scene generation system can enable object tracking and ensure consistency in the generated scenes. The system can identify and track the repetitive element across multiple frames, maintaining its coherence and continuity in the generated output. This tracking capability can be valuable for tasks like video completion, frame interpolation, or ensuring the stability of objects in the generated scenes.

According to an embodiment, the similarity analysis subsystem 160 can employ adaptive sampling techniques to optimize the segmentation and hashing processes based on the characteristics of the repetitive element. For example, if the element exhibits significant variations or transformations across frames, the system can dynamically adjust the segmentation parameters or choose a more robust hashing algorithm to handle those variations. Iterative refinement techniques can be applied to improve the accuracy and consistency of the segmentation and similarity analysis over multiple passes. By integrating these comparison features into the scene generation system, it can enhance its ability to identify, track, and maintain the consistency of repetitive elements across frames. This integration enables more accurate and coherent generation of video sequences, especially when dealing with objects or patterns that persist throughout the scene. The system can leverage the segmentation, hashing, and similarity comparison techniques to ensure that the repetitive elements are faithfully reproduced and maintain their temporal and spatial consistency in the generated output. This can lead to more realistic and visually appealing results, as the repetitive elements will appear stable and continuous across the generated frames.

Figure 2:
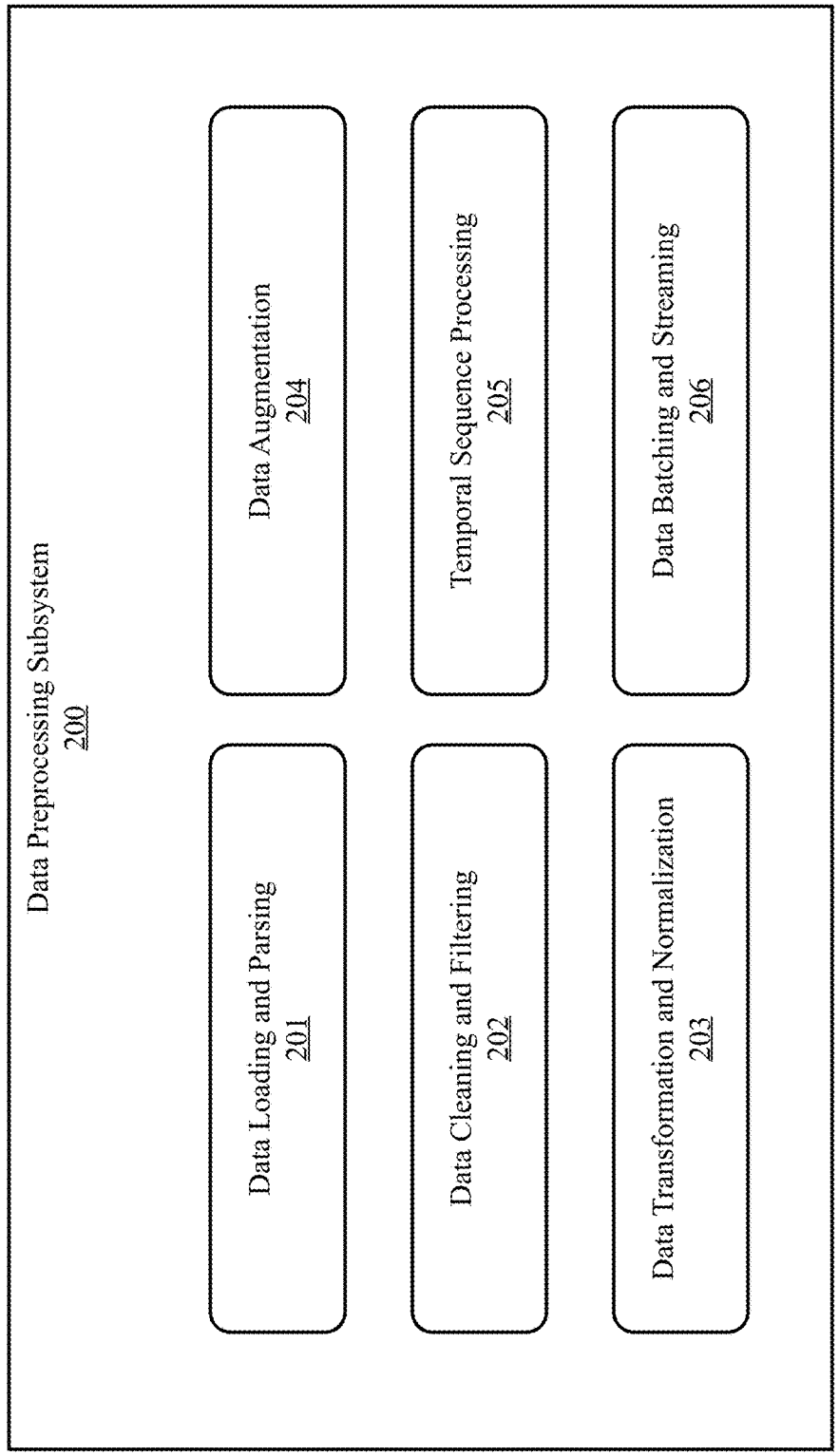
FIG. 2 is a block diagram illustrating an exemplary aspect of a system for generating scene continuity in visual media, a data preprocessing subsystem.

FIG. 2 is a block diagram illustrating an exemplary aspect of a system for generating scene continuity in visual media, a data preprocessing subsystem 200. According to the aspect, data preprocessing subsystem 200 is responsible for preparing the input data for training and inference of the GAN models. It encompasses various techniques and algorithms to ensure the data is in a suitable format and quality for optimal performance. According to the aspect, data preprocessing subsystem 200 comprises components and techniques for data loading and parsing 201, data cleaning and filtering 202, data transformation and normalization 203, data augmentation 204, temporal sequence processing 205, and data batching and streaming 206.

The data loading and parsing component 201 provides functionality for loading and parsing various data formats, such as images (e.g., PNG, JPEG), videos (e.g., MP4, AVI), and structured data (e.g., JSON, XML). It can be configured to handle different data sources, including local file systems, network storage, or cloud storage services (e.g., Amazon S3, Google Cloud Storage).

The subsystem 200 includes techniques for data cleaning and filtering 202 to remove noise, outliers, or irrelevant samples from the dataset. It can handle missing or corrupted data gracefully, either by discarding such samples or applying appropriate imputation methods. In some implementations, the subsystem 200 may apply domain-specific filters or criteria to select relevant data for the specific task of generating scene continuity.

The subsystem can perform necessary data transformations 203 to ensure compatibility with the GAN models. This may include resizing images or video frames to a consistent resolution, cropping or padding to maintain aspect ratios, or converting color spaces (e.g., RGB to YUV). The subsystem can apply normalization techniques to scale the pixel values to a specific range (e.g., [0, 1] or [−1, 1]) to facilitate stable training of the GAN models. To enhance the diversity and robustness of the training data, the subsystem may incorporate data augmentation techniques 204. This may include random rotations, translations, flips, or color jittering to introduce variability and improve the generalization ability of the GAN models. In some implementations, the subsystem 200 can apply these augmentations on-the-fly during training to avoid storing redundant augmented data.

For generating scene continuity, the subsystem 200 can handle temporal sequences 205 of frames or images. For example, techniques may be used for temporal subsampling or keyframe extraction to reduce redundancy and focus on salient moments in the sequence. The subsystem can consider the temporal context and ensure proper ordering and continuity of the frames during preprocessing. To efficiently feed data to the GAN models during training and inference, the subsystem 200 can be configured to support data batching and streaming 206. It may create batches of data with appropriate sizes based on the available memory and computational resources. The subsystem can implement efficient data loading and caching mechanisms to minimize I/O bottlenecks and ensure smooth data flow.

As an example, consider a scenario where the system aims to generate scene continuity for a video sequence. The data preprocessing subsystem 200 may perform the following steps. Video loading wherein the subsystem reads a video file (e.g., MP4) from a specified location. It decodes the video into individual frames using a video decoding library (e.g., OpenCV, FFmpeg). Frame selection wherein the subsystem applies temporal subsampling to select keyframes from the video sequence at a specified interval (e.g., every 10th frame). It discards frames with poor quality or redundant information based on predefined criteria. Frame preprocessing wherein each selected frame undergoes resizing to a consistent resolution (e.g., 256×256 pixels) while maintaining the aspect ratio. The subsystem applies normalization to scale the pixel values to the range [−1, 1]. It performs data augmentation, such as random horizontal flips and color jittering, to introduce variability. Temporal context wherein the subsystem considers the temporal context by grouping consecutive frames into overlapping sequences of a fixed length (e.g., 5 frames per sequence). It ensures proper ordering and continuity of the frames within each sequence. Data batching wherein the preprocessed frame sequences are batched into mini-batches of a specified size (e.g., 16 sequences per batch). The subsystem creates data generators or loaders that yield batches of data on-the-fly during training and inference. Data streaming, wherein the subsystem efficiently streams the batches of preprocessed data to the GAN models. It may leverage caching mechanisms to store frequently accessed data in memory and minimize disk I/O. By performing these preprocessing steps, preprocessing subsystem 200 ensures that the input data is in a suitable format, normalized, augmented, and efficiently provided to the GAN models for training and generating scene continuity.

Figure 3:
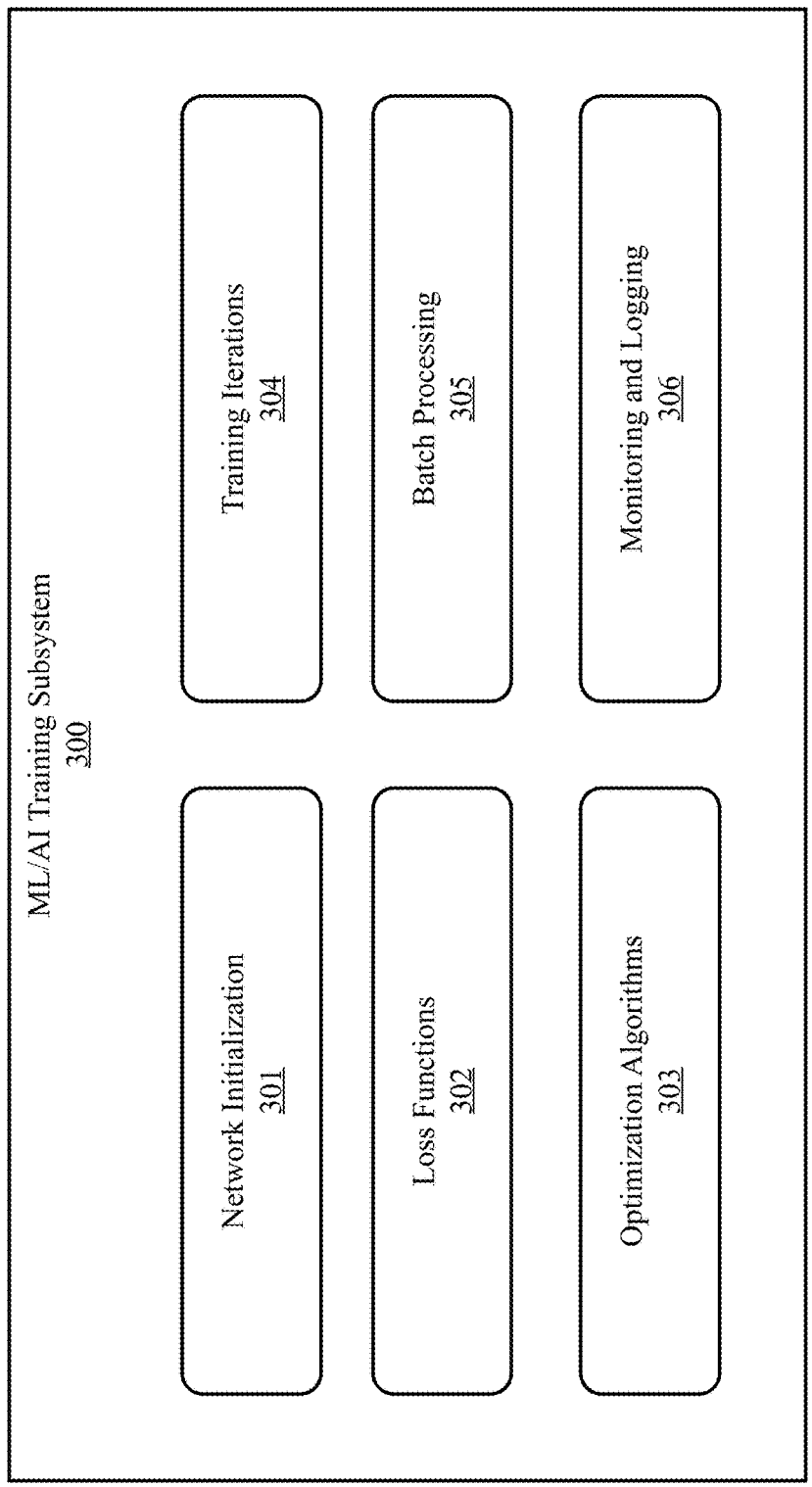
FIG. 3 is a block diagram illustrating an exemplary aspect of a system for generating scene continuity in visual media, an ML/AI training subsystem.

FIG. 3 is a block diagram illustrating an exemplary aspect of a system for generating scene continuity in visual media, an ML/AJ training subsystem 300. According to the aspect, ML/AJ training subsystem 300 is responsible for training the generator and discriminator networks adversarially to enable the generation of realistic and coherent scene continuity. It involves the optimization of the networks' parameters through an iterative process of forward and backward propagation, loss calculation, and parameter updates. According to the aspect, ML/AJ training subsystem 300 comprises components and techniques for network initialization 301, loss functions 302, optimization algorithms 303, training iterations 304, batch processing 305, and monitoring and logging 306.

According to the aspect, the training subsystem initializes the generator and discriminator networks with appropriate architectures and random weights. The choice of architecture depends on the specific GAN variant being used (e.g., VGAN, TGAN, PVGAN, MoCoGAN) and the requirements of the scene continuity task. The subsystem 300 sets up the network layers, activation functions, and regularization techniques based on the selected architecture.

According to the aspect, the subsystem defines the loss functions 302 for training the GAN. The generator and discriminator networks have different loss functions that are optimized simultaneously. Common loss functions used in GANs include the binary cross-entropy loss for the discriminator and the adversarial loss for the generator. The subsystem may also incorporate additional loss terms, such as perceptual loss or temporal consistency loss, to improve the quality and coherence of the generated scenes.

According to the aspect, the training subsystem 300 utilizes optimization algorithms 303 to update the network parameters based on the calculated gradients. Popular optimization algorithms for GANs include Adam, RMSprop, and Stochastic Gradient Descent (SGD). The subsystem sets the hyperparameters for the chosen optimization algorithm, such as learning rate, momentum, and weight decay, to control the learning process and ensure stable convergence.

The subsystem 300 performs iterative training by alternating between training the discriminator and the generator. In each iteration, the following steps occur: a. Discriminator Training: The discriminator is provided with real samples from the training dataset and generated samples from the generator. It learns to classify the samples as real or fake by minimizing the discriminator loss. The subsystem performs forward and backward propagation, calculates gradients, and updates the discriminator's parameters. b. Generator Training: The generator is trained to fool the discriminator by generating samples that resemble real data. It takes random noise and/or conditional inputs and generates samples that are fed to the discriminator. The generator's parameters are updated based on the feedback from the discriminator, aiming to maximize the adversarial loss and generate realistic samples.

According to the aspect, the training subsystem 300 can process the data in batches to efficiently utilize computational resources and stabilize the training process. It retrieves, receives, or otherwise obtains batches of preprocessed data from data preprocessing subsystem 200 and feeds them to the networks during training. The batch size is a hyperparameter that determines the number of samples processed in each iteration.

According to some embodiments, the subsystem 300 incorporates monitoring and logging mechanisms 306 to track the progress of the training process. It records various metrics, such as the generator and discriminator losses, quality metrics (e.g., Inception Score, Fréchet Inception Distance), and generates visualizations of the generated samples at regular intervals. These logs and visualizations help in assessing the convergence and quality of the trained models.

As an example, consider a scenario where the system aims to generate scene continuity for a video sequence using a Temporal GAN (TGAN) architecture. In this example, ML/AI training subsystem 300 would perform the following steps. Network initialization wherein the subsystem initializes the TGAN generator and discriminator networks with appropriate architectures. The generator consists of a series of 3D convolutional layers to capture spatial and temporal dependencies, while the discriminator uses a similar architecture to classify the generated and real video sequences. Loss functions wherein the subsystem defines the adversarial loss for the generator and the binary cross-entropy loss for the discriminator. Additionally, it incorporates a temporal consistency loss to ensure smooth transitions between generated frames. Optimization wherein the subsystem uses the Adam optimizer with a learning rate of 0.0002 and beta values of 0.5 and 0.999 for both the generator and discriminator. It sets up the optimization algorithm to update the network parameters based on the calculated gradients. Training iterations wherein the subsystem performs alternating training of the discriminator and generator. In each iteration: a. Discriminator Training: The discriminator receives real video sequences from the training dataset and generated sequences from the generator. It learns to distinguish between real and fake sequences by minimizing the binary cross-entropy loss. b. Generator Training: The generator takes random noise and conditional inputs (e.g., scene labels, camera angles) and generates video sequences. It aims to fool the discriminator by generating realistic and temporally consistent sequences, maximizing the adversarial loss and minimizing the temporal consistency loss. Batch processing wherein the subsystem retrieves batches of preprocessed video sequences from data preprocessing subsystem 200 and feeds these batches to the networks during training, allowing for efficient computation and stable convergence. Monitoring and logging wherein the subsystem records the generator and discriminator losses, as well as evaluation metrics such as the Inception Score and Fréchet Inception Distance, at regular intervals during training. It generates sample video sequences to visualize the progress and quality of the generated scene continuity. By iteratively training the generator and discriminator networks using the adversarial loss and temporal consistency loss, ML/AI training subsystem 300 enables the system 100 to generate realistic and coherent scene continuity. The trained generator can then be used to generate new video sequences, interpolate between frames, or synthesize alternative camera angles, depending on the specific requirements of the visual media production.

Figure 4:
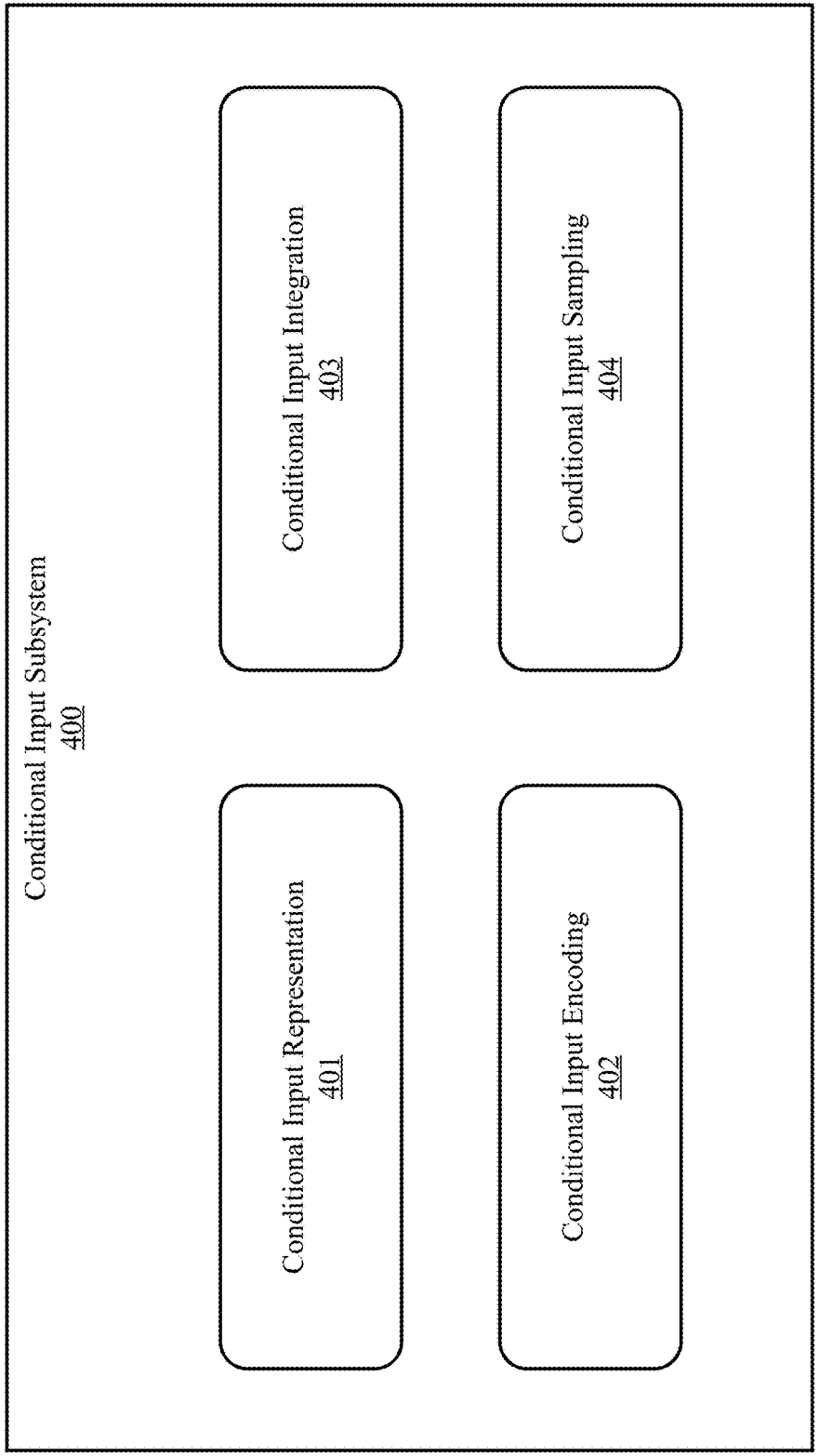
FIG. 4 is a block diagram illustrating an exemplary aspect of a system for generating scene continuity in visual media, a conditional input subsystem.

FIG. 4 is a block diagram illustrating an exemplary aspect of a system for generating scene continuity in visual media, a conditional input subsystem 400. According to the aspect, conditional input subsystem 400 is responsible for encoding and processing of any conditional information that guides the generation process of the GAN model. It allows for the incorporation of specific conditions, such as camera angles, temporal positions, or scene semantics, to control the generated scene continuity. According to the aspect, conditional input subsystem 400 comprises components and techniques for conditional input representation 401, conditional input encoding 402, conditional input integration 403, and conditional input sampling 404.

According to the aspect, the subsystem 400 supports various forms of conditional input representation 401, depending on the nature of the conditions and the requirements of the scene continuity task. Common representations which may be implemented can include, but are not limited to: a. Categorical Conditioning: For discrete conditions like camera angles or scene labels, the subsystem may use one-hot encoding or embedding vectors to represent the categories. Each category is mapped to a unique binary vector or a dense embedding in a learned embedding space. b. Continuous Conditioning: For continuous conditions like temporal positions or camera parameters, the subsystem may directly use the numerical values as input to the GAN model. These values can be normalized or scaled to a specific range to facilitate stable training. c. Semantic Conditioning: For conditions based on semantic information, such as scene descriptions or object labels, the subsystem can employ techniques like word embeddings or pre-trained language models to convert the textual input into a dense vector representation.

According to the aspect, the subsystem 400 applies appropriate encoding techniques 402 to convert the raw conditional input into a suitable representation for integration with the GAN model. This may involve: embedding layers, normalization, and/or language models. For categorical conditions, the subsystem may use embedding layers to map the one-hot encoded vectors or integer indices to dense embedding vectors. The embedding layers are learned during training to capture the semantic relationships between categories. For continuous conditions, the subsystem may apply normalization techniques, such as min-max scaling or standard scaling, to ensure the values are within a consistent range and prevent numerical instability during training. For semantic conditions, the module can leverage pre-trained language models, such as Word2Vec or BERT, to encode the textual input into a dense vector representation. These models capture the semantic meaning and context of the words, enabling the GAN to understand and generate content based on the provided descriptions.

According to the aspect, the subsystem 400 integrates the encoded conditional input with the generator and discriminator networks of the GAN model. The integration approach depends on the specific GAN architecture being used. Common techniques include: concatenation, conditional batch normalization, and/or projection discriminator. The encoded conditional input may be concatenated with the random noise vector or intermediate feature maps in the generator network. This allows the generator to learn the mapping between the conditions and the generated content. The encoded conditional input may be used to modulate the batch normalization layers in the generator network. This enables the generator to adapt its behavior based on the provided conditions. The encoded conditional input may be concatenated with the feature maps in the discriminator network, allowing it to assess the authenticity of the generated content based on the given conditions.

According to the aspect, during the generation process, the subsystem 400 samples or selects the desired conditional input based on user specifications or predefined criteria. This can involve: user input wherein the system provides an interface for users to specify the desired camera angles, temporal positions, or scene descriptions that guide the generation process; and/or automated sampling wherein the system can automatically sample or interpolate conditional input values based on predefined rules or algorithms. For example, it can generate a sequence of camera angles or temporal positions to create smooth scene transitions.

As an example, consider a scenario where the system aims to generate scene continuity for a video sequence based on camera angle conditions. The conditional input subsystem would perform the following steps in this example. Camera angle representation wherein the subsystem represents the camera angles as categorical conditions. Each camera angle (e.g., front view, side view, top view) is assigned a unique integer index or one-hot encoded vector. Camera angle encoding wherein the subsystem uses an embedding layer to map the camera angle indices or one-hot vectors to dense embedding vectors. The embedding layer is initialized randomly and learned during training to capture the semantic relationships between camera angles. Conditional input integration wherein the subsystem integrates the encoded camera angle embeddings with the generator and discriminator networks. In the generator, the camera angle embedding is concatenated with the random noise vector and fed into the first layer of the network. In the discriminator, the camera angle embedding is concatenated with the feature maps at a specific layer to condition the authenticity assessment. Camera angle sampling wherein during the generation process, the system allows users to specify the desired camera angles for each frame or segment of the video sequence. Users can input the camera angles through an interface or provide a predefined sequence of camera angles for automated generation. Scene continuity generation, the generator network takes the random noise vector and the encoded camera angle embedding as input and generates frames or video sequences corresponding to the specified camera angles. The generator learns to map the camera angle conditions to realistic and coherent scene continuity. Discriminator assessment wherein the discriminator network receives the generated frames or video sequences along with the corresponding camera angle embeddings. It assesses the authenticity and coherence of the generated content based on the provided camera angle conditions. The discriminator learns to distinguish between real and generated samples considering the camera angle information. By incorporating the conditional input module, the system can generate scene continuity that adheres to specific camera angle conditions. The subsystem 400 enables users to control the perspective and viewpoint of the generated content, enhancing the flexibility and customization options in the visual media production pipeline.

The functionality of conditional input subsystem 400 extends beyond camera angles and can be adapted to incorporate various types of conditions, such as temporal positions, scene semantics, or other relevant factors that influence the generated scene continuity. By leveraging the power of conditional input, the system can generate diverse and context-aware scene continuity, enhancing the creative possibilities in visual media production.

Figure 5:
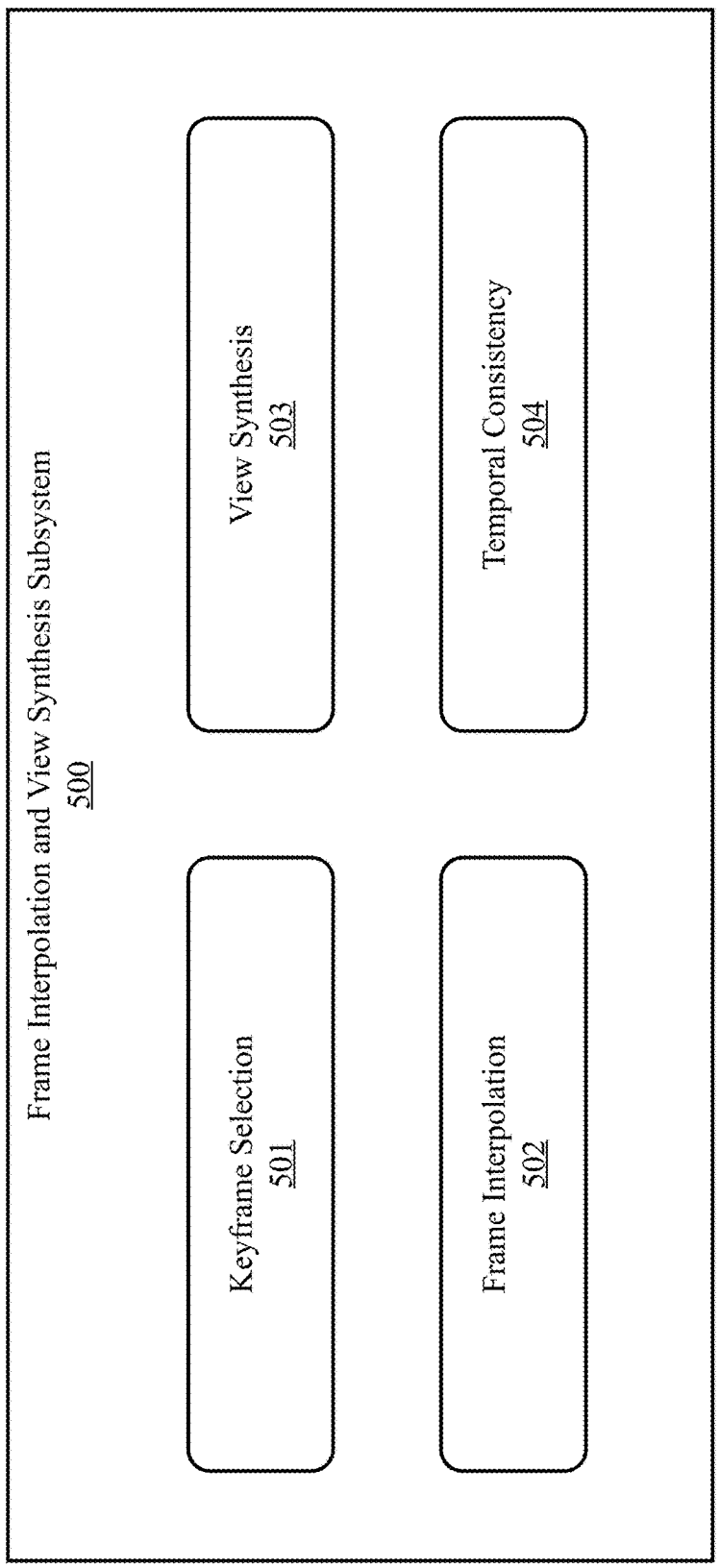
FIG. 5 is a block diagram illustrating an exemplary aspect of a system for generating scene continuity in visual media, a frame interpolation and view synthesis subsystem.

FIG. 5 is a block diagram illustrating an exemplary aspect of a system for generating scene continuity in visual media, a frame interpolation and view synthesis subsystem 500. According to the aspect, frame interpolation and view synthesis subsystem 500 is responsible for generating intermediate frames between existing keyframes and synthesizing novel views from different camera angles. It leverages the trained generative models (e.g., GANs) to create smooth transitions and generate content that maintains consistency with the original scene. According to the aspect, frame interpolation and view synthesis subsystem 500 comprises components and techniques for keyframe selection 501, frame interpolation 502, view synthesis 503, and temporal consistency 504.

According to the aspect, the subsystem 500 starts by selecting keyframes from the input video sequence. Keyframes are representative frames that capture the essential content and structure of the scene. The selection process can be based on various criteria, such as, fixed interval, motion analysis, and manual selection. Using a fixed interval process, keyframes are selected at regular intervals (e.g., every nth frame) to ensure uniform coverage of the video sequence. Whereas in the motion analysis process, keyframes are selected based on the amount of motion or change between consecutive frames. Frames with significant motion or content variations are chosen as keyframes. Manual selection allows users to manually specify the keyframes that best represent the scene or highlight important moments in the video sequence.

Once the keyframes are selected, the subsystem 500 can perform frame interpolation 502 to generate intermediate frames between the keyframes. The interpolation process leverages the trained GAN model to create smooth and coherent transitions. According to an aspect, the subsystem follows these steps: keyframe encoding wherein the keyframes are encoded using the GAN's generator network and the generator takes the keyframes as input and learns to map them to a latent space representation; latent space interpolation wherein the subsystem interpolates between the latent space representations of the keyframes and generates intermediate latent vectors that lie on the path connecting the keyframe representations. The interpolation can be performed using techniques such as linear interpolation or spherical linear interpolation (Slerp); and frame decoding wherein the interpolated latent vectors are fed into the GAN's generator network to decode them into intermediate frames. The generator learns to map the latent vectors back to the image space, creating visually coherent and realistic frames.

According to the aspect, the subsystem 500 also performs view synthesis 503 to generate novel views of the scene from different camera angles. It can leverage the GAN's ability to learn the 3D structure and appearance of the scene implicitly. According to an aspect, the view synthesis process involves the following steps: camera pose estimation, view conditioning, and view generation. The subsystem 500 estimates the camera pose (position and orientation) for each desired view. This can be done using techniques such as structure from motion or by providing explicit camera parameters. The estimated camera pose is used to condition the GAN's generator network. The camera pose information may be concatenated with the latent space representation or injected into the generator's architecture to guide the view synthesis process. The conditioned generator network synthesizes the novel view by mapping the latent space representation and camera pose to the corresponding image space. The generator learns to create realistic and consistent views of the scene from the specified camera angles.

To ensure temporal consistency 504 between the generated frames and views, the subsystem 500 can incorporate techniques such as, for example, optical flow wherein the subsystem estimates the optical flow between consecutive frames to capture the motion and correspondences and the optical flow information is used to enforce consistency and smoothness in the generated content, and/or temporal discriminator wherein the subsystem employs a temporal discriminator network that assesses the realism and consistency of the generated video sequence. The temporal discriminator helps in maintaining coherent motion and avoiding artifacts across frames.

As an example, consider a scenario where the system aims to generate intermediate frames and novel views for a video sequence of a moving object. The frame interpolation and view synthesis subsystem 500 can perform the following steps. Keyframe selection wherein the subsystem selects keyframes from the input video sequence at regular intervals (e.g., every 10th frame) to capture the motion of the object. Frame interpolation wherein the subsystem encodes the selected keyframes using the GAN's generator network. It then performs latent space interpolation between the keyframe representations to generate intermediate latent vectors. The interpolated latent vectors are decoded by the generator to create intermediate frames that smoothly transition between the keyframes. View synthesis wherein the subsystem estimates the camera pose for novel views of the moving object. It conditions the GAN's generator network with the desired camera pose information. The conditioned generator synthesizes novel views of the object from different angles while maintaining consistency with the original scene. Temporal consistency wherein the subsystem estimates the optical flow between the generated frames and incorporates it to ensure smooth motion and consistency. It may also employ a temporal discriminator to assess the realism and coherence of the generated video sequence. The system outputs a video sequence that includes the original keyframes, interpolated intermediate frames, and synthesized novel views of the moving object. The resulting video showcases smooth transitions, consistent motion, and the ability to view the object from different perspectives. By leveraging the frame interpolation and view synthesis subsystem 500, the system 100 can generate visually coherent and temporally consistent scene continuity. It enables the creation of smooth transitions between keyframes and the exploration of novel viewpoints, enhancing the flexibility and creative possibilities in visual media production.

The effectiveness of this subsystem 500 relies on the quality of the trained generative models, the accuracy of camera pose estimation, and the robustness of the interpolation and synthesis techniques. The subsystem's functionality can be further enhanced by incorporating additional techniques such as image inpainting, object tracking, and semantic understanding to handle complex scenes and improve the realism of the generated content.

Image inpainting techniques can be used to fill in missing or occluded regions in the generated scene continuity content. This is particularly useful when dealing with complex scenes where objects may be partially visible or obscured. By integrating image inpainting algorithms, such as those based on deep learning or patch-based approaches, the system can automatically complete missing portions of the scene, ensuring a more coherent and visually pleasing result. The inpainting techniques may be applied as a post-processing step after the initial scene continuity content is generated. It can analyze the generated frames, identify regions that require inpainting, and apply the appropriate inpainting technique to fill in the missing information. The inpainting process can be guided by the surrounding context, texture, and structure of the scene to ensure a seamless integration of the filled-in regions.

Object tracking techniques can be incorporated to improve the consistency and realism of object movements and interactions within the generated scene continuity content. By tracking objects across frames, the system can ensure that their positions, velocities, and trajectories are maintained consistently throughout the scene. Object tracking algorithms, such as those based on deep learning (e.g., Siamese networks, YOLO, or Mask R-CNN), can be applied to the generated frames to detect and track specific objects of interest. The tracking information can be used to guide the generation process, ensuring that the movement and placement of objects remain coherent and realistic. The object tracking techniques can work in conjunction with the frame interpolation and view synthesis subsystems. It can provide additional constraints and guidance to ensure that the interpolated frames and synthesized views maintain the correct object positions and movements. This enhances the overall realism and consistency of the generated scene continuity content.

Incorporating semantic understanding techniques can enable the system to comprehend and reason about the content and context of the scenes being generated. By leveraging deep learning models for semantic segmentation, object recognition, or scene parsing, the system can gain a higher-level understanding of the scene elements and their relationships. Semantic understanding can be applied at various stages of the scene continuity generation process. During the preprocessing stage, semantic information can be extracted from the training data to provide additional guidance and constraints for the generative models. For example, the system can learn to generate content that adheres to specific semantic rules or constraints, such as maintaining proper object-object interactions or preserving the semantic consistency of the scene. During the post-processing stage, semantic understanding can be used to refine and enhance the generated content. The system can analyze the generated frames, identify any semantic inconsistencies or anomalies, and make appropriate adjustments to improve the realism and coherence of the scene. This can involve techniques such as semantic-aware inpainting, object removal or replacement, or scene manipulation based on semantic information. By incorporating semantic understanding, the system can generate scene continuity content that not only looks realistic but also makes sense from a semantic perspective. It can ensure that the generated scenes adhere to logical and coherent relationships between objects, actions, and environments.

Figure 6:
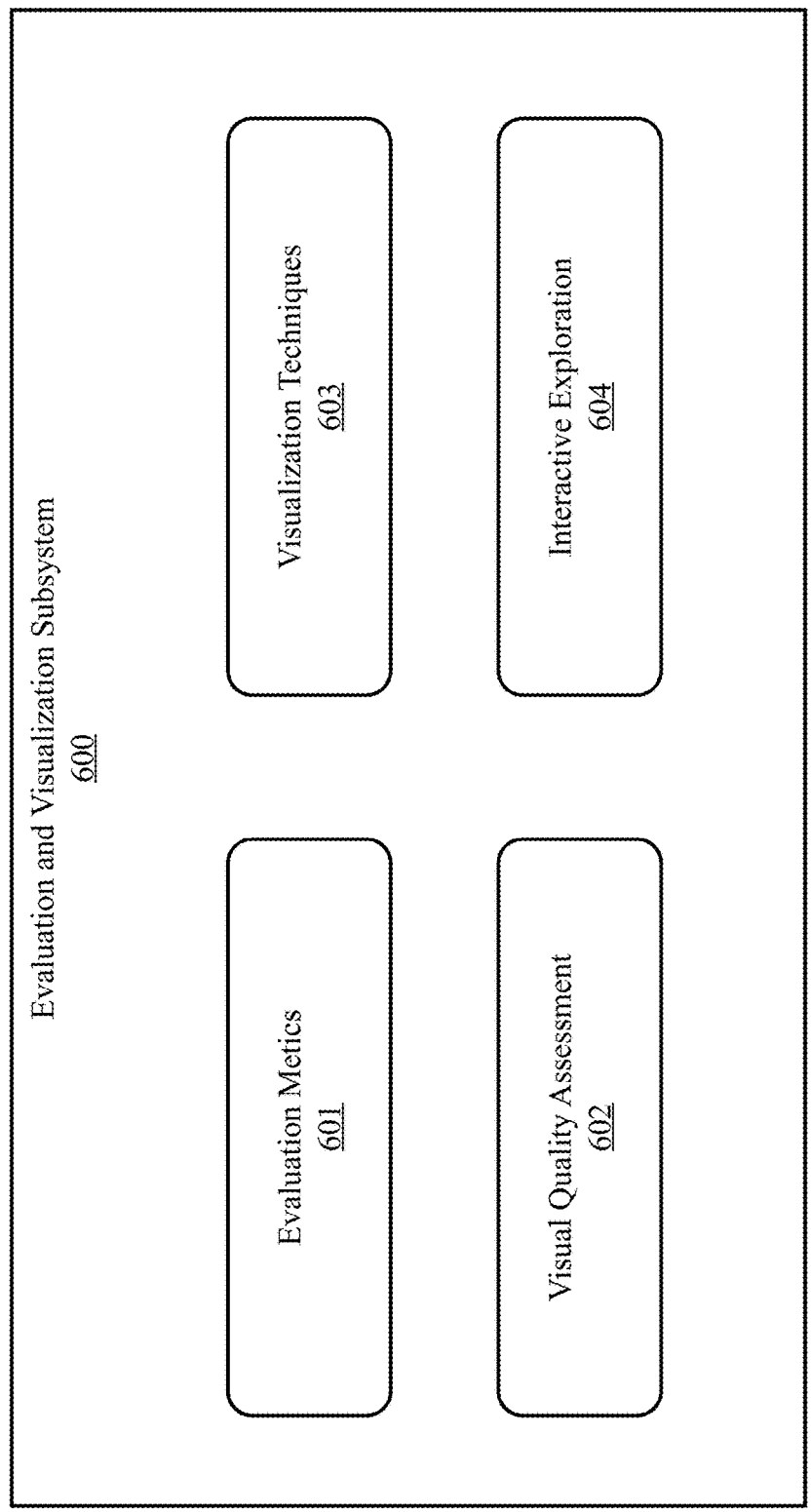
FIG. 6 is a block diagram illustrating an exemplary aspect of a system for generating scene continuity in visual media, an evaluation and visualization subsystem.

FIG. 6 is a block diagram illustrating an exemplary aspect of a system for generating scene continuity in visual media, an evaluation and visualization subsystem 600. According to the aspect, evaluation and visualization subsystem 600 is responsible for assessing the quality and realism of the generated scene continuity and providing visual feedback to users. It incorporates various metrics and techniques to quantify the performance of the GAN model and enables users to interpret and analyze the generated content. According to the aspect, evaluation and visualization subsystem 600 comprises components and techniques for evaluation 601, visual quality assessment 602, visualization 603, and interactive exploration 604.

According to the aspect, the subsystem 600 utilizes a plurality of evaluation metrics 601 to assess the quality and realism of the generated scene continuity. These metrics capture different aspects of the generated content, such as visual fidelity, temporal coherence, and diversity. Some commonly used evaluation metrics include, but are not limited to, Fréchet Inception Distance (FID), Structural Similarity Index (SSIM), Peak Signal-to-Noise Ratio (PSNR), and temporal consistency metrics. FID measures the similarity between the distribution of features in the generated frames and the distribution of features in real frames. It uses the Inception network to extract features and computes the Fréchet distance between the feature distributions. SSIM assesses the perceptual similarity between generated frames and real frames. It considers luminance, contrast, and structural information to quantify the visual quality of the generated content. PSNR measures the ratio between the maximum possible power of a signal and the power of corrupting noise. It is used to evaluate the pixel-level accuracy of the generated frames compared to the ground truth. Temporal consistency metrics, such as the Temporal Inception Distance (TID) or the Temporal Coherence Score (TCS), assess the smoothness and coherence of motion in the generated video sequences. These metrics consider the consistency of features and motion patterns across consecutive frames.

Additionally, or alternatively, to quantitative metrics, the subsystem 600 incorporates visual quality assessment techniques 602 to evaluate the perceptual quality of the generated scene continuity. These techniques typically involve human judgment and subjective evaluation of the generated content. These techniques may include user studies wherein the subsystem 600 facilitates user studies where human participants rate the visual quality, realism, and coherence of the generated frames or video sequences. The collected user feedback provides insights into the perceptual quality of the generated content. Expert evaluation may be implemented wherein the subsystem enables expert evaluation by visual media professionals who assess the generated scene continuity based on their domain knowledge and aesthetic criteria. Their feedback helps in identifying strengths, weaknesses, and areas for improvement in the generated content.

The subsystem 600 may also provide various visualization techniques 603 to present the generated scene continuity and facilitate analysis and interpretation. These techniques may include, but are not limited to, frame comparison, video playback, interpolation visualization, and view synthesis information. The subsystem can display generated frames side-by-side with the corresponding real frames or keyframes. This allows users to visually compare the quality and consistency of the generated content with the original scene. The subsystem enables the playback of generated video sequences, allowing users to observe the temporal consistency, smoothness, and realism of the scene continuity. The subsystem can visualize the intermediate frames generated through frame interpolation, highlighting the smooth transitions between keyframes. The subsystem may present the synthesized novel views of the scene from different camera angles, enabling users to explore and analyze the consistency and coherence of the generated content.

The subsystem 600 may provide an interactive interface 604 for users to explore and analyze the generated scene continuity. It allows users to select and navigate through specific frames or video sequences, adjust parameters such as the number of interpolated frames, camera angles, or conditional inputs, compare the generated content with the original scene or ground truth data, and provide feedback and annotations to guide further refinement and improvement of the generated content. Based on the evaluation metrics, visual quality assessment, and/or user feedback, the subsystem 600 analyzes the strengths and weaknesses of the generated scene continuity. It identifies areas for improvement, such as enhancing the realism of certain frames or refining the temporal consistency. The insights gained from the evaluation and visualization process guide the iterative refinement of the generative models and the overall system.

By incorporating the evaluation and visualization subsystem 600, the system 100 for generating scene continuity benefits from quantitative and qualitative assessment of the generated content. It enables users to visually examine the quality, realism, and coherence of the generated frames and video sequences. The subsystem facilitates user interaction, feedback, and interpretation, promoting a collaborative and iterative approach to improving the generated scene continuity.

Figure 7:
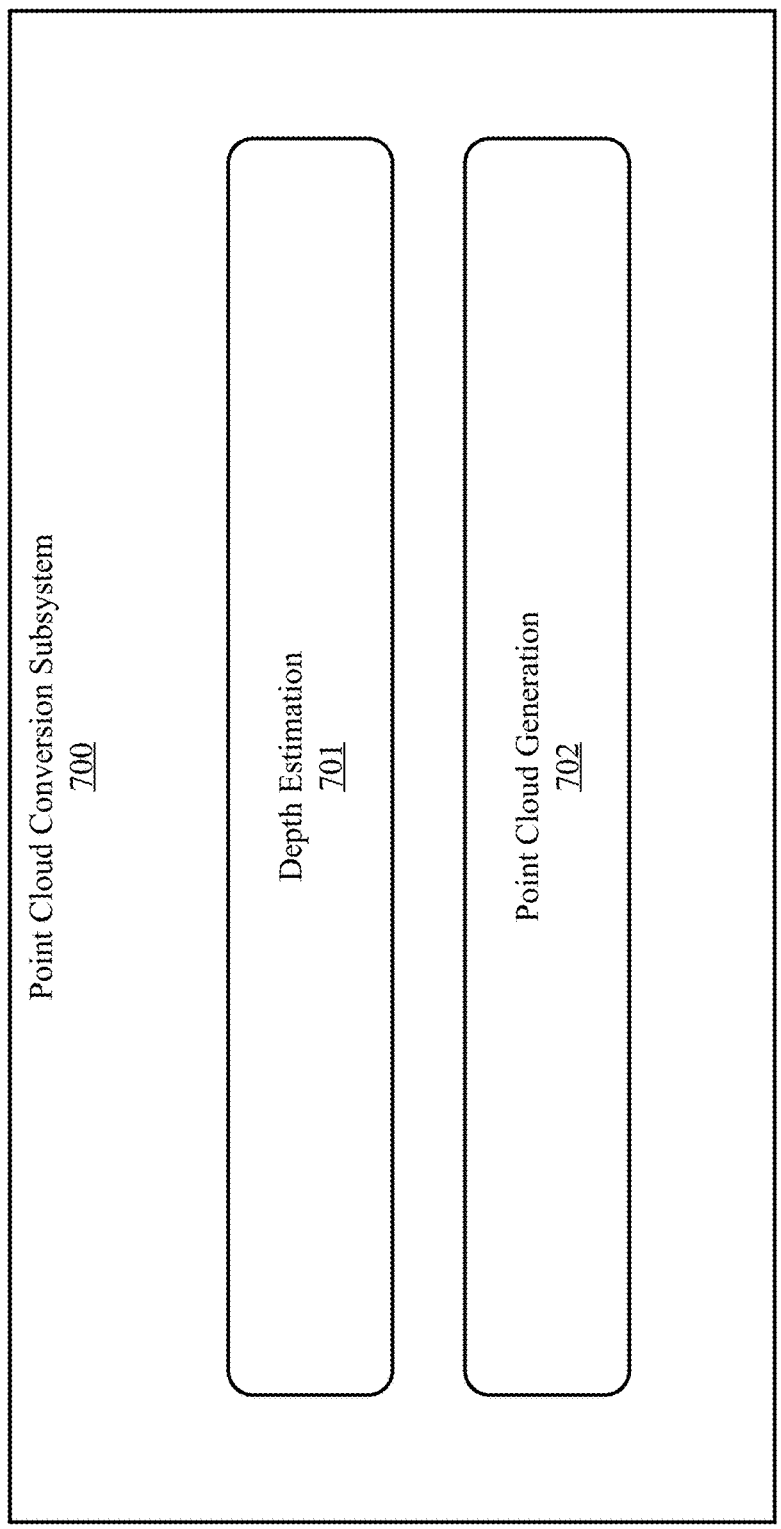
FIG. 7 is a block diagram illustrating an exemplary aspect of a system for generating scene continuity in visual media, a point cloud conversion subsystem.

FIG. 7 is a block diagram illustrating an exemplary aspect of a system for generating scene continuity in visual media, a point cloud conversion subsystem 700. According to the aspect, point cloud conversion subsystem 700 is an important component in the system for generating scene continuity in visual media, particularly when dealing with 3D data or when integrating 2D and 3D content. This subsystem focuses on converting 2D images or video frames into 3D point cloud representations, enabling the system to handle and manipulate 3D data efficiently. According to the aspect, point cloud conversion subsystem 700 comprises components and techniques for depth estimation 701 and point cloud conversion 702. According to the aspect, point cloud conversion subsystem 700 may leverage advanced computer vision techniques and deep learning algorithms to estimate depth information from 2D images and generate accurate 3D point clouds.

Depth estimation 701 is the process of predicting the distance of each pixel in a 2D image from the camera or viewpoint. This may be achieved using deep learning models, such as convolutional neural networks (CNNs), that are specifically designed and trained for depth estimation tasks. These models learn to map the 2D image input to a corresponding depth maps, where each pixel value represents the estimated depth.

The depth estimation models can be trained on large-scale datasets that contain paired 2D images and their corresponding ground truth depth maps. The training process involves minimizing the difference between the predicted depth maps and the ground truth depth maps using loss functions such as mean squared error or mean absolute error. The models learn to capture the geometric and contextual cues present in the images to infer accurate depth information.

Once the depth estimation model is trained, it can be applied to new 2D images or video frames to predict depth maps in real-time. The predicted depth maps provide a dense representation of the depth information for each pixel in the input image. The next step is to convert the depth maps into 3D point clouds. A point cloud is a set of data points in 3D space, where each point represents a specific location in the scene. To generate a point cloud from a depth map, the subsystem may apply a camera projection model, such as the pinhole camera model, to map each pixel in the depth map to its corresponding 3D coordinates.

The camera projection model takes into account the intrinsic parameters of the camera, such as focal length and principal point, to accurately project the 2D pixels into 3D space. By combining the pixel coordinates and their associated depth values, the subsystem 700 computes the 3D coordinates of each pixel in the image. The resulting point cloud represents the 3D structure of the scene captured in the 2D image.

To enhance the quality and density of the generated point clouds, the subsystem 700 may employ additional techniques such as point cloud upsampling or densification. These techniques aim to increase the number of points in the point cloud while maintaining the geometric fidelity of the scene. Upsampling methods, such as deep learning-based approaches like PU-Net or MPU, learn to generate dense point clouds from sparse inputs by leveraging the contextual information and local geometry of the scene.

In some embodiments, LiDAR enhancements, SLAM (Simultaneous Localization and Mapping), and entity tracking can be incorporated into the scene generation system. LiDAR is a remote sensing technology that uses laser pulses to measure distances and create detailed 3D representations of the environment. Incorporating LiDAR data into the scene generation system can significantly enhance the accuracy and realism of the generated scenes. The system can utilize LiDAR data to capture high-resolution 3D point clouds of real-world environments. These point clouds provide precise geometric information about objects, structures, and terrain. By integrating LiDAR data into the scene generation process, the system can create scenes with accurate spatial relationships, dimensions, and occlusions. LiDAR data can be used to generate realistic 3D models of objects and environments, which can then be incorporated into the generated scenes. The system can leverage LiDAR-based 3D reconstruction techniques to create detailed and spatially accurate representations of buildings, landscapes, and other scene elements.

SLAM is a technique used in robotics and computer vision to simultaneously construct a map of an unknown environment and estimate the observer's location within that map. Integrating SLAM capabilities into the scene generation system can enable dynamic and interactive scene generation based on real-time sensor data. The system can utilize SLAM algorithms to process visual data (e.g., images or videos) from cameras or other sensors to estimate the observer's position and orientation within the scene. By tracking the observer's movement and mapping the environment in real-time, the system can generate scenes that adapt to the observer's perspective and maintain spatial consistency. SLAM can be applied not only to the observer's position but also to any entity within the visible frame being evaluated. By tracking the motion and location of individual entities, such as characters or objects, the system can generate scenes that accurately reflect their spatial relationships and interactions over time.

The scene generation system can benefit from the fusion of multiple sensor modalities, such as visible light cameras, infrared (IR) sensors, and LiDAR. Each sensor type provides unique information about the environment, and combining their data can enhance the accuracy and robustness of the generated scenes. Visible light cameras capture the appearance and color information of the scene, while IR sensors can detect heat signatures and provide visibility in low-light conditions. LiDAR, as mentioned earlier, provides high-resolution 3D point clouds. By fusing data from these different sensors, the system can generate scenes with rich visual details, accurate depth information, and enhanced object recognition capabilities.

To generate believable and consistent scenes, the system can be configured to track the locality of entities across frames. This involves monitoring the spatial relationships and interactions between entities over time. The system can employ object detection and tracking algorithms to identify and follow specific entities, such as characters or objects, throughout the scene. By analyzing the motion and proximity of entities, the system can maintain their coherent behavior and interactions across frames. For example, in a scene where James Bond is escaping from an explosion near his car, the system would track the positions and movements of both James Bond and the car relative to each other and the surrounding environment. This information can be used to generate consistent and believable sequences of events, such as James Bond diving for cover or the car being affected by the explosion's shockwave.

To enhance the realism and believability of the generated scenes, the system can incorporate physics simulations and evaluate the plausibility of entity interactions and movements. Physics engines, such as MUCOJO (Multi-Constraint Joint Optimization) or other physics simulation frameworks, can be integrated into the scene generation system. These engines simulate the physical behavior of objects, characters, and environments based on real-world physics laws and constraints. The system can iteratively generate and evaluate scenes using physics simulations to assess their believability. By simulating the dynamics of entities and their interactions, the system can identify and correct implausible or inconsistent behaviors. This feedback loop allows the system to refine the generated scenes and ensure they adhere to physical realism. For example, in the James Bond scenario, the physics simulation can evaluate the plausibility of James Bond's movements, the car's response to the explosion, and the propagation of debris and shockwaves. By iteratively adjusting the scene based on the simulation results, the system can generate a more believable and physically consistent sequence of events.

Incorporating LiDAR enhancements, SLAM, multi-modal sensor fusion, entity tracking, and physics simulations into the scene generation system enables the creation of highly realistic, spatially accurate, and dynamically adaptive scenes. These techniques allow the system to capture and represent real-world environments, track the movement and interactions of entities, and ensure the physical plausibility of the generated content. By leveraging these advanced technologies and techniques, the scene generation system can produce scenes that are not only visually compelling but also coherent, believable, and responsive to real-time sensor input. This enhances the immersion, interactivity, and realism of the generated scenes, making them suitable for a wide range of applications, such as virtual reality, gaming, film production, and training simulations.

According to the aspect, point cloud conversion subsystem 700 may also incorporate techniques for point cloud post-processing and refinement. This can include, but is not limited to, tasks such as noise reduction, outlier removal, and surface reconstruction. Noise reduction techniques aim to remove spurious or noisy points from the point cloud, improving its overall quality. Outlier removal methods identify and discard points that significantly deviate from the main structure of the scene. Surface reconstruction algorithms, such as Poisson surface reconstruction or Delaunay triangulation, create a continuous 3D mesh or surface from the point cloud, providing a more visually coherent representation of the scene.

As an example, consider a scenario where point cloud conversion subsystem 700 is used in the context of generating scene continuity for a video sequence of a moving object. The subsystem would process each frame of the video sequence independently, converting them into 3D point clouds. For each frame, the depth estimation model predicts a depth map, assigning a depth value to each pixel in the frame. The camera projection model then maps these pixels to their corresponding 3D coordinates, generating a point cloud representation of the object and its surroundings. The point clouds capture the 3D structure and geometry of the object at each time step, allowing for more accurate and realistic scene continuity generation. The generated point clouds can be further processed and refined using techniques like noise reduction and surface reconstruction to improve their quality and coherence. These point clouds serve as intermediate representations that can be integrated into the overall system for generating scene continuity.

By leveraging point cloud conversion subsystem 700, the system 100 can handle and manipulate 3D data, enabling more advanced and immersive scene continuity generation. The module bridges the gap between 2D images and 3D representations, allowing for seamless integration of 2D and 3D content in the visual media production pipeline. The use of 3D point clouds can allow the system 100 to convert images from a 2D camera to a 3D image sequence with enough fidelity that a user (director, photographer, cinematographer, etc.) may need not use 3D cameras very much or at all. 3D point cloud representations may be used for scene calibration similar to how light meters are commonly used in traditional photography. This could enable periodic 3D snapshots (more similar to a Matterport scan) to complement 2D film and video capture to avoid full 3D capture and also to enable digital "re-filming" to occur in post-production. The point cloud representations provide a rich and informative representation of the scene geometry, facilitating tasks such as 3D rendering, view synthesis, and spatial analysis. The point cloud conversion process enhances the system's capability to generate realistic and spatially coherent scene continuity, opening up new possibilities for visual effects, virtual reality, and immersive experiences in visual media production.

Figure 8:
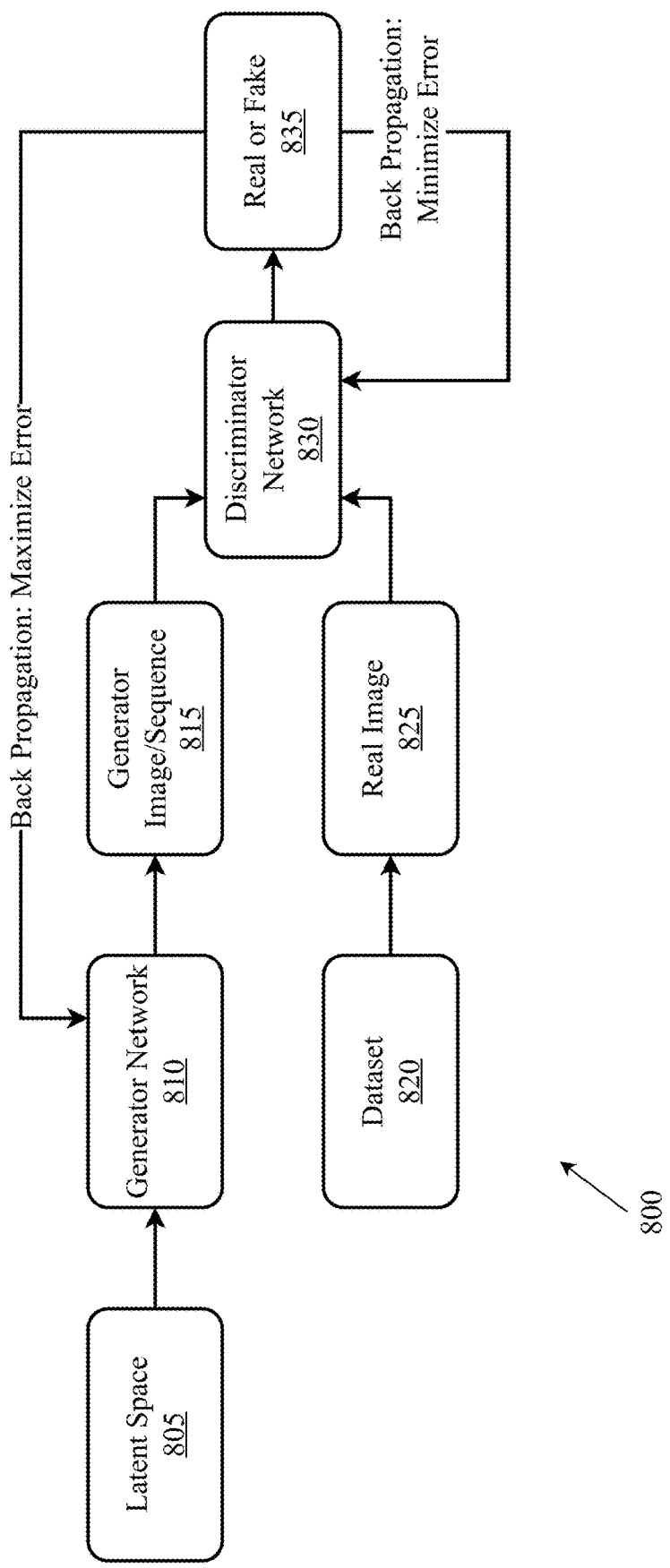
FIG. 8 is diagram illustrating an exemplary network architecture for a generative adversarial network, according to an embodiment.

FIG. 8 is diagram illustrating an exemplary network architecture for a generative adversarial network 800, according to an embodiment. According to various embodiments, the generator network 810 is a fundamental component of the system for generating scene continuity in visual media. It is responsible for creating realistic and coherent frames or video sequences based on the input conditions and random noise. The generator network learns to map the input space to the output space, effectively capturing the complex distribution of the training data and generating novel content that resembles the real data.

According to an aspect, generator network 810 is typically implemented as a deep convolutional neural network (CNN) architecture. The specific architecture varies depending on the chosen GAN variant and the requirements of the scene continuity task. Popular architectures for video generation include 3D CNNs, which can capture both spatial and temporal dependencies, and 2D CNNs combined with recurrent neural networks (RNNs) to model temporal dynamics.

The generator network 810 takes a random noise vector as input, which serves as a latent representation of the generated content. The noise vector is typically sampled from a standard distribution (e.g., latent space 805), such as a Gaussian or uniform distribution, and has a fixed dimensionality. This random noise introduces stochasticity into the generation process, enabling the generator to produce diverse and varied outputs.

According to an aspect, generator network 810 consists of a series of convolutional layers that progressively upsample and transform the input noise and conditional information into the desired output resolution. The convolutional layers learn hierarchical features that capture the spatial and temporal patterns present in the training data. Activation functions, such as ReLU or leaky ReLU, are applied after each convolutional layer to introduce non-linearity and enable the network to learn complex mappings.

To ensure the stability and quality of the generated content 815, various techniques may be implemented in the generator network. Normalization layers, such as batch normalization or instance normalization, can be used to normalize the activations and improve the training dynamics. Skip connections, as used in architectures like U-Net or ResNet, allow the network to propagate information across different scales and help in preserving fine details.

The generator network is trained adversarially alongside the discriminator network 830. During training, the generator aims to fool the discriminator by producing realistic and coherent content that is indistinguishable from real data. The generator's loss function is designed to optimize the quality and realism of the generated frames or video sequences. Common loss functions include the adversarial loss, which encourages the generator to produce samples that are classified as real by the discriminator, and the perceptual loss, which measures the similarity between the generated content and the ground truth 825 based on high-level features extracted from a pre-trained CNN.

Consider an example scenario where the generator network 810 is used to generate scene continuity for a video sequence of a person walking in a park. The input to the generator may be a random noise vector concatenated with conditional information, such as the keyframes of the person at different time steps and the desired camera angles. The generator network would process this input through a series of convolutional layers, gradually upsampling and refining the representation to generate realistic frames of the person walking.

The generated frames would capture the appearance, motion, and coherence of the original video sequence. The generator network would learn to synthesize realistic textures, preserve the identity of the person across frames, and maintain temporal consistency in the generated video. By incorporating the conditional information, the generator can control the generated content, ensuring that the person's movements align with the provided keyframes and that the camera angles match the specified viewpoints.

During training, the generator network iteratively updates its parameters based on the feedback from the discriminator and the optimization of the loss functions. The goal is to minimize the adversarial loss, making the generated frames indistinguishable from real frames, and to minimize the perceptual loss, ensuring that the generated content closely resembles the ground truth.

Once trained, generator network 810 can be used to generate novel scene continuity by providing new random noise vectors and conditional information. It can interpolate between keyframes to create smooth transitions, synthesize new camera angles, and generate coherent video sequences that maintain the style and content of the original data.

The effectiveness of the generator network relies on its ability to learn meaningful representations, capture the underlying data distribution, and generate high-quality and diverse samples. The choice of architecture, loss functions, and training techniques plays an important role in the performance and stability of the generator.

By leveraging the power of deep learning and adversarial training, GAN 800 enables the system to generate visually compelling and temporally coherent scene continuity. It opens up new possibilities for creative content generation, visual effects, and immersive experiences in the field of visual media production.

According to various embodiments, the discriminator network 830 is a fundamental component of the system for generating scene continuity 100 in visual media, playing a role in the adversarial training process of the generative adversarial network (GAN). The primary purpose of the discriminator is to distinguish between real 825 and generated frames or video sequences 815 (e.g., a sequence of semantic segmentation masks), providing feedback to the generator network to improve the quality and realism of the generated content.

According to an aspect, discriminator network 830 may be implemented as a deep convolutional neural network (CNN) architecture, designed to process and classify input frames or video sequences. The specific architecture of the discriminator may vary depending on the chosen GAN variant and the requirements of the scene continuity task. Common architectures for video discrimination include 3D CNNs, which can capture both spatial and temporal dependencies, and 2D CNNs combined with recurrent neural networks (RNNs) to model temporal dynamics.

The input to the discriminator network may be either a real frame/video sequence from the training dataset 820 or a generated frame/video sequence produced by generator network 810. The discriminator processes this input through a series of convolutional layers, which learn to extract hierarchical features that capture the spatial and temporal patterns present in the data. The convolutional layers are often followed by activation functions, such as ReLU or leaky ReLU, to introduce non-linearity and enable the network to learn complex decision boundaries.

As the input progresses through the layers of the discriminator, the spatial dimensions are gradually reduced while the number of feature channels increases. This allows the discriminator to capture both local and global information from the input data. Pooling layers, such as max pooling or average pooling, can be used to downsample the feature maps and provide translation invariance.

To enhance the discriminator's ability to capture temporal dependencies and coherence in video sequences, techniques such as 3D convolutions or recurrent neural networks can be employed. 3D convolutions operate on the spatial and temporal dimensions simultaneously, allowing the discriminator to learn spatio-temporal features. Recurrent neural networks, such as long short-term memory (LSTM) or gated recurrent units (GRU), can be used to model the temporal dynamics and capture long-range dependencies in the video sequences.

The output of the discriminator network is typically a single scalar value, representing the probability or likelihood of the input being real or generated 835. The discriminator is trained to assign high probabilities to real frames/sequences and low probabilities to generated ones. This is achieved by minimizing a loss function, such as the binary cross-entropy loss, which measures the discrepancy between the predicted probabilities and the ground truth labels.

During training, the discriminator and generator networks are trained alternately in an adversarial manner. The discriminator 830 aims to accurately classify real and generated samples, while the generator 810 tries to fool the discriminator by producing realistic and coherent content. The training process involves optimizing the parameters of both networks simultaneously, with the goal of reaching an equilibrium where the generator produces samples that are indistinguishable from real data.

Consider an example scenario where the discriminator network is used in the context of generating scene continuity for a video sequence of a person walking in a park. The discriminator receives both real video sequences of people walking and generated video sequences produced by the generator network. For each input video sequence, the discriminator processes the frames through its convolutional layers, extracting spatial and temporal features that capture the appearance, motion, and coherence of the person's movements. The discriminator learns to distinguish between the real and generated sequences based on the learned features and patterns. The discriminator assigns high probabilities to the real video sequences, recognizing them as authentic and coherent. On the other hand, it assigns low probabilities to the generated sequences that exhibit artifacts, inconsistencies, or unrealistic movements. The feedback from the discriminator is used to update the generator network, encouraging it to produce more realistic and temporally coherent video sequences. As the training progresses, the discriminator becomes increasingly skilled at identifying the subtle differences between real and generated sequences, while the generator improves its ability to generate convincing and coherent scene continuity. The adversarial training process continues until the generated sequences become nearly indistinguishable from the real ones, indicating that the generator has learned to capture the underlying distribution of the training data.

The effectiveness of the discriminator network relies on its capacity to learn meaningful and discriminative features, its ability to generalize unseen data, and its robustness to various forms of generated content. The choice of architecture, loss functions, and training techniques plays an important role in the performance and stability of the discriminator.

By leveraging the power of deep learning and adversarial training, the discriminator network serves as a critical component in the system for generating scene continuity 100. It provides the necessary feedback and guidance to the generator, enabling the production of visually compelling and temporally coherent video sequences. The discriminator's ability to distinguish between real and generated content helps ensure the quality and realism of the generated scene continuity, enhancing the overall effectiveness of the system in visual media production.

Figure 9:
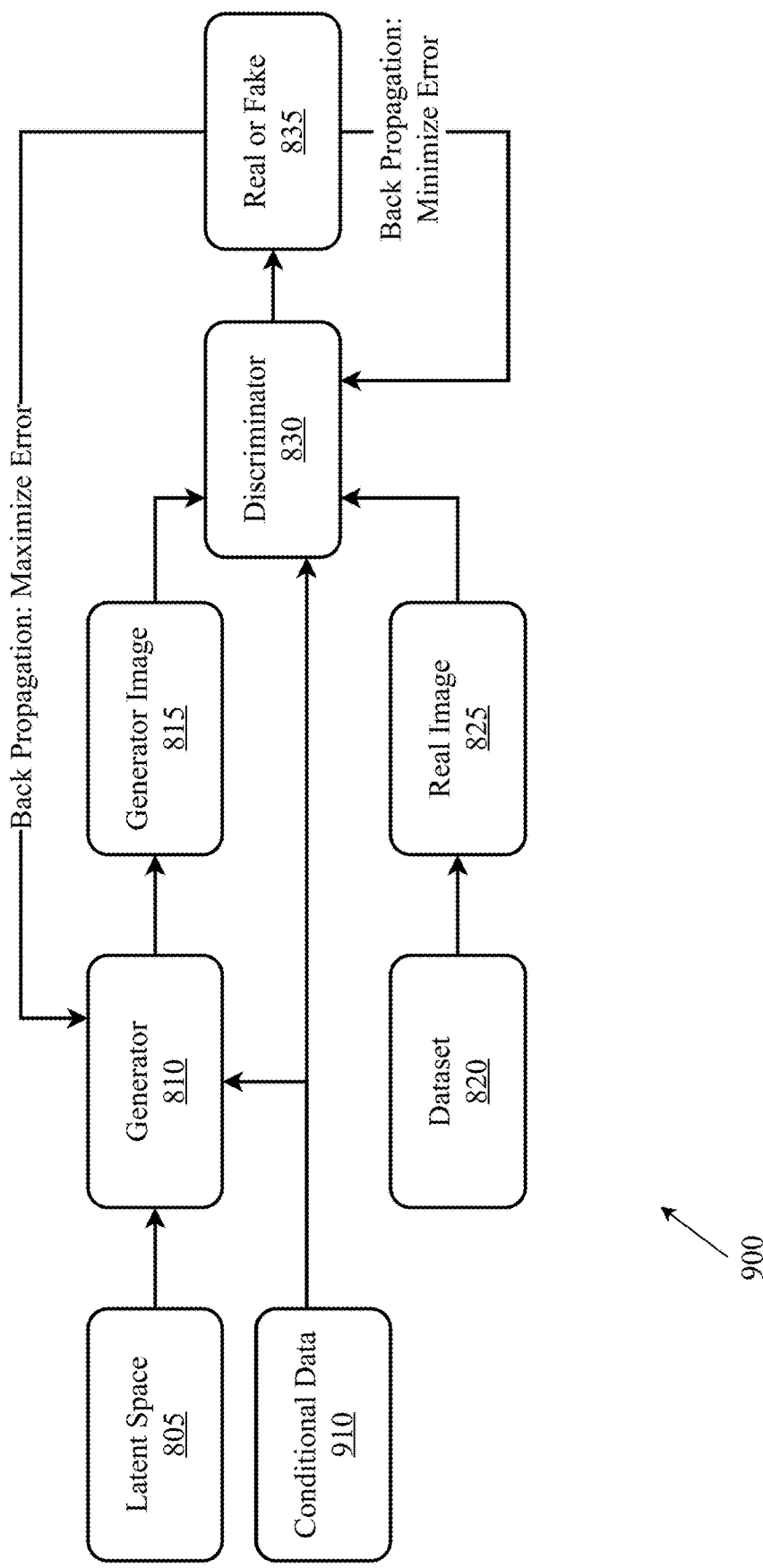
FIG. 9 is diagram illustrating an exemplary network architecture for a conditional generative adversarial network used to generate scene continuity in visual media, according to an embodiment.

FIG. 9 is diagram illustrating an exemplary network architecture for a conditional generative adversarial network 900 used to generate scene continuity in visual media, according to an embodiment. A conditional generative adversarial network (cGAN) is a variant of the standard GAN architecture that incorporates additional conditional information 910 to guide the generation process. In a cGAN, both the generator and the discriminator networks receive extra input in the form of labels, attributes, or other conditioning variables.

In addition to the random noise, the generator network often incorporates conditional information to guide the generation process. This conditional information can include keyframes, camera angles, or other semantic attributes that provide context and control over the generated content. The conditional information may be concatenated with the random noise vector or injected into the generator network at various layers using conditional batch normalization or adaptive instance normalization techniques.

The key idea behind cGANs is to provide the networks with more control over the generated outputs by conditioning them on specific information. This allows for more targeted and controllable generation of images, videos, or other types of data. In a cGAN, the generator network 810 takes both the random noise vector 805 and the conditional information 910 as input. The conditional information can be concatenated with the noise vector or fed into the generator through separate input channels. The generator learns to map the combined input to realistic outputs that satisfy the given conditions.

The discriminator network 830 in a cGAN also receives the conditional information 910 along with the real 825 or generated samples 815. It learns to distinguish between real and generated samples while considering the provided conditions. The discriminator's goal is to determine whether the input sample is real or generated and if it aligns with the given conditions.

During training, the generator aims to produce samples that not only fool the discriminator but also adhere to the specified conditions. The discriminator, in turn, tries to accurately classify the samples as real or generated while considering the conditions. The training objective is modified to incorporate the conditional information, often by adding a conditional loss term to the standard adversarial loss. By incorporating conditional information, cGANs provide more control and flexibility in generating specific types of data.

To address the challenge of integrating specialist models for different aspects of multimedia content generation, such as video, sound, and music, while ensuring greed/speed optimization, the scene generation system can employ a time-stepped reconciliation approach. This approach allows for the efficient coordination and synchronization of multiple specialist models to produce coherent and compelling multimedia content.

The scene generation system can incorporate separate specialist models for each aspect of multimedia content generation. These models are specifically trained and optimized for their respective domains, such as: Video Generation Model: This model focuses on generating visually coherent and realistic video sequences. It can be based on techniques such as generative adversarial networks (GANs), variational autoencoders (VAEs), or diffusion models. The video generation model takes into account the spatial and temporal dependencies to produce smooth and visually appealing video content. Sound Generation Model: The sound generation model specializes in generating realistic and synchronized sound effects and ambient audio for the generated scenes. It can utilize techniques such as WaveNet, SampleRNN, or generative audio models. The sound generation model takes into account the context and timing of the visual elements to produce appropriate and immersive audio. Music Generation Model: The music generation model focuses on composing and generating suitable background music or soundtracks for the generated scenes. It can employ techniques such as recurrent neural networks (RNNs), transformers, or music transfer learning. The music generation model considers the mood, pacing, and style of the visuals to generate complementary and emotionally engaging music.

To ensure greed/speed optimization and maintain coherence among the specialist models, the scene generation system can employ a time-stepped reconciliation approach. This approach involves the following steps. As a first step, time segmentation is performed: The overall scene generation process is divided into discrete time steps or segments. Each time step represents a short duration (e.g., a few seconds) of the multimedia content. The length of the time steps can be adjusted based on the desired granularity and computational efficiency. As a next step, independent generation is performed: For each time step, the specialist models generate their respective content independently. The video generation model produces the visual frames, the sound generation model generates the corresponding sound effects and ambient audio, and the music generation model composes the background music. Each model operates in parallel, leveraging its specialized knowledge and training to generate high-quality content. After the independent generation phase, the system performs a reconciliation and synchronization step. It aligns and integrates the generated content from each specialist model to create a coherent and synchronized multimedia experience. This may comprise ensuring that the visual frames, sound effects, and music are properly timed and matched. The reconciliation process may involve iterative refinement steps to optimize the overall quality and coherence of the multimedia content. The system can assess the generated content based on predefined metrics, such as visual-audio alignment, temporal consistency, or emotional impact. If necessary, the specialist models can be fine-tuned or adjusted based on the feedback from the reconciliation step to improve the generated content. The time-stepped reconciliation approach allows for progressive generation of the multimedia content. As each time step is processed, the generated content is accumulated and combined to form the final multimedia output. This enables the system to generate content incrementally, allowing for faster iteration and feedback cycles.

The time-stepped reconciliation approach enables greed/speed optimization in the scene generation process. By dividing the generation into smaller time steps and allowing the specialist models to operate independently, the system can leverage parallel processing and efficient resource utilization. Each specialist model can focus on generating high-quality content within its domain, without being constrained by the real-time synchronization with other models. This allows the models to be optimized for speed and efficiency, as they can generate content in parallel and at their own pace. The reconciliation step ensures that the independently generated content is properly aligned and synchronized, maintaining the overall coherence and quality of the multimedia output. The iterative refinement process allows for fine-tuning and optimization based on the feedback from the reconciliation step, enabling the system to strike a balance between speed and quality.

The time-stepped reconciliation approach also provides scalability and extensibility benefits. As new specialist models are developed or improved, they can be easily integrated into the scene generation system. Each specialist model can be trained and optimized independently, allowing for modular updates and enhancements. The reconciliation and synchronization step acts as a plug-and-play mechanism, enabling seamless integration of new or updated specialist models into the overall multimedia generation pipeline. This flexibility allows the system to adapt and evolve as advancements are made in individual domains of multimedia content generation. By employing a time-stepped reconciliation approach, the scene generation system can effectively address the integration of specialist models for video, sound, and music generation while optimizing for greed/speed. The approach enables parallel processing, efficient resource utilization, and iterative refinement to produce high-quality and coherent multimedia content. The time-stepped reconciliation approach strikes a balance between the independence of specialist models and the need for synchronization and coherence in the final multimedia output. It allows for faster iteration cycles, modular updates, and scalability as new specialist models are developed or improved.

To enable mix and match and 'looping' with simulation, gaming, and empirical observations for content generation in the scene generation system, several components and techniques can be integrated into the scene generation system 100. As discussed above, a modeling and simulation subsystem 150 may be utilized to facilitate the integration of simulations and/or simulation engines into the system 100. This may comprise the integration of physics-based simulation engines or frameworks into the scene generation system to enable realistic and dynamic behavior of objects and environments, and use these simulation techniques to model the interactions, collisions, and movements of entities within the generated scenes based on physical laws and constraints. Fluid dynamics, particle systems, and soft body simulations may be incorporated to enhance the realism of specific elements like liquids, smoke, cloth, or deformable objects. In an embodiment, the system can utilize simulation data as input or guidance for the content generation process, allowing the system to create scenes that adhere to physical principles and exhibit believable dynamics.

In addition, the system 100 can integrate popular gaming engines like Unity or Unreal Engine into the scene generation system to leverage their powerful rendering, physics, and scripting capabilities. For example, the system can utilize the gaming engine's asset management systems to incorporate pre-designed 3D models, textures, and animations into the generated scenes. Furthermore, the system can exploit the gaming engine's real-time rendering capabilities to visualize and interact with the generated content in real-time, enabling iterative refinement and user feedback. In an embodiment, the system implements game logic, AI behaviors, and scripting to control the behavior and interactions of entities within the generated scenes, adding interactivity and responsiveness.

According to an embodiment, the system is further configured to incorporate mechanisms to capture and integrate empirical observations from real-world data sources into the scene generation process. This may involve the use of computer vision techniques to analyze and extract relevant information from images, videos, or sensor data captured from real environments, and may employ machine learning algorithms to learn patterns, textures, and styles from empirical data and apply them to the generated content, enhancing its visual fidelity and realism. The system can utilize these data-driven approaches to guide the scene generation process based on real-world observations, ensuring that the generated content aligns with realistic patterns and distributions.

According to an embodiment, the system may develop and deploy algorithms and methods to seamlessly combine and blend elements from different sources, such as simulations, gaming assets, and empirical observations. For example, techniques like texture synthesis, style transfer, and domain adaptation may be implemented to harmonize the visual appearance and characteristics of the mixed elements. This may comprise the use of semantic segmentation and object recognition to identify and match corresponding elements across different modalities, enabling coherent integration. According to an aspect, the system can employ optimization techniques to ensure smooth transitions and consistent placement of the mixed elements within the generated scenes.

Furthermore, the system may incorporate looping mechanisms to enable iterative refinement and feedback loops in the content generation process. This can allow the system to generate initial scene content based on the integrated simulation, gaming, and empirical data, and then iteratively refine and improve the generated output. For example, the system can leverage techniques like generative adversarial networks or variational autoencoders to create feedback loops between the generator and discriminator components, driving the generation process towards more realistic and coherent results. The system can provide interactive tools and interfaces for users to manually adjust, edit, or provide feedback on the generated content, allowing for user-guided refinement and customization.

By incorporating these features and techniques, the scene generation system can leverage the power of simulations, gaming engines, and empirical observations to create rich, diverse, and realistic content. The mix and match capabilities allow for the combination of elements from different sources, while the looping and iteration mechanisms enable continuous refinement and improvement of the generated scenes.

Detailed Description of Exemplary Aspects

Figure 10:
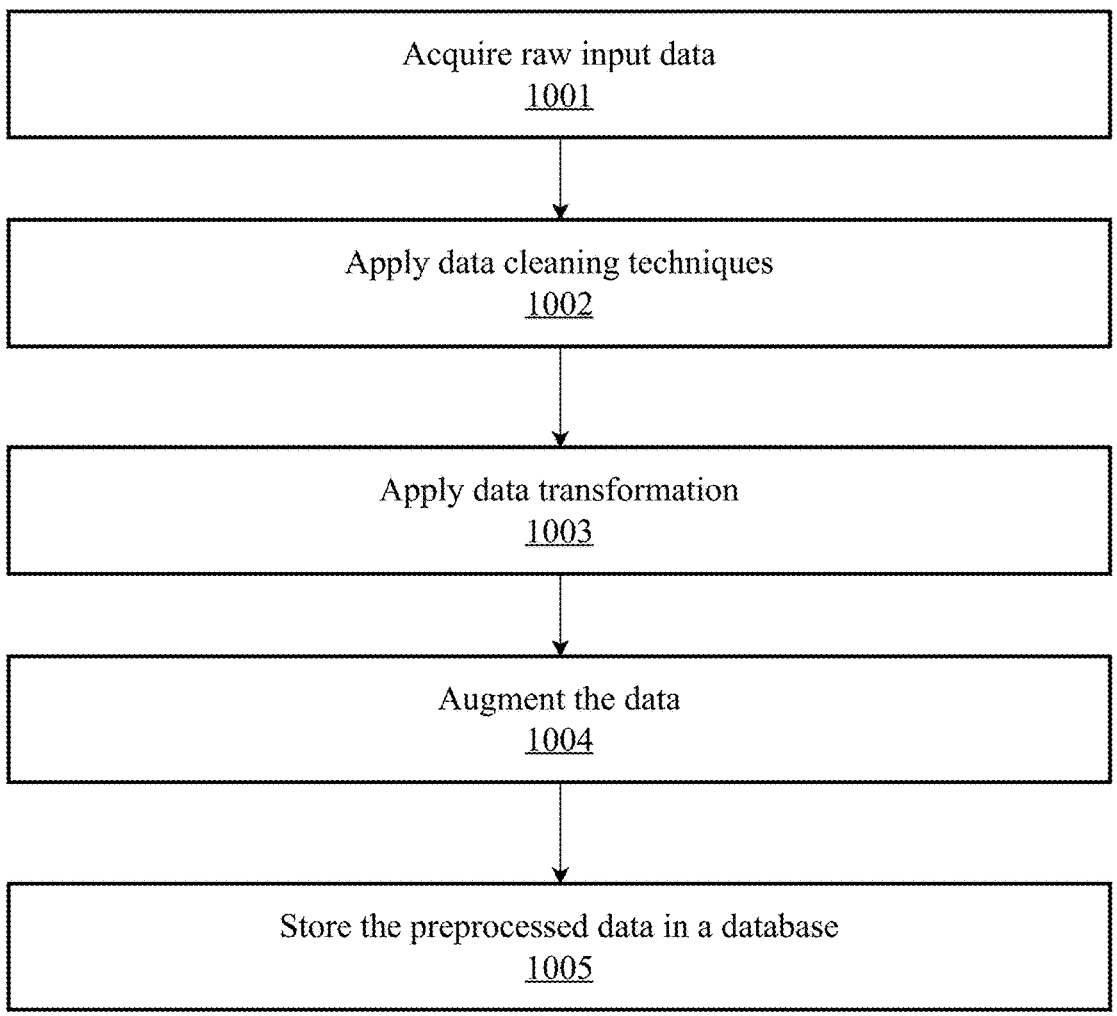
FIG. 10 is a flow diagram illustrating an exemplary method for preprocessing input data, according to an embodiment.

FIG. 10 is a flow diagram illustrating an exemplary method 1000 for preprocessing input data, according to an embodiment. According to the embodiment, the process begins at step 1001 by acquiring the raw input data from various sources, such as cameras, sensors, or existing datasets. The data can be in different formats, including images, videos, or 3D representations. Once the raw data is obtained, the method applies a series of cleaning techniques to remove any noise, inconsistencies, or irrelevant information at step 1002. These techniques may include filtering, outlier detection, or data normalization. In some cases, manual inspection and correction may be necessary to ensure the quality and integrity of the data. After cleaning, the method proceeds to step 1003 with data transformation to convert the data into a suitable format for training the scene generation models. Depending on the specific requirements of the models, various transformation techniques can be applied. For example, images may be resized to a consistent resolution, color spaces may be converted, or feature scaling may be performed to normalize the data. In some cases, more advanced techniques like data compression or dimensionality reduction may be employed to optimize the data representation. Data augmentation is then performed to expand the training dataset and introduce variability at step 1004. Augmentation techniques can include geometric transformations (e.g., rotation, scaling, flipping), color adjustments (e.g., brightness, contrast, hue), or adding synthetic noise or occlusions. The choice of augmentation techniques depends on the specific domain and the desired level of diversity in the generated scenes. Augmentation can be performed online during training or offline to create an augmented dataset. As a last step 1005 the processed data may be stored in a suitable database for and retrieved as necessary to perform various actions such as model training.

Alternative approaches to data preprocessing may involve using transfer learning or domain adaptation techniques. Transfer learning leverages pre-trained models or features from related domains to improve the performance of the scene generation models. Domain adaptation techniques aim to bridge the gap between different data distributions, enabling the models to generalize well to new or unseen data.

Figure 11:
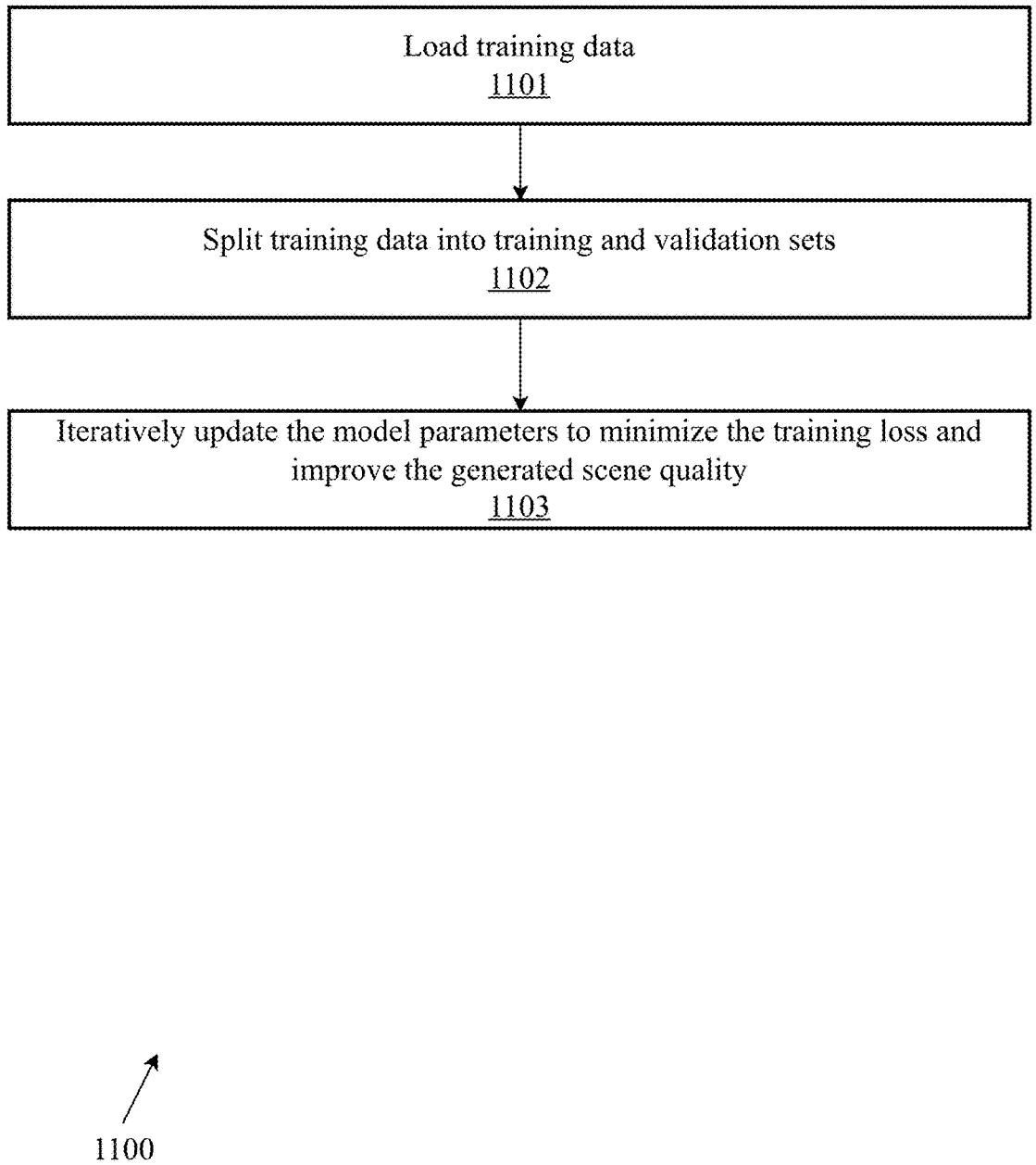
FIG. 11 is a flow diagram illustrating an exemplary method for training one or more generative models, according to an embodiment.

FIG. 11 is a flow diagram illustrating an exemplary method 1100 for training one or more generative models, according to an embodiment. The model training process begins by defining the architecture and hyperparameters of the generator and discriminator models. The architecture specifies the layers, activation functions, and connectivity of the neural networks. Hyperparameters, such as learning rate, batch size, and regularization techniques, are set based on empirical evidence or prior knowledge. According to the embodiment, the process begins at step 1101 when training data is loaded and preprocessed, which may involve techniques like data normalization, shuffling, or batching. The data is split into training and validation sets to monitor the model's performance during training and prevent overfitting at step 1102. In some cases, cross-validation techniques may be used to obtain more robust performance estimates. At step 1103 the training process involves iteratively updating the model parameters to minimize the training loss and improve the generated scene quality. The generator and discriminator are trained alternately, with the generator aiming to produce realistic scenes and the discriminator trying to distinguish between real and generated scenes. Various optimization algorithms, such as stochastic gradient descent or Adam, are used to update the model parameters based on the calculated gradients. During training, techniques like weight initialization, learning rate scheduling, or gradient clipping can be applied to stabilize and speed up the training process. Regularization techniques, such as L1/L2 regularization or dropout, can be incorporated to prevent overfitting and improve generalization.

Alternative training strategies may include progressive growing of the models, where the resolution of the generated scenes is gradually increased during training. This approach allows for more stable and efficient training of high-resolution scenes. Another variation is the use of adversarial loss functions, such as Wasserstein loss or hinge loss, which can improve the stability and quality of the generated scenes.

Figure 12:
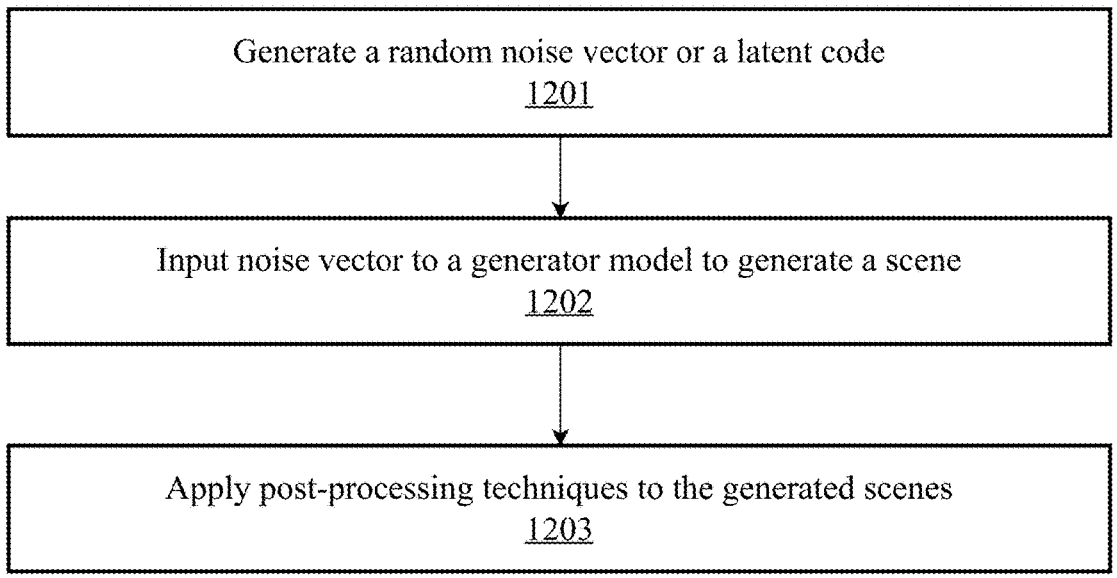
FIG. 12 is a flow diagram illustrating an exemplary method for scene generation, according to an embodiment.

FIG. 12 is a flow diagram illustrating an exemplary method 1200 for scene generation, according to an embodiment. According to the embodiment, the process begins at step 1201 by generating a random noise vector or a latent code that serves as the input to the generator model. The noise vector is typically sampled from a uniform or Gaussian distribution and represents the latent space of the scene. In some cases, the noise vector can be conditioned on additional information, such as scene labels or semantic attributes, to provide more control over the generated content. At step 1202 the generator model takes the noise vector as input and applies a series of learned transformations and mappings to generate the scene. These transformations can include convolutional layers, upsampling operations, or attention mechanisms, depending on the specific architecture of the generator. The generator gradually upsamples and refines the latent representation to produce a high-resolution scene. During the generation process, techniques like feature normalization, residual connections, or style transfer can be employed to improve the quality and coherence of the generated scenes. In some cases, multiple generators or hierarchical approaches may be used to generate different aspects of the scene, such as the background, foreground objects, or textures. Post-processing techniques can be applied to the generated scenes to enhance their visual quality and realism at step 1203. These techniques may include color correction, tone mapping, or adding specific effects like depth of field or motion blur. In some cases, domain-specific post-processing, such as shadow generation or physically-based rendering, may be employed to improve the authenticity of the generated scenes.

Alternative approaches to scene generation may involve using conditional generative models, where the generation process is guided by additional input information. For example, the generator can be conditioned on semantic labels, sketches, or partial scenes to provide more control and specificity in the generated content. Another variation is the use of generative models based on autoregressive or flow-based architectures, which can generate scenes in a sequential or iterative manner.

Figure 13:
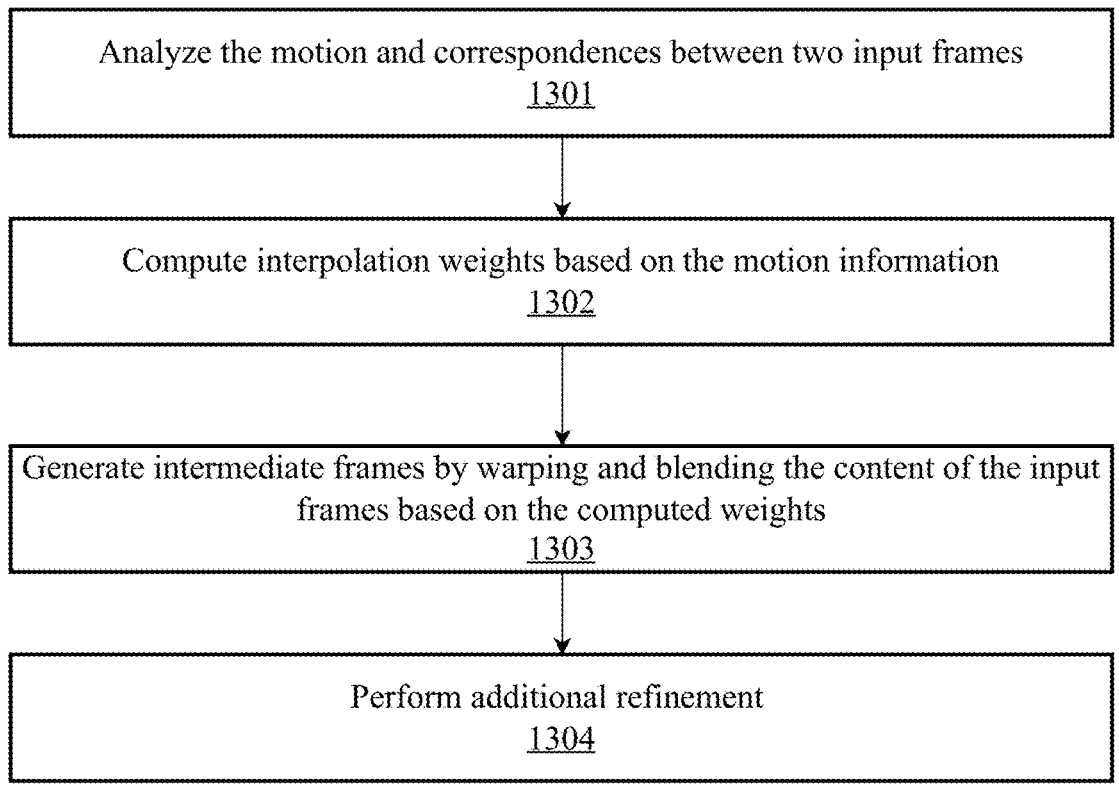
FIG. 13 is a flow diagram illustrating an exemplary method for performing frame interpolation, according to an embodiment.

FIG. 13 is a flow diagram illustrating an exemplary method 1300 for performing frame interpolation, according to an embodiment. The frame interpolation method aims to generate intermediate frames between two given frames to create smooth transitions and increase the temporal resolution of a video sequence. According to the embodiment, the process begins at step 1301 by analyzing the motion and correspondence between the two input frames. This can be done using techniques like optical flow estimation or feature matching to identify the movement of objects or pixels between the frames. Based on the motion information, the method computes interpolation weights that determine how the content of the input frames should be blended to generate the intermediate frames at step 1302. These weights can be calculated using linear interpolation or more advanced techniques (e.g., optical flow, phase-based interpolation, deep learning interpolation, adaptive interpolation, and multi-frame interpolation, where multiple input frames are considered to provide more context and improve the interpolation quality) that consider the motion trajectories and occlusion handling.

Optical flow is a technique that estimates the motion of pixels between two frames. In the context of frame interpolation, optical flow can be used to calculate the interpolation weights based on the motion vectors. The method starts by computing the optical flow between the two input frames using algorithms like Horn-Schunck, Lucas-Kanade, or more advanced deep learning-based approaches such as FlowNet or PWC-Net. The optical flow vectors provide the displacement of pixels from one frame to another. These vectors can be used to warp the input frames and generate intermediate frames. The interpolation weights are determined based on the magnitude and direction of the optical flow vectors. Pixels with larger motion displacements receive higher weights, while pixels with smaller displacements receive lower weights. The weights are then used to blend the warped frames and create the interpolated frames.

Phase-based interpolation techniques analyze the frequency content of the input frames to estimate the motion and calculate the interpolation weights. The method decomposes the input frames into their amplitude and phase components using techniques like the Fourier transform or wavelet transform. The phase differences between the input frames provide information about the motion and can be used to estimate the interpolation weights. The phase shifts are analyzed across different frequency bands to capture both large-scale and fine-scale motion. The interpolation weights are then calculated based on the phase differences, with larger phase shifts indicating more significant motion. The interpolated frames are generated by reconstructing the amplitude and phase components using the calculated weights. Phase-based interpolation can handle complex motion and produce sharp and coherent results.

Deep learning-based interpolation techniques utilize convolutional neural networks (CNNs) to learn the interpolation function directly from data. These methods train a deep neural network to estimate the interpolation weights and generate the intermediate frames. The input to the network consists of the two frames to be interpolated, along with any additional information such as optical flow or contextual features. The network learns to map the input frames to the corresponding interpolation weights through a series of convolutional and upsampling layers. The weights are then used to warp and blend the input frames, generating the interpolated frames. Deep learning-based interpolation can learn complex motion patterns and produce high-quality results. It can handle challenging cases like occlusions, large displacements, and non-rigid motion.

Adaptive interpolation techniques adjust the interpolation weights based on the characteristics of the input frames and the motion patterns. These methods analyze the local motion and texture information to determine the optimal interpolation strategy. For example, in regions with slow and smooth motion, the interpolation weights can be calculated using simple linear interpolation. In regions with fast or complex motion, more advanced techniques like optical flow or phase-based interpolation can be employed. The interpolation weights are adapted based on the local motion complexity, ensuring that the appropriate technique is used for each region. Adaptive interpolation can handle diverse motion patterns and produce visually pleasing results. It can strike a balance between computational efficiency and interpolation quality by applying different techniques based on the characteristics of the input frames.

At step 1303 the interpolation process then generates the intermediate frames by warping and blending the content of the input frames based on the computed weights. This involves mapping the pixels or features from the input frames to their corresponding positions in the intermediate frames and interpolating their values. Techniques like forward warping, backward warping, or bidirectional warping can be used to handle occlusions and maintain the coherence of the interpolated content. To enhance the quality of the interpolated frames, additional refinement steps can be applied at step 1304. These may include motion compensation, occlusion filling, or edge-aware interpolation to preserve sharp details and handle complex motion patterns. In some cases, deep learning-based approaches, such as convolutional neural networks or generative models, can be employed to learn the interpolation function directly from data.

Figure 14:
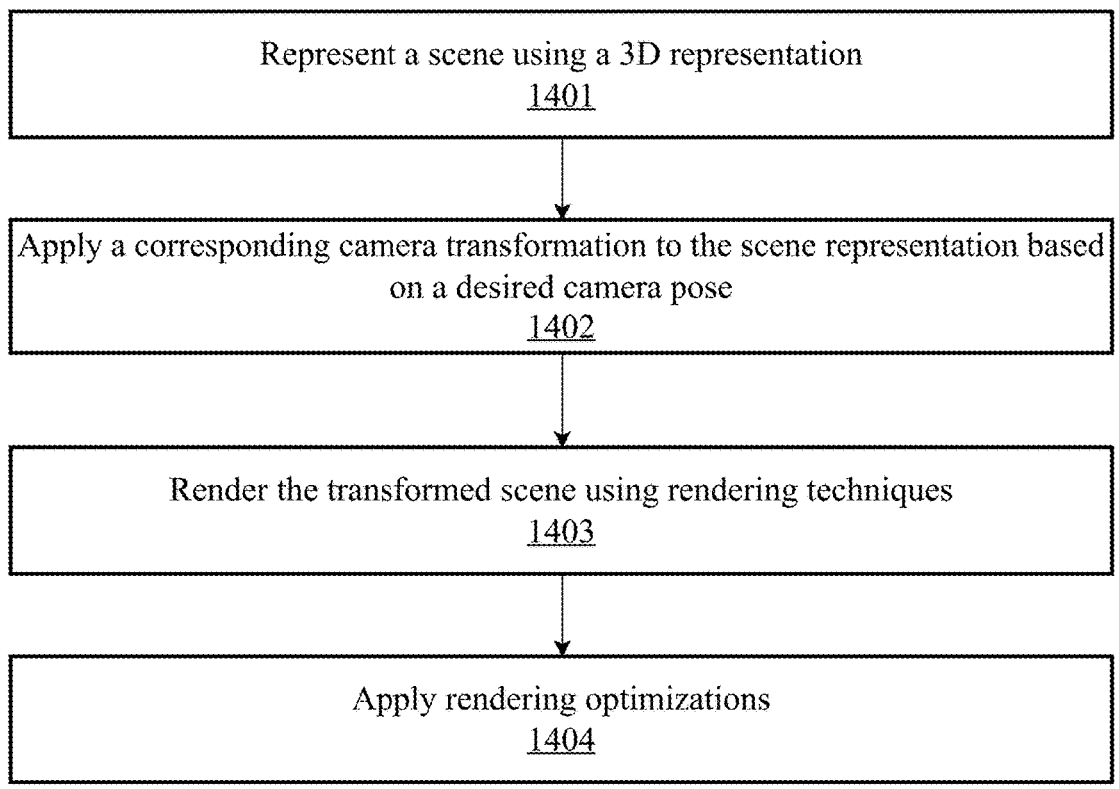
FIG. 14 is a flow diagram illustrating an exemplary method for performing view synthesis, according to an embodiment.

FIG. 14 is a flow diagram illustrating an exemplary method 1400 for performing view synthesis, according to an embodiment. The view synthesis method generates novel views of a scene from different camera perspectives. It can take a scene representation and a desired camera pose as input. According to the embodiment, the process begins at step 1401 by representing the scene using a suitable 3D representation, such as a point cloud, depth map, or 3D mesh. This representation captures the geometry and appearance of the scene and serves as the basis for view synthesis. Given a desired camera pose, the method applies the corresponding camera transformation to the scene representation at step 1402. This transformation aligns the scene with the specified viewpoint and determines the projection of the scene onto the image plane. The camera transformation can be represented using a matrix that encodes the position, orientation, and intrinsic parameters of the virtual camera. The transformed scene is then rendered using appropriate rendering techniques at step 1403. For point cloud rendering, the method may employ splatting or surface reconstruction algorithms to generate a continuous surface from the discrete points. For depth map rendering, the method may use depth-based image warping or 3D image-based rendering techniques to synthesize the novel view. Mesh rendering involves rasterizing the 3D mesh and applying textures or shading to generate the final image. At step 1404 during the rendering process, various techniques can be applied to improve the quality and realism of the synthesized views. These may include occlusion handling, hole filling, or depth-aware interpolation to address missing or occluded regions. Additionally, techniques like texture mapping, lighting estimation, or shadow generation can be employed to enhance the visual fidelity of the rendered views.

Alternative approaches to view synthesis may involve using light field rendering, where a dense set of views is captured and interpolated to generate novel views. Another variation is the use of neural rendering techniques, where deep learning models are trained to directly generate novel views from a sparse set of input views. These approaches can leverage the power of neural networks to learn complex mappings between different viewpoints and generate highly realistic and consistent views.

Figure 15:
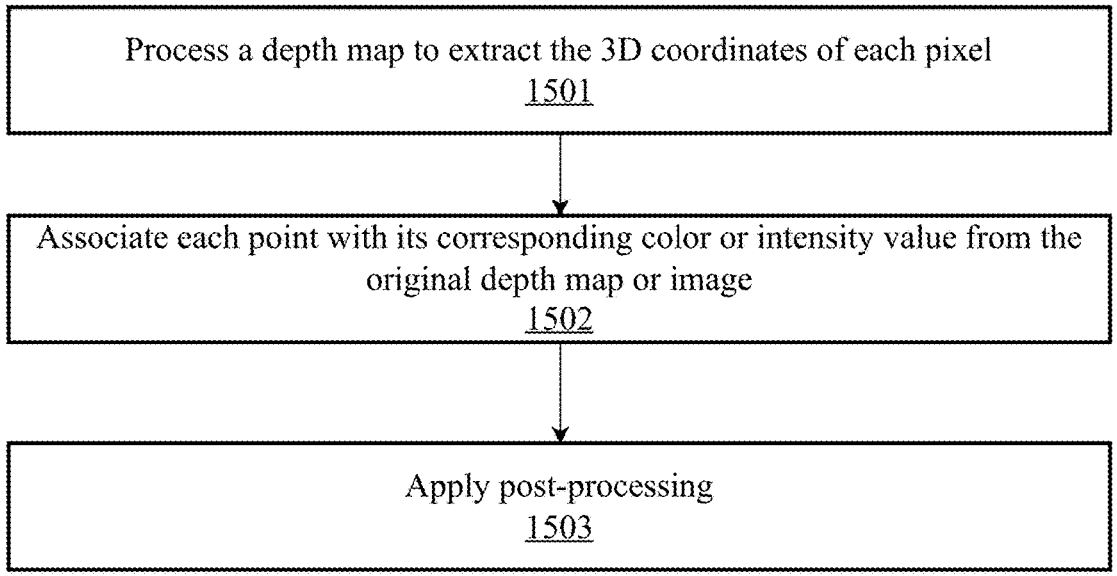
FIG. 15 is a flow diagram illustrating an exemplary method for point cloud conversion, according to an embodiment.

FIG. 15 is a flow diagram illustrating an exemplary method 1500 for point cloud conversion, according to an embodiment. The point cloud conversion method focuses on converting a depth map or a 3D scene representation into a point cloud format. It takes a depth map as input, which represents the distance of each pixel from the camera. According to the embodiment, the process begins at step 1501 by processing the depth map to extract the 3D coordinates of each pixel. This involves applying the camera intrinsic parameters, such as focal length and principal point, to convert the depth values into corresponding 3D points in the camera coordinate system. The resulting point cloud is a set of 3D points that represent the geometry of the scene. At step 1502 each point is associated with its corresponding color or intensity value from the original depth map or image. The point cloud can be stored in various formats, such as PLY or PCD, which include both the geometric coordinates and the associated attributes. To improve the quality and usability of the point cloud, various post-processing steps can be applied at step 1503. These may include noise reduction techniques, such as statistical outlier removal or bilateral filtering, to remove noisy or erroneous points. Downsampling or voxel grid filtering can be employed to reduce the density of the point cloud while preserving its overall structure. Additionally, surface reconstruction techniques, such as Poisson surface reconstruction or alpha shapes, can be applied to generate a continuous surface mesh from the point cloud.

Alternative approaches to point cloud conversion may involve using stereo vision or multi-view stereo techniques to estimate depth and generate point clouds from multiple images. Another variation is the use of structured light or time-of-flight sensors, which directly capture depth information and produce point clouds without the need for depth map conversion. Additionally, deep learning-based approaches can be employed to estimate depth or directly generate point clouds from monocular images or videos.

Figure 16:
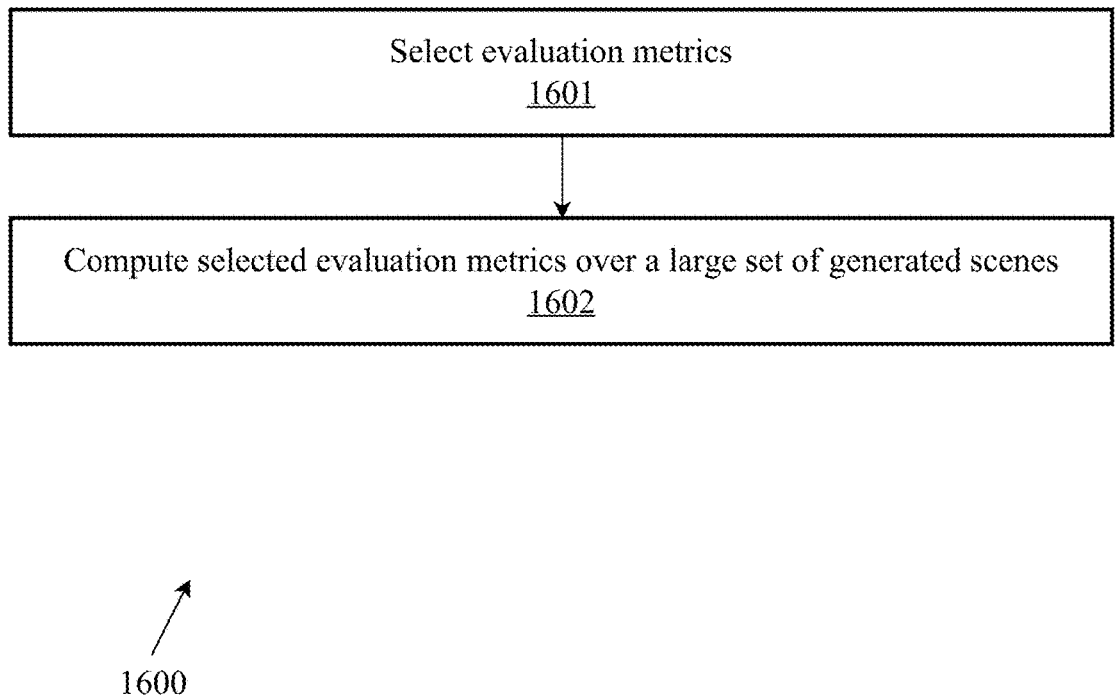
FIG. 16 is a flow diagram illustrating an exemplary method for performing model evaluation using various metrics, according to an embodiment.

FIG. 16 is a flow diagram illustrating an exemplary method 1600 for performing model evaluation using various metrics, according to an embodiment. The evaluation metrics method assesses the quality and realism of the generated scenes by comparing them against ground truth or reference scenes. According to the embodiment, the process begins at step 1601 by selecting appropriate evaluation metrics that capture different aspects of scene quality, such as visual fidelity, diversity, or consistency. One such metric is the Fréchet Inception Distance (FID), which measures the similarity between the feature distributions of the generated and real scenes. The FID is calculated by computing the Fréchet distance between the activations of a pre-trained Inception network on the generated and real scenes. A lower FID score indicates better alignment between the distributions and higher visual quality of the generated scenes.

Another metric is the Structural Similarity Index (SSIM), which assesses the perceptual similarity between the generated and reference scenes. SSIM considers local patterns of luminance, contrast, and structure to quantify the visual similarity between two images. Higher SSIM scores indicate better perceptual quality and closer resemblance to the reference scenes.

The Peak Signal-to-Noise Ratio (PSNR) is a pixel-level metric that measures the ratio between the maximum possible power of a signal and the power of the noise that affects the fidelity of its representation. PSNR is calculated based on the pixel-wise differences between the generated and reference scenes, with higher values indicating better pixel-level accuracy.

In addition to these metrics, other evaluation techniques can be employed, such as human perceptual studies or task-specific evaluation. Human perceptual studies involve conducting user surveys or ratings to assess the subjective quality and realism of the generated scenes. Task-specific evaluation measures the performance of the generated scenes in downstream tasks, such as object recognition or scene understanding.

At step 1602 to obtain reliable and statistically significant results, the evaluation metrics are typically computed over a large set of generated scenes and compared against a diverse set of reference scenes. The evaluation process may involve data splitting, cross-validation, or bootstrapping techniques to ensure the robustness and generalization of the results.

Alternative approaches to evaluation may include using adversarial evaluation, where a discriminator network is trained to distinguish between generated and real scenes. The performance of the discriminator serves as a measure of the realism and quality of the generated scenes. Another variation is the use of perceptual metrics, such as the Learned Perceptual Image Patch Similarity (LPIPS), which employs learned features from deep neural networks to assess the perceptual similarity between images.

Figure 17:
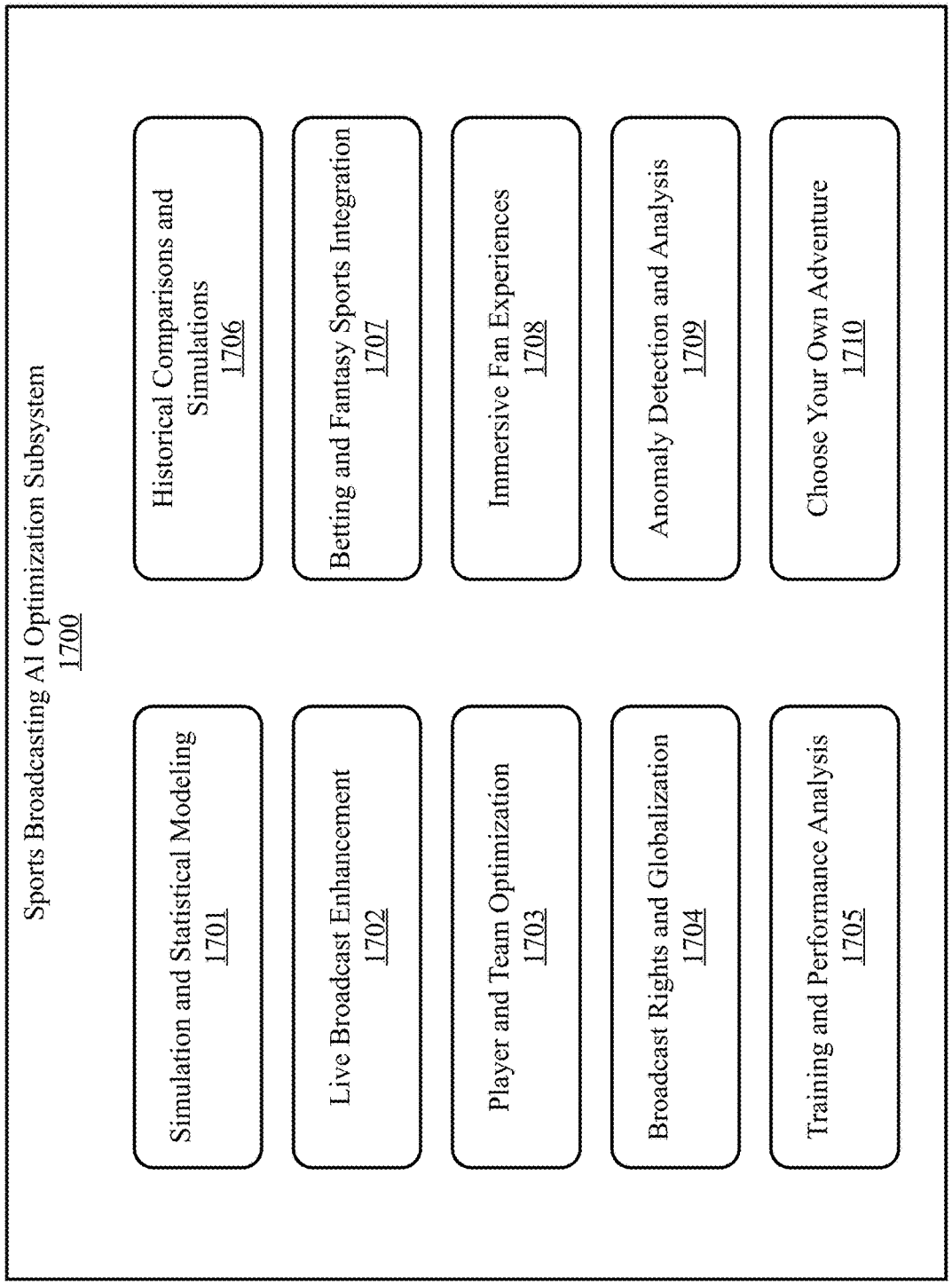
FIG. 17 is a block diagram illustrating an exemplary aspect of a system for generating scene continuity in visual media, a sports broadcasting AI optimization subsystem.

FIG. 17 is a block diagram illustrating an exemplary aspect of a system for generating scene continuity in visual media, a sports broadcasting AI optimization subsystem 1700. According to the aspect, sports broadcasting AI optimization subsystem 1700 is present and configured to enhance live broadcasts, optimize player and team performance, support betting and fantasy sports, create immersive fan experiences, detect anomalies, and aid in training and analysis. By leveraging the power of the scene generation system, sports organizations, broadcasters, and fans can benefit from a new level of insight, interactivity, and engagement in the world of sports. The combination of generative AI, simulation modeling, and traditional statistics and machine learning techniques can greatly enhance the way sports content is created, consumed, and experienced. According to the aspect, sports broadcasting AI optimization subsystem 1700 comprises components and techniques for simulation and statistical modeling 1701, live broadcast enhancement 1702, player and team optimization 1703, broadcast rights and globalization 1704, training and performance analysis 1705, historical comparisons and simulations 1706, betting and fantasy sports integration 1707, immersive fan experiences 1708, anomaly detection and analysis 1709, and choose your own adventure 1710.

Subsystem 1700 can enable the scene generation system to provide a livestream with graphics, telematics, internationalization/localization, and multi-device feed optimization, according to an embodiment. Live broadcast enhancement 1702 can be configured to capture and encode real-time video and audio data from various sources, such as cameras, screen captures, or rendered content. For example, the system may utilize streaming protocols like Real-Time Messaging Protocol (RTMP) or Web Real-Time Communication (WebRTC) to establish a low-latency and reliable connection between the scene generation system and the streaming platform. The system can be designed to handle high concurrent viewership and adapt to network conditions to ensure a smooth and uninterrupted streaming experience. Furthermore, the system can be configured to dynamically generate and superimpose visual elements onto the livestream. This may comprise the development of a library of customizable graphics templates, such as lower thirds, scoreboards, chyrons, and information panels, that can be populated with real-time data and triggered based on specific events or user interactions. System 1702 can seamlessly blend the generated graphics with the live video feed, ensuring proper synchronization and visual coherence.

According to an embodiment, the subsystem 1700 can incorporate a telematics system that can collect, process, and visualize real-time data from various sources, such as sensors, GPS devices, or external APIs, and which may establish secure and reliable data transmission channels to receive telematics data from remote devices or systems. Such a telematics system can develop and deploy data processing pipelines that can filter, aggregate, and analyze the telematics data in real-time, extracting meaningful insights and metrics. For example, the system can create visualizations, such as graphs, charts, or maps, that can represent the telematics data in an intuitive and informative manner, and integrate them into the graphics overlay.

According to an embodiment, subsystem 1700 can be configured for multi-device feed optimization. For example, the system can implement adaptive bitrate streaming techniques to optimize the video quality and delivery based on the viewer's device capabilities and network conditions, and/or generate multiple video profiles with different resolutions, bitrates, and codecs to cater to a wide range of devices, from high-end desktops to mobile phones. In some implementations, the system may utilize dynamic stream switching algorithms that can seamlessly adapt the video feed to changing network conditions, minimizing buffering and ensuring a smooth playback experience.

According to the aspect, the live broadcast enhancement 1702 system can integrate the scene generation system with existing broadcast infrastructure, including cameras, sensors, and data feeds, and may comprise real-time processing pipelines to capture and analyze live game data, such as player positions, ball trajectory, and event triggers. For example, live broadcast enhancement may utilize computer vision and machine learning techniques to track and identify key elements within the live broadcast and generate alternative camera angles, replays, and highlight reels using the scene generation system's rendering capabilities. For example, the system can be configured to provide viewers with show what a player just saw on the field from their physical position on the field during the last play. In an embodiment, the system implements interactive interfaces for broadcasters and viewers to select and explore different perspectives and visualizations. For example, the system can be configured to generate content and visualizations for multi-device feed optimization wherein the visualizations differ based on the device (e.g., television, VR headset, mobile device, etc.) the sport is being viewed on or interacted with.

According to the aspect, the player and team optimization 1703 system can collect and preprocess historical and real-time player and team data, including performance metrics, physical attributes, and gameplay statistics. Player and team optimization system can use machine learning models to analyze player and team performance patterns, tendencies, and interactions. Furthermore, the system can integrate physics-based simulations to model player movements, ball trajectories, and game dynamics accurately. The system may implement optimization algorithms to identify optimal player positions, lineups, and strategies based on specific game scenarios and objectives. In an embodiment, the system provides intuitive interfaces for coaches, analysts, and decision-makers to explore and evaluate different optimization scenarios.

According to the aspect, the broadcast rights and globalization 1704 system can collaborate with broadcasters and streaming platforms to integrate the scene generation system into their existing content delivery frameworks. This may comprise the development of APIs and SDKs to enable seamless integration of generated content, overlays, and interactive features into live broadcasts and streams. For example, the system can be configured to provide multi-language support and localization modules to adapt generated content to different regions and audiences. The system may be further configured to optimize content delivery and streaming protocols to ensure high-quality and low-latency distribution of generated content across various devices and networks. According to an aspect, the system 1704 may implement internationalization (i18n) and localization (l10n) techniques to adapt the livestream content to different languages and cultural preferences. This may comprise a localization framework that can handle text translations, date and time formatting, currency conversions, and other locale-specific adjustments and the creation of language-specific graphics templates and content variations that can be dynamically loaded based on the viewer's language preferences. In an implementation, the system can provide automated translation services or collaborate with human translators to provide real-time translations of live commentary or captions.

According to the aspect, the historical comparisons and simulation 1706 system can curate and preprocess historical game footage, player data, and statistical records to create a comprehensive database for comparisons and simulations. This may comprise the development of machine learning models to analyze and extract relevant features and patterns from historical data and implement simulation algorithms to generate realistic and accurate representations of historical players, teams, and game scenarios. In an embodiment, the system can provide user-friendly interfaces for fans and analysts to select, customize, and compare different historical simulations and "what if" scenarios. For example, the system can provide functionality directed to "the GOAT" (Greatest of All Time) comparisons and/or what if scenarios such as by providing viewers the opportunity to simulate the previous play if it was Tom Brady or Joe Montana instead of the present quarterback.

According to the aspect, the betting and fantasy sports integration 1707 system may be configured to partner with betting platforms and fantasy sports providers to integrate the scene generation system into their existing infrastructures. This may comprise the development of real-time data feeds and APIs to exchange player performance data, odds, and predictions between the scene generation system and betting platforms, and can further comprise the implementation of machine learning models to generate dynamic player projections, odds, and betting recommendations based on simulated scenarios and real-time game data. In an embodiment, the system can provide intuitive user interfaces for bettors and fantasy sports participants to access insights, visualizations, and personalized recommendations generated by the system.

According to the aspect, the immersive fan experience 1708 system may utilize virtual reality (VR) and augmented reality (AR) applications that leverage the scene generation system's capabilities to create immersive fan experiences. This may comprise the integration of motion tracking, haptic feedback, and spatial audio technologies to enhance the realism and interactivity of the generated content. For example, the system can implement multiplayer functionalities to allow fans to engage in virtual competitions, challenges, and social interactions within the generated environments. This may further comprise collaborating with sports venues and event organizers to deploy immersive fan experiences on-site, such as VR booths or AR-enhanced viewing areas. By leveraging a network of cameras (traditional, photogrammetric, LiDAR, etc.) and other imagery including IR and microwave (i.e., similar to home security motion monitors) a high fidelity 3D representation of a field or area can be created in real time, allowing announcers to better model actions, live comment on sports or project themselves directly in the action. This enables high resolution analysis, and when combined with "what if" generation, allows for commentators/announcers to explore potential outcomes based on their own input (e.g., swapping players, having them choose different actions, etc.). Combining this ability to project people into the plays with VR/AR capabilities, this allows for better illustrative functions like highlighting areas, 3D drawing, etc. While this drastically improves the quality and state of the art with live commentary, the same techniques have significant application to team training and review, betting, and objective analysis.

According to an embodiment, system 1708 can be configured to incorporate interactive elements into the livestream, such as polls, quizzes, or live chat, to engage viewers and foster a sense of community. This may comprise the use of real-time data synchronization mechanisms that can update the graphics overlay and telematics visualizations based on viewer interactions or external triggers.

According to the aspect, the anomaly detection and analysis 1709 system can collect and preprocess comprehensive datasets of player and game statistics, including historical and real-time data to develop unsupervised machine learning models, such as clustering and anomaly detection algorithms, to identify unusual patterns and outliers in player performance and game events. In an embodiment, the system may implement rule-based systems and expert knowledge to define and detect specific anomalies or suspicious behaviors. According to some implementations, the system integrates anomaly detection modules into the scene generation system's analytics pipeline to provide real-time alerts and insights to broadcasters, analysts, and integrity officials.

By developing a system of models, one or more for orchestration and a series of domain specific models (such as models trained on particular players), sport anomalies can also be identified which are equally as interesting and valuable as exploring "what if" scenarios. With the increase in popularity and ease of sport betting based on athlete/game metrics and surrounding metadata, modeling any identifying anomalies can not only indicate the likelihood that a player may be making decisions influenced by factors external to the game. This could also be worked into the betting statistics. For example, betting that LeBron James will take a certain number of shots from a particular region of the floor can have payouts dependent on other aspects and behaviors within that game such as an estimated fatigue level, relative position of teammates and opponents, current score, personal point count, or time left in the game.

According to the aspect, the training and performance analysis 1705 system can collaborate with teams, coaches, and sports science professionals to understand their specific training and analysis requirements. The system may utilize data capture and processing workflows to collect and analyze player performance data during training sessions and competitive events and implement machine learning models to identify performance patterns, strengths, weaknesses, and areas for improvement for individual players and teams. For example, the system may utilize the scene generation system's simulation capabilities to create realistic training scenarios and game-like situations for players to practice and improve their skills. According to an embodiment, the system provides intuitive dashboards and visualization tools for coaches and analysts to access and explore the generated insights and recommendations.

According to the aspect, the subsystem 1700 can provide choose your own adventure 1710 methods for traditional media assets and/or for live events like sports, plays, musicals, performances, or even political events. In loose terms, this builds on historical choose your own adventure concepts where a fixed tree of content is pre-generated and recorded/edited for limited user interactivity. Given the system's efficient generative content generation system and method concepts described herein, dynamic flow graph generation of keyframes with narrative tagging/path analysis in addition to just the content generation links for scene aware continuity purposes or efficient frame/sequence generation is proposed. Consider the difference between an emergency content narrative graph (e.g., the Seahawks play Patriots and lose during a terrible call to throw the pass by Pete Carroll)—the system can generate alternate play call paths similar to the concepts previously discussed for broadcaster purposes but in this case for "in your living room" bets or forecasts or "alternative futures". Since the system can generate content and can also "seed" simulation models or employ AI models like some of the sports specific models cited herein, there is no need for "limits" on allowed narratives like the highly constrained existing choose your own adventure implementations.

This also enables the system to map emergent game narratives (player, team, coach, game, series, league) to better understand impacts on viewing, engagement, etc. to inform live markets for advertisements. In simple terms, given the number of streaming sports events vs linear content distribution networks there is plenty of opportunity to better optimize ad revenue given engagement trends within a given broadcast—more similar to how futures and options markets inform equities markets in the stock market. If the system collects expected engagement metrics, then it can use the ongoing narrative and key event extraction elements to help seed broader content engagement within sports books, on the internet, social media sites and linear networks and streamers and charge more appropriately for ad presentation. Think about the relative value change in WNBA rights pre and post Caitlin Clark but the long-term media rights deals kept all that value away from league/owners/players. This makes little sense in the streamed content world.

The subsystem 1700 may utilize various key event extraction models to feed the narrative construction capabilities as well as the suite of available generative AI content models, AI gameplay, and/or simulation based gameplay (or hybrid) models which may feed generative content models for broadcast/streaming purposes. The key distinction here is that the system is employing models for effectively generating synthetic data/imagery/overlays about a given scenario for communicative purposes and distinguishing that from the generation/simulation of prospective games or game elements (e.g., player-player matchup) which may be hierarchically fed into an amalgamation of components to form the ultimate scenarios of interest that are fully animated/presented or made available for viewers or for the choose your own adventure. This can apply to various events/sports including, but not limited to, soccer, basketball, football, hockey, racing, tennis, pickleball, horse racing, and chess. Models for soccer key event extraction may include Faster RCNN and YoloV5. For sustained generation of multiplayer sports gameplay a transformer decoder based model referred to as SportsNGEN may be used. The scene generation system disclosed herein surpasses these current uses of the technology via its more contextualized, narrative centric, action building to interaction building to game moments building to games, building to scenarios and feeding into future rankings, fantasy sports leagues, and choose your own adventure and gaming (including betting) content.

Consider an exemplary use case directed to the broadcast of the Super Bowl. During the Super Bowl broadcast, generative AI can be employed to create a unique and immersive experience for viewers. As the game progresses, AI algorithms can generate alternative camera angles and 360-degree views of key moments, allowing fans to relive the action from different perspectives. The AI system can also predict the probability of a successful play based on factors like player positions, historical performance, and real-time game data. For instance, in a critical fourth-down situation, the AI system can analyze the offensive and defensive formations, the quarterback's tendencies, and the historical success rates in similar situations. Based on this analysis, the AI can generate a predictive visualization of the most likely play outcomes, such as the probability of a successful conversion or the expected yardage gained.

Meanwhile, the AI-enhanced sound system can isolate and amplify the quarterback's audibles, giving viewers an inside look into the communication on the field. The generated sound effects and crowd reactions can add to the immersive experience, making viewers feel like they are part of the live stadium atmosphere. Throughout the broadcast, the AI system can continuously update its predictions and generate new insights based on the evolving game dynamics. This real-time analysis and visualization can provide viewers with a deeper understanding of the strategies, player performances, and critical moments that shape the outcome of the Super Bowl. By leveraging generative AI in Super Bowl broadcasting, broadcasters can offer a more engaging, insightful, and immersive experience for viewers. The combination of enhanced imagery, sound, and predictive analytics powered by AI can revolutionize the way fans consume and interact with the biggest game of the year.

Consider an exemplary use case directed to the broadcast of the Stanley Cup. During the Stanley Cup Final, generative AI can be utilized to create an immersive and insightful broadcast experience. As the game unfolds, AI algorithms can generate virtual camera angles that follow the puck's movement, providing viewers with a dynamic and close-up view of the action. The AI system can also predict the likelihood of a goal being scored based on factors like shot location, player positioning, and historical shooting percentages. In a pivotal moment of the game, such as a penalty shot or a power-play opportunity, the AI system can analyze the goaltender's tendencies, the shooter's scoring history, and the team's offensive strategies. Based on this analysis, the AI can generate a predictive visualization of the most likely shot placement and the probability of a goal being scored. Additionally, the AI-enhanced sound system can isolate and highlight the communication between players and coaches, giving viewers an inside look into the team's tactics and adjustments. The generated crowd noise and goal celebrations can add to the immersive experience, replicating the electric atmosphere of a Stanley Cup Final game. Throughout the broadcast, the AI system can continuously update its predictions and generate new insights based on the evolving game dynamics. This real-time analysis and visualization can provide viewers with a comprehensive understanding of the strategies, player performances, and pivotal moments that shape the outcome of the Stanley Cup Final.

Similar broadcast enhancements can be applied to various other sporting events including, but not limited to, the Kentucky Derby, the NBA Finals, the MLB World Series, NASCAR events, and F1 races.

Figure 18:
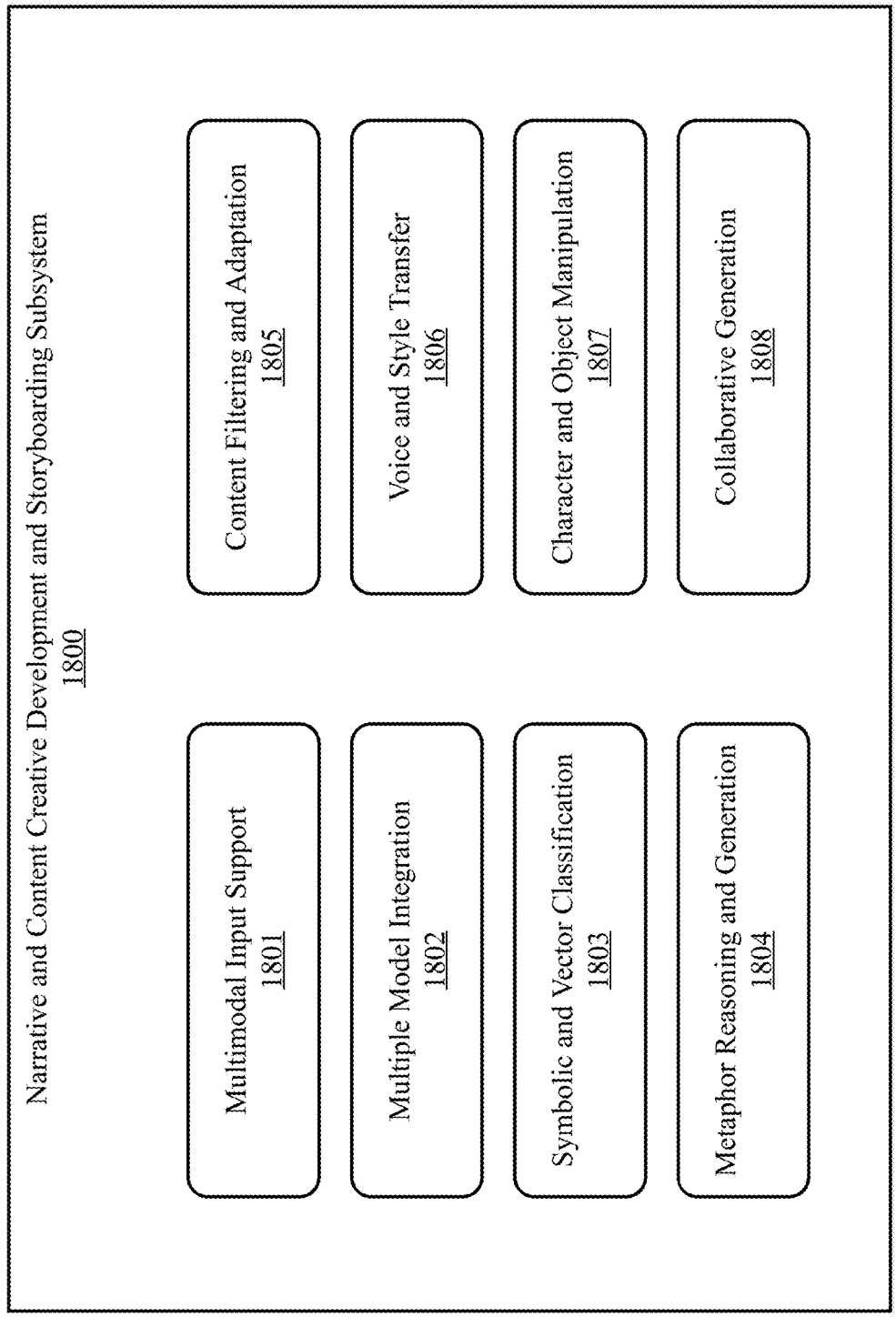
FIG. 18 is a block diagram illustrating an exemplary aspect of a system for generating scene continuity in visual media, a narrative and content creative development and storyboarding subsystem.

FIG. 18 is a block diagram illustrating an exemplary aspect of a system for generating scene continuity in visual media, a narrative and content creative development and storyboarding subsystem 1800. According to the aspect, narrative and content creative development and storyboarding subsystem 1800 is present and configured to enhance its capabilities to support multimodal inputs, integrate multiple generative models, enable symbolic and metaphorical reasoning, adapt content based on user preferences, and allow for collaborative generation between humans and AI. These enhancements will make the scene generation system more versatile, expressive, and user-centric, enabling the creation of rich, diverse, and personalized narratives and content across various domains and applications. According to the aspect, narrative and content creative development and storyboarding subsystem 1800 comprises components and techniques for multimodal input support 1801, multiple model integration 1802, symbolic and vector classification 1803, metaphor reasoning and generation 1804, content filtering and adaptation 1805, voice and style transfer 1806, character and object manipulation 1807, and collaborative generation 1808.

According to the aspect, the multimodal input support 1801 system can extend the scene generation system to accept and process various types of input, such as voice, text, video, gaming data, and sensor data and may utilize input processing modules that can extract relevant information and features from these multimodal inputs to feed into the generative models. For example, the system can integrate natural language processing techniques to understand and interpret textual inputs, such as story descriptions or dialog. It is important to note that the content generation process can be triggered to generate various sequential content elements which may optionally use spatiotemporal indexing to aid in content generation and synchronization beyond just sequential ordering.

According to the aspect, the multiple model integration 1802 system may incorporate a diverse range of generative models into the scene generation system, including Large Language Models (LLMs), Kolmogorov-Arnold Networks (KANs), diffusion models, Generative Adversarial Networks (GANs), Variational Autoencoders (VAEs), and simulation models like agent-based or discrete event simulations. This may comprise the development of a modular architecture that allows for seamless integration and collaboration between these different models, leveraging their strengths for specific tasks such as dialog generation, image generation, or behavior simulation.

According to the aspect, the symbolic and vector classification 1803 system is configured to implement techniques for symbolic and vector-based classification of entity and system states within the generated scenes. For example, this may involve the use of ontologies and knowledge graphs to represent and reason about the relationships and interactions between entities, environments, and system components. The system can utilize mechanisms for ontology evolution, allowing the system to adapt and expand its understanding of the story elements over time.

According to the aspect, the metaphor reasoning and generation 1804 system is configured to incorporate the concept of visual metaphors into the scene generation system, enabling the creation of symbolic and metaphorical representations. For example, this may leverage the collaboration between LLMs and diffusion models to generate visual metaphors from linguistic metaphors. In some embodiment, a reasoning engine that can interpret and generate metaphorical content based on the intended meaning and target audience may be implemented based on the collaboration between LLMs and diffusion models, or other model combinations.

According to the aspect, the content filtering and adaptation 1805 system may develop and utilize content filtering mechanisms that can adapt the generated scenes based on factors like age appropriateness, religious sensitivity, and demographic preferences, to name a few. For example, the system can use a temperature-like function to control the balance between direct content generation and metaphorical content generation, allowing for dynamic adjustment of the generated scenes. This may further comprise the incorporation of scoring and blending techniques to evaluate and combine candidate results based on their suitability for the target audience.

According to the aspect, the voice and style transfer 1806 system can integrate voice synthesis and style transfer techniques into the scene generation system, allowing users to customize the narration and visual style of the generated content. This may comprise the development and deployment of models that can learn and mimic the voice characteristics of specific actors, narrators, or performers, enabling users to choose their preferred storyteller. According to an embodiment, the system implements style transfer algorithms that can adapt the visual style of the generated scenes to match the desired artistic style, such as anime or comic book aesthetics. For example, an audiobook could be narrated by Samuel L. Jackson, Barack Obama, the listeners deceased grandmother, or anyone else. As an example of a generative AI model that could be implemented to facilitate voice and style transfer, consider the Gen-2 model which can use text descriptions or images to create realistic, new videos. It can even combine these descriptions and images to create a video. In short, Gen-2 allows users to create videos without needing to film anything. Another exemplary model includes generative adversarial networks (GANs) which can be used to create deepfakes.

According to the aspect, the character and object manipulation 1807 system is configured to allow users to manipulate and customize characters and objects within the generated scenes, such as replacing actors or modifying their appearances. For example, the system can provide techniques for seamless integration and blending of user-specified elements into the generated scenes while maintaining consistency and coherence.

According to the aspect, the collaborative generation 1808 system can leverage human-AI collaboration in the scene generation process. The system may provide intuitive interfaces and interaction mechanisms that allow users to guide and refine the generated content through iterative feedback and collaboration with the AI system.

Exemplary Computing Environment

Figure 19:
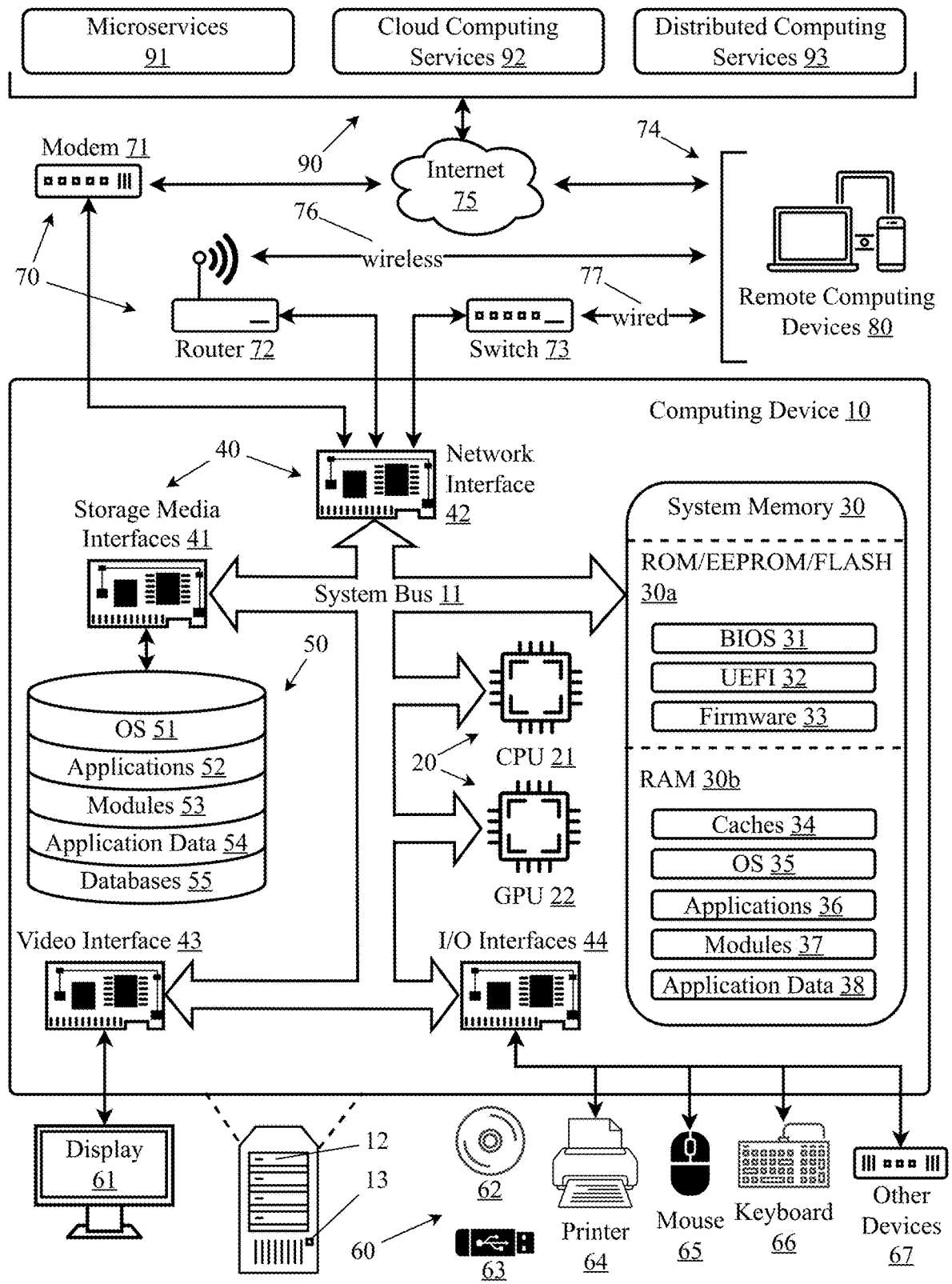
FIG. 19 illustrates an exemplary computing environment on which an embodiment described herein may be implemented.

FIG. 19 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form- Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, knowledge graph databases, vector databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs)

which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computing system for managing scene continuity in generated or augmented visual media, the computing system comprising:
one or more hardware processors configured for:
receiving a content specification request associated with a scene for continuity-aware content management;
selecting one or more generative models based on the content specification, wherein the selecting comprises analyzing scene-specific continuity requirements including object positioning, lighting conditions, and camera perspective across multiple scenes;
preprocessing data based on the content specification to prepare the data for the selected generative models, wherein the preprocessing comprises:
cleaning multi-modal visual data while maintaining temporal and spatial relationships between frames;
identifying and tracking specific objects across multiple scenes to ensure consistent object representation;
mapping lighting patterns and camera angles across scene transitions; and
transforming the data into a format that preserves visual and narrative continuity markers;
selecting, training, fine-tuning, or augmenting the selected generative models using the preprocessed data, wherein the training comprises:
implementing an adversarial network architecture with a generator network and a discriminator network;
training the discriminator to identify visual discontinuities between scenes; and
optimizing the generator to produce content that maintains consistent representation of characters, environments, narrative elements, and visual assets across multiple clips or scenes;
generating scene continuity-aware content using the selected generative models based on the content specification request, wherein the generating comprises:
frame interpolation and view synthesis to create transitions between scenes that maintain continuity of subject appearance, lighting, and scene geometry;
perspective reconfiguration based on user-defined camera motion and angle inputs;
generative scene extension through outpainting or recomposition to fill occluded or non-visible spatial regions beyond original frame boundaries; and
synthesizing synchronized audio, including ambient environmental sounds and character dialogue, based on the visual content and content specification; and
outputting the generated scene continuity-aware content artifacts or representations through a three-dimensional rendering engine that applies consistent shading, texture mapping, and perspective transformations across scene boundaries.

2. The computing system of claim 1, wherein the user content specification comprises one or more design elements, user preference configuration documents, or templates associated with scene continuity generation.

3. The computing system of claim 1, wherein selecting one or more generative models comprises selecting a generator network and a discriminator network.

4. The computing system of claim 3, wherein training the selected generative models comprises training the generator network and the discriminator network adversarially using the preprocessed data.

5. The computing system of claim 1, wherein generating scene continuity content comprises:
engineering one or more prompts for the trained generative models based on the user content specification; and
submitting one or more prompts as input to the trained generative models to generate the scene continuity content.

6. The computing system of claim 5, wherein one or more prompts include desired camera angles, temporal positions, transitions, or other scene-specific attributes.

7. The computing system of claim 1, further comprising:
selecting a frame interpolation and view synthesis subsystem based on the content specification; and
applying the frame interpolation and view synthesis module to the generated scene continuity content to create smooth transitions and novel viewpoints.

8. The computing system of claim 1, wherein training the selected generative models comprises:
initializing the selected generative models with predefined architectures and hyperparameters;
iteratively updating the model parameters using optimization algorithms; and
monitoring and evaluating the training progress using metrics and validation techniques.

9. The computing system of claim 1, wherein outputting the generated scene continuity content comprises:
applying post-processing techniques to enhance the visual quality and realism of the generated content; and
providing the generated content in a format compatible with the user specification or downstream applications.

10. The computing system of claim 1, wherein generating scene continuity-aware content further comprises generating synchronized audio including ambient environmental sounds or character dialogue aligned with the generated visual frames.

11. A computer-implemented method, the computer-implemented method comprising:
receiving a content specification request associated with a scene for continuity-aware content management;
selecting one or more generative models based on the content specification, wherein the selecting comprises analyzing scene-specific continuity requirements including object positioning, lighting conditions, and camera perspective across multiple scenes;
preprocessing data based on the content specification to prepare the data for the selected or generative models, wherein the preprocessing comprises:
cleaning multi-modal visual data while maintaining temporal and spatial relationships between frames;
identifying and tracking specific objects across multiple scenes to ensure consistent object representation;
mapping lighting patterns and camera angles across scene transitions; and
transforming the data into a format that preserves visual and narrative continuity markers;
selecting, training, fine-tuning, or augmenting the selected generative models using the preprocessed data, wherein the training comprises:
implementing an adversarial network architecture with a generator network and a discriminator network;
training the discriminator to identify visual discontinuities between scenes; and
optimizing the generator to produce content that maintains consistent representation of characters, environments, narrative elements, and visual assets across multiple clips or scenes;
generating scene continuity-aware content using the selected generative models based on the content specification request, wherein the generating comprises:
frame interpolation and view synthesis to create transitions between scenes that maintain continuity of subject appearance, lighting, and scene geometry;
perspective reconfiguration based on user-defined camera motion and angle inputs;
generative scene extension through outpainting or recomposition to fill occluded or non-visible spatial regions beyond original frame boundaries; and
synthesizing synchronized audio, including ambient environmental sounds and character dialogue, based on the visual content and content specification; and
outputting the generated scene continuity—aware content artifacts or representations through a three-dimensional rendering engine that applies consistent shading, texture mapping, and perspective transformations across scene boundaries.

12. The computer-implemented method of claim 11, wherein the content specification comprises one or more design elements, user preference configuration documents, or templates associated with scene continuity generation.

13. The computer-implemented method of claim 11, wherein selecting one or more generative models comprises selecting a generator network and a discriminator network.

14. The computer-implemented method of claim 13, wherein training the selected generative models comprises training the generator network and the discriminator network adversarially using the preprocessed data.

15. The computer-implemented method of claim 11, wherein generating scene continuity content comprises:
engineering one or more prompts for the trained generative models based on the user content specification; and
submitting one or more prompts as input to the trained generative models to generate the scene continuity content.

16. The computer-implemented method of claim 15, wherein one or more prompts include desired camera angles, temporal positions, transitions, or other scene-specific attributes.

17. The computer-implemented method of claim 11, further comprising:
selecting a frame interpolation and view synthesis subsystem based on the user content specification; and
applying the frame interpolation and view synthesis module to the generated scene continuity content to create smooth transitions and novel viewpoints.

18. The computer-implemented method of claim 11, wherein training the selected generative models comprises:
initializing the selected generative models with predefined architectures and hyperparameters;
iteratively updating the model parameters using optimization algorithms; and
monitoring and evaluating the training progress using metrics and validation techniques.

19. The computer-implemented method of claim 11, wherein outputting the generated scene continuity content comprises:
applying post-processing techniques to enhance the visual quality and realism of the generated content; and
providing the generated content in a format compatible with the user specification or downstream applications.

20. The computer-implemented method of claim 11, wherein generating scene continuity-aware content further comprises generating synchronized audio including ambient environmental sounds or character dialogue aligned with the generated visual frames.

21. A system for managing scene continuity in generated or augmented visual media, comprising one or more computers with executable instructions that, when executed, cause the system to:
receive a content specification request associated with a scene for continuity-aware content management;
select one or more generative models based on the content specification, wherein the selecting comprises analyzing scene-specific continuity requirements including object positioning, lighting conditions, and camera perspective across multiple scenes;
preprocess data based on the content specification to prepare the data for the selected generative models, wherein the preprocessing comprises:
cleaning multi-modal visual data while maintaining temporal and spatial relationships between frames;
identifying and tracking specific objects across multiple scenes to ensure consistent object representation;
mapping lighting patterns and camera angles across scene transitions; and
transforming the data into a format that preserves visual and narrative continuity markers;
select, train, fine-tune, or augment the selected generative models using the preprocessed data, wherein the training comprises:
implementing an adversarial network architecture with a generator network and a discriminator network;
training the discriminator to identify visual discontinuities between scenes; and
optimizing the generator to produce content that maintains consistent representation of characters, environments, narrative elements, and visual assets across multiple clips or scenes;
generate scene continuity-aware content using the selected generative models based on the content specification request, wherein the generation comprises:
frame interpolation and view synthesis to create transitions between scenes that maintain continuity of subject appearance, lighting, and scene geometry;
perspective reconfiguration based on user-defined camera motion and angle inputs;
generative scene extension through outpainting or recomposition to fill occluded or non-visible spatial regions beyond original frame boundaries; and
synthesizing synchronized audio, including ambient environmental sounds and character dialogue, based on the visual content and content specification; and
output the generated scene continuity-aware content artifacts or representations through a three-dimensional rendering engine that applies consistent shading, texture mapping, and perspective transformations across scene boundaries.

22. The system of claim 21, wherein the user content specification comprises one or more design elements, user preference configuration documents, or templates associated with scene continuity generation.

23. The system of claim 21, wherein selecting one or more generative models comprises selecting a generator network and a discriminator network.

24. The system of claim 21, wherein generating scene continuity content comprises:
engineering one or more prompts for the trained generative models based on the user content specification; and
submitting one or more prompts as input to the trained generative models to generate the scene continuity content.

25. The system of claim 24, wherein one or more prompts include desired camera angles, temporal positions, transitions, or other scene-specific attributes.

26. The system of claim 21, wherein generating scene continuity-aware content further comprises generating synchronized audio including ambient environmental sounds or character dialogue aligned with the generated visual frames.

27. Non-transitory, computer-readable storage media having computer-executable instructions embodied thereon that, when executed by one or more processors of a computing system cause the computing system to:
receive a content specification request associated with a scene for continuity-aware content management;
select one or more generative models based on the content specification, wherein the selecting comprises analyzing scene-specific continuity requirements including object positioning, lighting conditions, and camera perspective across multiple scenes;
preprocess data based on the content specification to prepare the data for the selected generative models, wherein the preprocessing comprises:
cleaning multi-modal visual data while maintaining temporal and spatial relationships between frames;
identifying and tracking specific objects across multiple scenes to ensure consistent object representation;
mapping lighting patterns and camera angles across scene transitions; and
transforming the data into a format that preserves visual and narrative continuity markers;
select, train, fine-tune, or augment the selected generative models using the preprocessed data, wherein the training comprises:
implementing an adversarial network architecture with a generator network and a discriminator network;
training the discriminator to identify visual discontinuities between scenes; and
optimizing the generator to produce content that maintains consistent representation of characters, environments, narrative elements, and visual assets across multiple clips or scenes;
generate scene continuity-aware content using the selected generative models based on the content specification request, wherein the generation comprises:
frame interpolation and view synthesis to create transitions between scenes that maintain continuity of subject appearance, lighting, and scene geometry;

perspective reconfiguration based on user-defined camera motion and angle inputs;

generative scene extension through outpainting or recomposition to fill occluded or non-visible spatial regions beyond original frame boundaries; and synthesizing synchronized audio, including ambient environmental sounds and character dialogue, based on the visual content and content specification; and output the generated scene continuity-aware content artifacts or representations through a three-dimensional rendering engine that applies consistent shading, texture mapping, and perspective transformations across scene boundaries.

28. The non-transitory, computer-readable storage media of claim 27, wherein the content specification comprises one or more design elements, user preference configuration documents, or templates associated with scene continuity generation.

29. The non-transitory, computer-readable storage media of claim 27, wherein selecting one or more generative models comprises selecting a generator network and a discriminator network.

30. The non-transitory, computer-readable storage media of claim 27, wherein generating scene continuity-aware content further comprises generating synchronized audio including ambient environmental sounds or character dialogue aligned with the generated visual frames.

* * * * *